United States Patent
Sweeney et al.

(10) Patent No.: US 10,002,325 B2
(45) Date of Patent: Jun. 19, 2018

(54) KNOWLEDGE REPRESENTATION SYSTEMS AND METHODS INCORPORATING INFERENCE RULES

(75) Inventors: Peter Joseph Sweeney, Kitchener (CA); Ihab Francis Ilyas, Waterloo (CA); Wu Zhou, Kitchener (CA); Wayne Oldford, Waterloo (CA)

(73) Assignee: PRIMAL FUSION INC., Waterloo, Ontario (CA)

( * ) Notice: Subject to any disclaimer, the term of this patent is extended or adjusted under 35 U.S.C. 154(b) by 196 days.

(21) Appl. No.: 13/345,644

(22) Filed: Jan. 6, 2012

(65) Prior Publication Data

US 2012/0166373 A1    Jun. 28, 2012

Related U.S. Application Data

(63) Continuation-in-part of application No. 13/165,423, filed on Jun. 21, 2011, now Pat. No. 9,104,779, which
(Continued)

(51) Int. Cl.
*G06F 7/00*    (2006.01)
*G06F 17/30*    (2006.01)
(Continued)

(52) U.S. Cl.
CPC ......... *G06N 5/02* (2013.01); *G06F 17/30914* (2013.01); *G06N 7/005* (2013.01)

(58) Field of Classification Search
USPC ........................................... 707/758
See application file for complete search history.

(56) References Cited

U.S. PATENT DOCUMENTS 3,943,462 A    3/1976  Thompson
4,532,813 A    8/1985  Rinehart
(Continued)

FOREIGN PATENT DOCUMENTS

CA    2734756 A1    3/2010
CA    2823420 A1    7/2012
(Continued)

OTHER PUBLICATIONS

Chinese Office Action for Chinese Application No. 200780032062.9, dated May 17, 2011.
(Continued)

*Primary Examiner* — Muluemebet Gurmu
(74) *Attorney, Agent, or Firm* — Niall Cooney; Norton Rose Fulbright Canada LLP

(57) ABSTRACT

Techniques for analyzing and synthesizing complex knowledge representations (KRs) may utilize an atomic knowledge representation model including both an elemental data structure and knowledge processing rules stored as machine-readable data and/or programming instructions. One or more of the knowledge processing rules may be applied to analyze an input complex KR to deconstruct its complex concepts and/or concept relationships to elemental concepts and/or concept relationships to be included in the elemental data structure. One or more of the knowledge processing rules may be applied to synthesize an output complex KR from the stored elemental data structure in accordance with context information. Methods of populating an elemental data structure and methods of synthesizing complex KRs from the elemental data structure may rely on linguistic inference rules and/or elemental inference rules.

15 Claims, 35 Drawing Sheets

Related U.S. Application Data is a continuation-in-part of application No. 12/477,977, filed on Jun. 4, 2009, now Pat. No. 8,010,570, which is a continuation of application No. 11/625,452, filed on Jan. 22, 2007, now Pat. No. 7,849,090, which is a continuation-in-part of application No. 11/550,457, filed on Oct. 18, 2006, now Pat. No. 7,606,781, which is a continuation-in-part of application No. 11/469,258, filed on Aug. 31, 2006, now Pat. No. 7,596,574, which is a continuation-in-part of application No. 11/392,937, filed on Mar. 30, 2006, now abandoned.

(60) Provisional application No. 61/357,266, filed on Jun. 22, 2010, provisional application No. 60/666,166, filed on Mar. 30, 2005, provisional application No. 61/430,836, filed on Jan. 7, 2011, provisional application No. 61/430,810, filed on Jan. 7, 2011, provisional application No. 61/471,964, filed on Apr. 5, 2011, provisional application No. 61/498,899, filed on Jun. 20, 2011, provisional application No. 61/532,330, filed on Sep. 8, 2011.

(51) Int. Cl.
*G06N 5/02* (2006.01)
*G06N 7/00* (2006.01)

(56) References Cited

U.S. PATENT DOCUMENTS

| | | | |
|---|---|---|---|
| 4,972,328 | A | 11/1990 | Wu et al. |
| 5,056,021 | A | 10/1991 | Ausborn |
| 5,193,185 | A | 3/1993 | Lanter |
| 5,369,763 | A | 11/1994 | Biles |
| 5,594,837 | A | 1/1997 | Noyes |
| 5,745,910 | A | 4/1998 | Piersol et al. |
| 5,793,376 | A | 8/1998 | Tanaka et al. |
| 5,835,758 | A | 11/1998 | Nochur et al. |
| 5,911,145 | A | 6/1999 | Arora et al. |
| 5,924,098 | A * | 7/1999 | Kluge |
| 5,937,400 | A | 8/1999 | Au |
| 5,950,173 | A | 9/1999 | Perkowski |
| 5,953,726 | A | 9/1999 | Carter et al. |
| 6,006,222 | A | 12/1999 | Culliss |
| 6,078,916 | A | 6/2000 | Culliss |
| 6,098,033 | A | 8/2000 | Richardson et al. |
| 6,138,085 | A | 10/2000 | Richardson et al. |
| 6,167,390 | A | 12/2000 | Brady et al. |
| 6,173,276 | B1 | 1/2001 | Kant et al. |
| 6,233,575 | B1 | 5/2001 | Agrawal et al. |
| 6,292,792 | B1 | 9/2001 | Belles et al. |
| 6,295,066 | B1 | 9/2001 | Tanizaki et al. |
| 6,334,131 | B2 | 12/2001 | Chakrabarti et al. |
| 6,349,275 | B1 | 2/2002 | Schumacher et al. |
| 6,356,899 | B1 | 3/2002 | Chakrabarti et al. |
| 6,396,864 | B1 | 5/2002 | O'Brien et al. |
| 6,401,061 | B1 | 6/2002 | Zieman |
| 6,487,547 | B1 | 11/2002 | Ellison et al. |
| 6,499,024 | B1 | 12/2002 | Stier et al. |
| 6,539,376 | B1 | 3/2003 | Sundaresan et al. |
| 6,539,395 | B1 | 3/2003 | Gjerdingen et al. |
| 6,556,983 | B1 | 4/2003 | Altschuler et al. |
| 6,571,240 | B1 | 5/2003 | Ho et al. |
| 6,694,329 | B2 | 2/2004 | Murray |
| 6,751,611 | B2 | 6/2004 | Krupin et al. |
| 6,751,621 | B1 | 6/2004 | Calistri-Yeh et al. |
| 6,768,982 | B1 | 7/2004 | Collins et al. |
| 6,772,136 | B2 | 8/2004 | Kant et al. |
| 6,785,683 | B1 | 8/2004 | Zodik et al. |
| 6,868,525 | B1 | 3/2005 | Szabo |
| 6,976,020 | B2 | 12/2005 | Anthony et al. |
| 6,980,984 | B1 | 12/2005 | Huffman et al. |
| 7,007,074 | B2 | 2/2006 | Radwin |
| 7,010,144 | B1 * | 3/2006 | Davis et al. ............... 382/100 |
| 7,035,864 | B1 | 4/2006 | Ferrari et al. |
| 7,051,023 | B2 | 5/2006 | Kapur et al. |
| 7,062,466 | B2 | 6/2006 | Wagner et al. |
| 7,062,483 | B2 | 6/2006 | Ferrari et al. |
| 7,089,237 | B2 | 8/2006 | Turnbull et al. |
| 7,120,646 | B2 | 10/2006 | Streepy, Jr. |
| 7,152,065 | B2 | 12/2006 | Behrens et al. |
| 7,181,465 | B2 | 2/2007 | Maze et al. |
| 7,209,922 | B2 | 4/2007 | Maze et al. |
| 7,225,183 | B2 | 5/2007 | Gardner |
| 7,249,117 | B2 | 7/2007 | Estes |
| 7,280,991 | B1 | 10/2007 | Beams et al. |
| 7,283,992 | B2 | 10/2007 | Liu et al. |
| 7,302,418 | B2 | 11/2007 | Asahara |
| 7,319,951 | B2 | 1/2008 | Rising, III et al. |
| 7,392,250 | B1 | 6/2008 | Dash et al. |
| 7,406,456 | B2 | 7/2008 | Calistri-Yeh et al. |
| 7,418,452 | B2 | 8/2008 | Maze |
| 7,440,940 | B2 | 10/2008 | Chen et al. |
| 7,478,089 | B2 | 1/2009 | Henkin et al. |
| 7,490,073 | B1 | 2/2009 | Qureshi et al. |
| 7,493,319 | B1 | 2/2009 | Dash et al. |
| 7,496,593 | B2 | 2/2009 | Gardner et al. |
| 7,502,810 | B2 | 3/2009 | Acevedo-Aviles et al. |
| 7,523,102 | B2 | 4/2009 | Bjarnestam et al. |
| 7,580,918 | B2 | 8/2009 | Chang et al. |
| 7,584,208 | B2 | 9/2009 | Spivack et al. |
| 7,596,374 | B2 | 9/2009 | Katou |
| 7,596,574 | B2 | 9/2009 | Sweeney |
| 7,606,168 | B2 | 10/2009 | Robinson et al. |
| 7,606,781 | B2 | 10/2009 | Sweeney et al. |
| 7,627,582 | B1 | 12/2009 | Ershov |
| 7,668,737 | B2 | 2/2010 | Streepy, Jr. |
| 7,711,672 | B2 | 5/2010 | Au |
| 7,716,207 | B2 | 5/2010 | Odom et al. |
| 7,716,216 | B1 | 5/2010 | Harik et al. |
| 7,720,857 | B2 | 5/2010 | Beringer et al. |
| 7,752,199 | B2 | 7/2010 | Farrell |
| 7,752,534 | B2 | 7/2010 | Blanchard, III et al. |
| 7,827,125 | B1 | 11/2010 | Rennison |
| 7,844,565 | B2 | 11/2010 | Sweeney |
| 7,849,090 | B2 | 12/2010 | Sweeney |
| 7,860,817 | B2 | 12/2010 | Sweeney et al. |
| 7,908,240 | B1 | 3/2011 | Mazzagatti et al. |
| 7,917,534 | B2 | 3/2011 | Demiroski et al. |
| 7,945,555 | B2 | 5/2011 | Sankaran et al. |
| 7,970,764 | B1 | 6/2011 | Ershov |
| 8,010,570 | B2 | 8/2011 | Sweeney |
| 8,281,238 | B2 | 10/2012 | Sweeney et al. |
| 8,385,971 | B2 | 2/2013 | Rhoads et al. |
| 8,849,860 | B2 | 9/2014 | Ilyas et al. |
| 9,104,779 | B2 | 8/2015 | Hunt et al. |
| 2002/0069197 | A1 | 6/2002 | Katayama et al. |
| 2002/0078044 | A1 | 6/2002 | Song et al. |
| 2002/0133483 | A1 | 9/2002 | Klenk et al. |
| 2002/0194187 | A1 | 12/2002 | McNeil et al. |
| 2003/0177112 | A1 | 9/2003 | Gardner |
| 2003/0196094 | A1 | 10/2003 | Hillis et al. |
| 2003/0217023 | A1 | 11/2003 | Cui et al. |
| 2003/0217335 | A1 | 11/2003 | Chung et al. |
| 2004/0010483 | A1 * | 1/2004 | Brands .............. G06F 17/30734 706/45 |
| 2004/0024739 | A1 | 2/2004 | Cooperman et al. |
| 2004/0049522 | A1 | 3/2004 | Streepy, Jr. |
| 2004/0054672 | A1 | 3/2004 | Tsuchitani et al. |
| 2004/0243395 | A1 | 12/2004 | Gluzberg et al. |
| 2005/0010428 | A1 | 1/2005 | Bergeron et al. |
| 2005/0065955 | A1 | 3/2005 | Babikov et al. |
| 2005/0086188 | A1 | 4/2005 | Hillis et al. |
| 2005/0131924 | A1 | 6/2005 | Jones |
| 2005/0149518 | A1 | 7/2005 | Duan et al. |
| 2005/0154708 | A1 | 7/2005 | Sun |
| 2005/0159921 | A1 * | 7/2005 | Louviere et al. .......... 702/181 |
| 2005/0209874 | A1 | 9/2005 | Rossini |
| 2005/0216320 | A1 | 9/2005 | Hattaway |
| 2005/0216335 | A1 | 9/2005 | Fikes et al. |
| 2005/0223109 | A1 | 10/2005 | Mamou et al. |

(56) References Cited

U.S. PATENT DOCUMENTS

| | | |
|---|---|---|
| 2005/0256907 A1 | 11/2005 | Novik et al. |
| 2005/0278362 A1 | 12/2005 | Maren et al. |
| 2005/0289524 A1 | 12/2005 | McGinnes |
| 2006/0010117 A1 | 1/2006 | Bonabeau et al. |
| 2006/0026147 A1 | 2/2006 | Cone et al. |
| 2006/0053172 A1 | 3/2006 | Gardner et al. |
| 2006/0074980 A1 | 4/2006 | Sarkar |
| 2006/0085489 A1 | 4/2006 | Tomic et al. |
| 2006/0129906 A1 | 6/2006 | Wall |
| 2006/0153083 A1 | 7/2006 | Wallenius |
| 2006/0195407 A1 | 8/2006 | Athelogou et al. |
| 2006/0242564 A1 | 10/2006 | Egger et al. |
| 2006/0271520 A1 | 11/2006 | Ragan |
| 2007/0010994 A1* | 1/2007 | Mueller .............. 704/9 |
| 2007/0033531 A1 | 2/2007 | Marsh |
| 2007/0036440 A1 | 2/2007 | Schaepe et al. |
| 2007/0038500 A1 | 2/2007 | Hammitt et al. |
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094221 A1 | 4/2007 | Au |
| 2007/0106658 A1 | 5/2007 | Ferrari et al. |
| 2007/0112819 A1* | 5/2007 | Dettinger .............. G06F 17/241 |
| 2007/0118394 A1 | 5/2007 | Cahoon |
| 2007/0118542 A1 | 5/2007 | Sweeney |
| 2007/0136221 A1 | 6/2007 | Sweeney et al. |
| 2007/0143300 A1 | 6/2007 | Gulli et al. |
| 2007/0174041 A1 | 7/2007 | Yeske |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0239792 A1 | 10/2007 | Chen et al. |
| 2007/0239892 A1 | 10/2007 | Ott et al. |
| 2007/0255731 A1 | 11/2007 | Maze |
| 2007/0282824 A1* | 12/2007 | Ellingsworth ............... 707/5 |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004844 A1 | 1/2008 | Kefford et al. |
| 2008/0004864 A1 | 1/2008 | Gabrilovich et al. |
| 2008/0021925 A1 | 1/2008 | Sweeney |
| 2008/0028084 A1 | 1/2008 | Bloching et al. |
| 2008/0036617 A1 | 2/2008 | Arms et al. |
| 2008/0059125 A1 | 3/2008 | Fraser et al. |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1 | 11/2008 | Calistri-Yeh et al. |
| 2008/0294584 A1 | 11/2008 | Herz |
| 2008/0294641 A1 | 11/2008 | Kim |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0055342 A1 | 2/2009 | Gong et al. |
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0319508 A1 | 12/2009 | Yih et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235285 A1* | 9/2010 | Hoffberg .............. 705/75 |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2010/0317420 A1* | 12/2010 | Hoffberg .............. 463/1 |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0271270 A1 | 11/2011 | Bowen |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2013/0046723 A1 | 2/2013 | Sweeney et al. |
| 2013/0066823 A1 | 3/2013 | Sweeney et al. |
| 2013/0246328 A1 | 9/2013 | Sweeney et al. |
| 2015/0302299 A1 | 10/2015 | Hunt et al. |

FOREIGN PATENT DOCUMENTS

| | | |
|---|---|---|
| CN | 1395193 A | 2/2003 |
| EP | 0 962 873 A1 | 12/1999 |
| JP | 06-168129 A | 6/1994 |
| JP | 09-288673 A | 11/1997 |
| JP | 2000-285122 A | 10/2000 |
| JP | 2001-243223 A | 9/2001 |
| JP | 2003-223465 A | 8/2003 |
| JP | 2008-242626 A | 10/2008 |
| JP | 2009-093655 A | 4/2009 |
| JP | 2009-146261 A | 7/2009 |
| JP | 2009-193584 A | 8/2009 |
| JP | 2010-009307 A | 1/2010 |
| JP | 20120528200 A | 3/2011 |
| JP | 20110506541 A | 7/2011 |
| JP | 20110524147 A | 1/2012 |
| JP | 20120538155 A | 3/2013 |
| JP | 20130516542 A | 8/2013 |
| JP | 20130087014 A | 10/2013 |
| JP | 20130547784 A | 1/2014 |

(56) References Cited

FOREIGN PATENT DOCUMENTS

| | | | |
|---|---|---|---|
| JP | 20130222881 A | 3/2014 |
| JP | 2014085995 A | 7/2014 |
| JP | 20140092256 A | 9/2014 |
| JP | 20140149123 A | 12/2014 |
| JP | 2015133144 A | 7/2015 |
| WO | WO 02/054292 A2 | 7/2002 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | WO 2008/025167 A1 | 3/2008 |
| WO | WO 2008/076438 A1 | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

International Search Report and Written Opinion for PCT/CA2007/001546 dated Dec. 28, 2007.
International Preliminary Report on Patentability for PCT/CA2007/001546 dated Dec. 19, 2008.
International Search Report and Written Opinion for PCT/CA2009/000567 dated Aug. 24, 2009.
International Preliminary Report on Patentability for PCT/CA2009/000567 dated Nov. 11, 2010.
International Search Report and Written Opinion for PCT/CA2009/001185 dated Dec. 3, 2009.
International Preliminary Report on Patentability for PCT/CA2009/001185 dated Mar. 10, 2011.
International Search Report and Written Opinion for PCT/CA2010/001382 dated Jan. 13, 2011.
International Preliminary Report on Patentability for PCT/CA2010/001382 dated Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 dated Oct. 13, 2011.
International Search Report and Written Opinion for PCT/CA2011/000719 dated Sep. 28, 2011.
International Search Report and Written Opinion for PCT/CA2011/000745 dated Sep. 22, 2011.
International Search Report and Written Opinion for PCT/CA2011/001382 dated Apr. 24, 2012.
International Search Report and Written Opinion for PCT/CA2011/001402, dated Apr. 24, 2012.
International Search Report and Written Opinion for PCT/CA2011/001403 dated May 23, 2012.
International Search Report and Written Opinion for PCT/CA2012/000007 dated Apr. 20, 2012.
International Search Report and Written Opinion for PCT/CA2012/000009 dated May 1, 2012.
Office Action for U.S. Appl. No. 11/625,452 dated Mar. 30, 2009.
Office Action for U.S. Appl. No. 11/625,452 dated Dec. 7, 2009.
Office Action for U.S. Appl. No. 11/625,452 dated Mar. 26, 2010.
Office Action for U.S. Appl. No. 12/477,994 dated Aug. 31, 2010.
Office Action for U.S. Appl. No. 12/477,977 dated Sep. 28, 2010.
Office Action for U.S. Appl. No. 11/469,258 dated Aug. 21, 2008.
Interview Summary for U.S. Appl. No. 11/469,258 dated Dec. 16, 2008.
Office Action for U.S. Appl. No. 11/550,457 dated Dec. 15, 2008.
Office Action for U.S. Appl. No. 12/556,349 dated Jun. 29, 2010.
Office Action for U.S. Appl. No. 12/441,100 dated Jun. 9, 2011.
Office Action for U.S. Appl. No. 12/441,100 dated Jan. 24, 2012.
Advisory Action for U.S. Appl. No. 12/441,100 dated May 4, 2012.
Office Action for U.S. Appl. No. 12/549,812 dated Oct. 1, 2012.
Office Action for U.S. Appl. No. 12/555,222 dated Jan. 27, 2012.
Office Action for U.S. Appl. No. 12/555,222 dated Oct. 31, 2012.
Office Action for U.S. Appl. No. 12/555,341 dated Feb. 9, 2012.
Office Action for U.S. Appl. No. 12/555,341 dated Aug. 1, 2012.
Office Action for U.S. Appl. No. 12/615,703 dated Feb. 1, 2012.
Office Action for U.S. Appl. No. 13/105,890 dated Jun. 26, 2012.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilisitc justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (bayes) at forty: The independence assumption in information retrieval. Lecture Notes in Computer Science. 1998;1398:4-15.
Ma et al., Semantic Information Extraction of Video Based on Ontology and Inference. ICSC 2007. International Conference on Semantic Computing. 2007;1:721-726. Digital Object Identifier: 10.1109/ ICSC.2007.12.

(56) References Cited

OTHER PUBLICATIONS

Metzler et al., A markov random field model for term dependencies. Proceedings of SIGIR 2005. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.
Seco et al., An intrinsic information content metric for semantic similarity in wordnet. Proceedings of 16th European Conference on Artifical Intelligence. 2004;1089-90.
Slavic et al., Core Requirements for Automation of Analytico-Synthetic Classifications. Advances in Knowledge Organization. 2004;9:187-192.
Song et al., A conceptual graph approach to semantic similarity computation method for e-service discovery. International Journal on Knowledge Engineering and Data Mining 2010;1(1):50-68.
Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.
Terra et al., Frequency estimates for statistical word similarity measures. Proceedings of 2003 Conference of the North American Chapter of the Association for Computational Linguistics on Human Language Technology. 2003:165-172.
Wang et al., Gene expression correlation and gene ontology-based similarity: An assesment of quantitative relationships. Proceedings of IEEE Symposium on Computational Intelligence in Bioinformatics and Computational Biology. 2004:25-31.
Wu et al., Interpreting tf-idf term weights as making relevance decisions. ACM Transactions on Information Systems. 2008;26(3):Article No. 13.
Zhai, Statistical language models for information retrieval—a critical review. Foundations and Trends in Information Retrieval. 2008;2(3):137-213.
Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.
International Preliminary Report on Patentability for PCT/CA2012/000009, dated Jul. 18, 2013.
Office Action for U.S. Appl. No. 13/345,637 dated Aug. 2, 2013.
International Preliminary Report on Patentability for International Application No. PCT/CA2011/000745 dated Jan. 10, 2013.
Office Action for U.S. Appl. No. 13/345,640 dated May 10, 2013.
Notice of Allowance for U.S. Appl. No. 13/165,423 dated Jan. 28, 2015.
Notice of Allowance for U.S. Appl. No. 13/165,423 dated Mar. 30, 2015.
Notice of Allowance for U.S. Appl. No. 13/345,640 dated Apr. 14, 2014.
Notice of Allowance for U.S. Appl. No. 13/345,640 dated Dec. 26, 2013.
Office Action for U.S. Appl. No. 13/165,423 dated Jan. 6, 2014.
Office Action for U.S. Appl. No. 13/345,637 dated Jul. 17, 2015.
Office Action for U.S. Appl. No. 13/345,637 dated Sep. 5, 2014.
Office Action for U.S. Appl. No. 13/609,218 dated Dec. 30, 2013.
Office Action for U.S. Appl. No. 13/609,218 dated Nov. 4, 2014.
Office Action for U.S. Appl. No. 14/788,589 dated Nov. 9, 2015.
Australian Office Action for Australian Application No. 2011269685 dated Nov. 25, 2014.
Chinese Office Action for Chinese Application No. 201180031005.5, dated Nov. 17, 2014.
Chinese Office Action for Chinese Application No. 201180031005.5, dated Sep. 24, 2014.
Ex Parte Quayle Action for U.S. Appl. No. 13/165,423 dated Sep. 9, 2014.
Interview Summary for U.S. Appl. No. 13/345,640 dated Dec. 5, 2013.
Japanese Office Action for Japanese Application No. 2013-515646 dated Mar. 31, 2015.
Japanese Office Action for Japanese Application No. 2013-547784 dated Nov. 4, 2015.
Karanikas et al., MetaOn—Ontology Driven Metadata Construction and Management for Intelligent Search in Text and Image Collections. IEEE. 2006. 5 pages.
IP Australia, Examination report No. 1 for AU Application No. 2015268637 dated Mar. 2, 2017.
CIPO, Office Action for CA Application No. 2,802,905 dated Mar. 16, 2017.
Israel Patent Office, Office Action for IL Application No. 223541 dated Jun. 21, 2016.
USPTO, Office Action for U.S. Appl. No. 13/345,637 dated Jan. 1, 2016.
Israel Patent Office, Office Action for IL Application No. 227202 dated May 1, 2016.
IP Australia, Patent Examination Report No. 1 for AU Application No. 2012205031 dated Jun. 21, 2016.
USPTO, Office Action for U.S. Appl. No. 13/609,225 dated Nov. 21, 2013.
USPTO, Office Action for U.S. Appl. No. 13/609,225 dated Oct. 6, 2014.
USPTO, Office Action for U.S. Appl. No. 13/345,637 dated Sep. 30, 2016.

\* cited by examiner

FIG. 8

| Rule / Input KR | Taxonomy | Synonym Ring | Thesaurus | Faceted Classification | Ontology |
|---|---|---|---|---|---|
| Rule 1: Coherent Concepts | X | X | X | X | X |
| Rule 2: Hierarchical Relationships | X | X | X | X | X |
| Rule 3: Synonym Concepts | | X | X | | |
| Rule 4: Related Concepts | | | X | X | X |
| Rule 5: Faceted Hierarchies | | | | X | X |
| Rule 6: Labeled Concepts | | | | X | X |

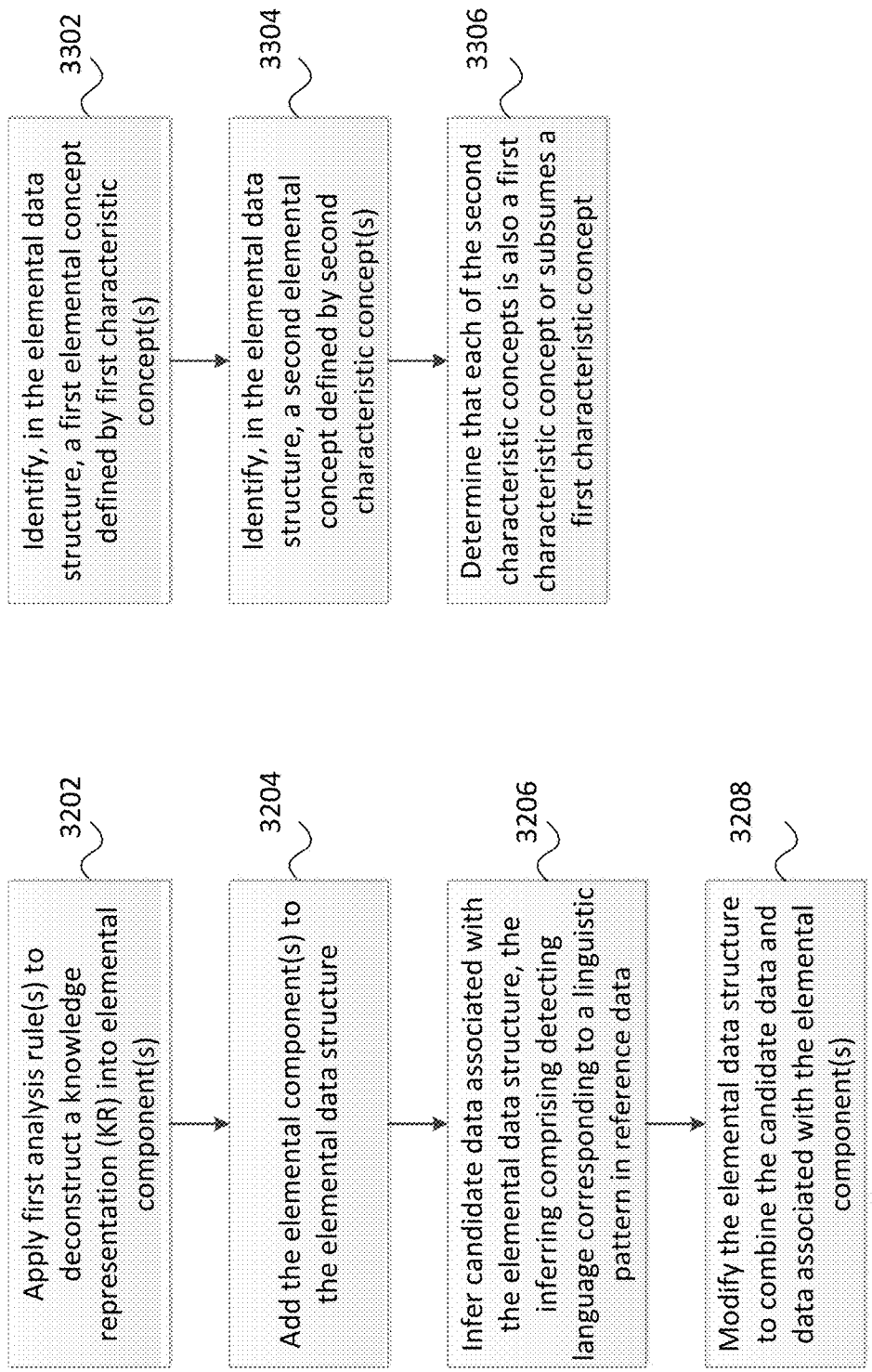

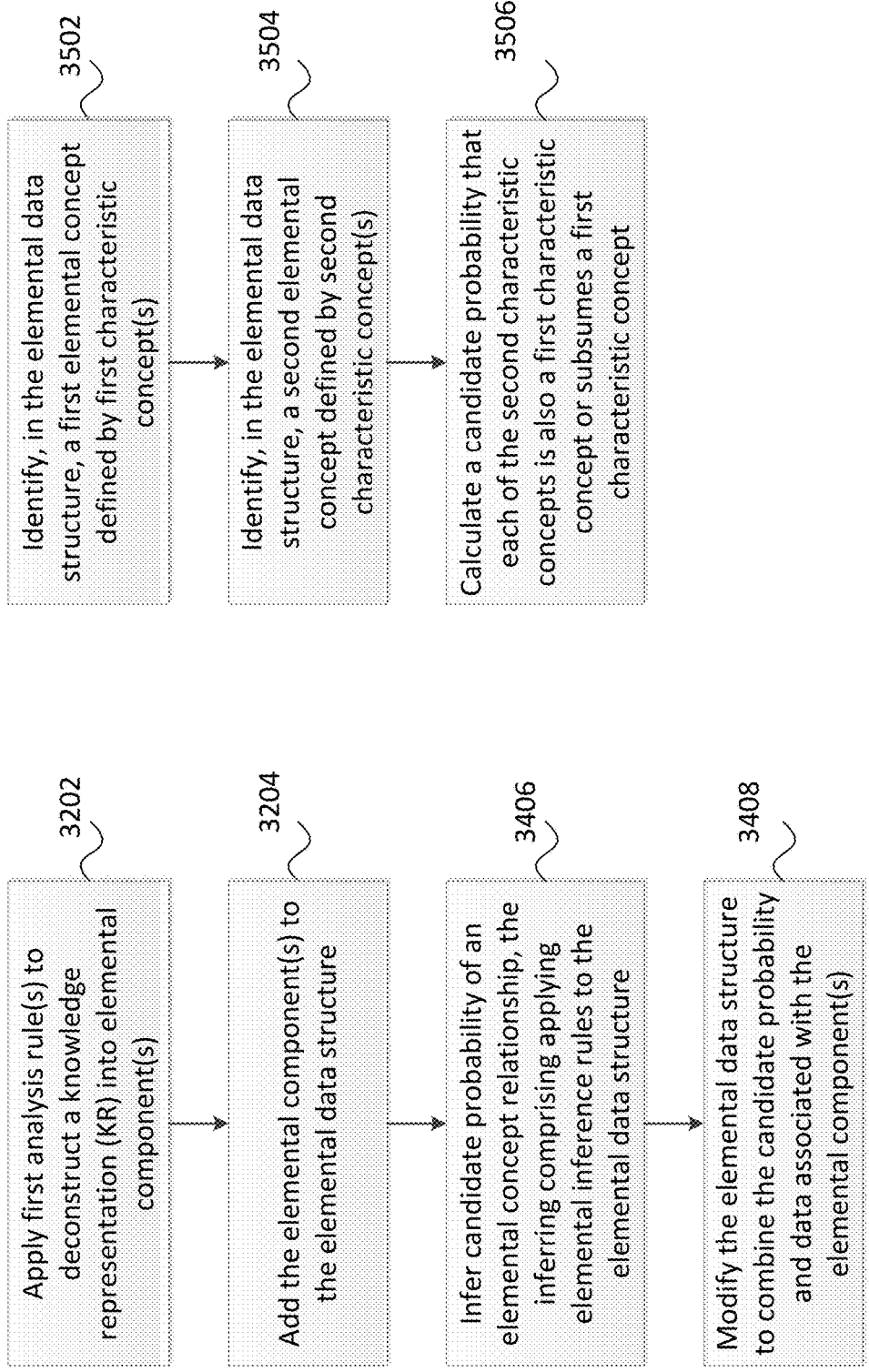

KNOWLEDGE REPRESENTATION SYSTEMS AND METHODS INCORPORATING INFERENCE RULES

CROSS-REFERENCE TO RELATED APPLICATIONS

The present application claims the benefit under 35 U.S.C. § 119(e) of U.S. Provisional Patent Application No. 61/430,836, titled "Constructing Knowledge Representations Using Atomic Semantics and Probabilistic Model," filed Jan. 7, 2011, and U.S. Provisional Patent Application No. 61/430,810, titled "Probabilistic Approach for Synthesis of a Semantic Network," filed Jan. 7, 2011, and U.S. Provisional Patent Application No. 61/471,964, titled "Methods and Systems for Modifying Knowledge Representations Using Textual Analysis Rules," filed Apr. 5, 2011, U.S. Provisional Patent Application No. 61/498,899, titled "Method and Apparatus for Preference Guided Data Exploration," filed Jun. 20, 2011, and U.S. Provisional Patent Application No. 61/532,330, titled "Systems and Methods for Incorporating User Models and Preferences Into Analysis and Synthesis of Complex Knowledge Representations, filed Sep. 8, 2011, all of which are hereby incorporated by reference in their entireties.

The present application is also a continuation-in-part of U.S. patent application Ser. No. 13/165,423, titled "Systems and Methods for Analyzing and Synthesizing Complex Knowledge Representations," filed Jun. 21, 2011, which application claims a priority benefit under 35 U.S.C. § 119(e) to U.S. Provisional Patent Application No. 61/357,266, titled "Systems and Methods for Analyzing and Synthesizing Complex Knowledge Representations, filed Jun. 22, 2010. U.S. patent application Ser. No. 13/165,423 is a continuation-in-part of U.S. patent application Ser. No. 12/477,977, titled "System, Method and Computer Program for Transforming an Existing Complex Data Structure to Another Complex Data Structure," filed Jun. 4, 2009, which application is a continuation of U.S. patent application Ser. No. 11/625,452, titled "System, Method and Computer Program for Faceted Classification Synthesis," filed Jan. 22, 2007, now U.S. Pat. No. 7,849,090, which application is a continuation-in-part of U.S. patent application Ser. No. 11/550,457, titled "System, Method and Computer Program for Facet Analysis," filed Oct. 18, 2006, now U.S. Pat. No. 7,606,781, which application is a continuation-in-part of U.S. patent application Ser. No. 11/469,258, titled "Complex-Adaptive System for Providing a Faceted Classification," filed Aug. 31, 2006, now U.S. Pat. No. 7,596,574, which application is a continuation-in-part of U.S. patent application Ser. No. 11/392,937, titled "System, Method, and Computer Program for Constructing and Managing Dimensional Information Structures," filed Mar. 30, 2006, which application claims a priority benefit under 35 U.S.C. § 119(e) to U.S. Provisional Patent Application No. 60/666,166, titled "System, Method and Computer Program for Constructing and Managing Multi-Dimensional Information Structures in a Decentralized Collaborative Environment," filed Mar. 30, 2005. All of the foregoing applications are hereby incorporated by reference in their entireties.

BACKGROUND

Broadly, knowledge representation is the activity of making abstract knowledge explicit, as concrete data structures, to support machine-based storage, management (e.g., information location and extraction), and reasoning systems. Conventional methods and systems exist for utilizing knowledge representations (KRs) constructed in accordance with various types of knowledge representation models, including structured controlled vocabularies such as taxonomies, thesauri and faceted classifications; formal specifications such as semantic networks and ontologies; and unstructured forms such as documents based in natural language.

A taxonomy is a KR structure that organizes categories into a hierarchical tree and associates categories with relevant objects such as physical items, documents or other digital content. Categories or concepts in taxonomies are typically organized in terms of inheritance relationships, also known as supertype-subtype relationships, generalization-specialization relationships, or parent-child relationships. In such relationships, the child category or concept has the same properties, behaviors and constraints as its parent plus one or more additional properties, behaviors or constraints. For example, the statement of knowledge, "a dog is a mammal," can be encoded in a taxonomy by concepts/categories labeled "mammal" and "dog" linked by a parent-child hierarchical relationship. Such a representation encodes the knowledge that a dog (child concept) is a type of mammal (parent concept), but not every mammal is necessarily a dog.

A thesaurus is a KR representing terms such as search keys used for information retrieval, often encoded as single-word noun concepts. Links between terms/concepts in thesauri are typically divided into the following three types of relationships: hierarchical relationships, equivalency relationships and associative relationships. Hierarchical relationships are used to link terms that are narrower and broader in scope than each other, similar to the relationships between concepts in a taxonomy. To continue the previous example, "dog" and "mammal" are terms linked by a hierarchical relationship. Equivalency relationships link terms that can be substituted for each other as search terms, such as synonyms or near-synonyms. For example, the terms "dog" and "canine" could be linked through an equivalency relationship in some contexts. Associative relationships link related terms whose relationship is neither hierarchical nor equivalent. For example, a user searching for the term "dog" may also want to see items returned from a search for "breeder", and an associative relationship could be encoded in the thesaurus data structure for that pair of terms.

Faceted classification is based on the principle that information has a multi-dimensional quality, and can be classified in many different ways. Subjects of an informational domain are subdivided into facets (or more simply, categories) to represent this dimensionality. The attributes of the domain are related in facet hierarchies. The objects within the domain are then described and classified based on these attributes. For example, a collection of clothing being offered for sale in a physical or web-based clothing store could be classified using a color facet, a material facet, a style facet, etc., with each facet having a number of hierarchical attributes representing different types of colors, materials, styles, etc. Faceted classification is often used in faceted search systems, for example to allow a user to search the collection of clothing by any desired ordering of facets, such as by color-then-style, by style-then-color, by material-then-color-then-style, or by any other desired prioritization of facets. Such faceted classification contrasts with classification through a taxonomy, in which the hierarchy of categories is fixed.

A semantic network is a KR that represents various types of semantic relationships between concepts using a network structure (or a data structure that encodes or instantiates a network structure). A semantic network is typically represented as a directed or undirected graph consisting of vertices representing concepts, and edges representing relationships linking pairs of concepts. An example of a semantic network is WordNet, a lexical database of the English language. Some common types of semantic relationships defined in WordNet are meronymy (A is part of B), hyponymy (A is a kind of B), synonymy (A denotes the same as B) and antonymy (A denotes the opposite of B). References to a sematic network or other KRs as being represented by a graph should be understood as indicating that a semantic network or other KR may be encoded into a data structure in a computer-readable memory or file or similar organization, wherein the structure of the data storage or the tagging of data therein serves to identify for each datum its significance to other data—e.g., whether it is intended as the value of a node or an end point of an edge or the weighting of an edge, etc.

An ontology is a KR structure encoding concepts and relationships between those concepts that is restricted to a particular domain of the real or virtual world that it is used to model. The concepts included in an ontology typically represent the particular meanings of terms as they apply to the domain being modeled or classified, and the included concept relationships typically represent the ways in which those concepts are related within the domain. For example, concepts corresponding to the word "card" could have different meanings in an ontology about the domain of poker and an ontology about the domain of computer hardware.

In general, all of the above-discussed types of KRs, as well as other conventional examples, are tools for modeling human knowledge in terms of abstract concepts and the relationships between those concepts, and for making that knowledge accessible to machines such as computers for performing various knowledge-requiring tasks. As such, human users and software developers conventionally construct KR data structures using their human knowledge, and manually encode the completed KR data structures into machine-readable form as data structures to be stored in machine memory and accessed by various machine-executed functions.

SUMMARY

The inventive concepts presented herein are illustrated in a number of different embodiments, each showing one or more concepts, though it should be understood that, in general, the concepts are not mutually exclusive and may be used in combination even when not so illustrated.

One embodiment is directed to a method for generating a complex knowledge representation, the method comprising receiving input indicating a request context; applying, with a processor, one or more rules to an elemental data structure representing at least one elemental concept, at least one elemental concept relationship, or at least one elemental concept and at least one elemental concept relationship; based on the application of the one or more rules, synthesizing, in accordance with the request context, one or more additional concepts, one or more additional concept relationships, or one or more additional concepts and one or more additional concept relationships; and using at least one of the additional concepts, at least one of the additional concept relationships, or at least one of the additional concepts and at least one of the additional concept relationships, generating a complex knowledge representation in accordance with the request context.

Another embodiment is directed to a system for generating a complex knowledge representation, the system comprising at least one non-transitory computer-readable storage medium storing processor-executable instructions that, when executed by at least one processor, perform receiving input indicating a request context, applying one or more rules to an elemental data structure representing at least one elemental concept, at least one elemental concept relationship, or at least one elemental concept and at least one elemental concept relationship, based on the application of the one or more rules, synthesizing, in accordance with the request context, one or more additional concepts, one or more additional concept relationships, or one or more additional concepts and one or more additional concept relationships, and using at least one of the additional concepts, at least one of the additional concept relationships, or at least one of the additional concepts and at least one of the additional concept relationships, generating a complex knowledge representation in accordance with the request context.

Another embodiment is directed to at least one non-transitory computer-readable storage medium encoded with a plurality of computer-executable instructions for generating a complex knowledge representation, wherein the instructions, when executed, perform receiving input indicating a request context; applying one or more rules to an elemental data structure representing at least one elemental concept, at least one elemental concept relationship, or at least one elemental concept and at least one elemental concept relationship; based on the application of the one or more rules, synthesizing, in accordance with the request context, one or more additional concepts, one or more additional concept relationships, or one or more additional concepts and one or more additional concept relationships; and using at least one of the additional concepts, at least one of the additional concept relationships, or at least one of the additional concepts and at least one of the additional concept relationships, generating a complex knowledge representation in accordance with the request context.

Another embodiment is directed to a method for deconstructing an original knowledge representation, the method comprising receiving input corresponding to the original knowledge representation; applying, with a processor, one or more rules to deconstruct the original knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships in an elemental data structure.

Another embodiment is directed to a system for deconstructing an original knowledge representation, the system comprising at least one non-transitory computer-readable storage medium storing processor-executable instructions that, when executed by at least one processor, perform receiving input corresponding to an original knowledge representation, applying one or more rules to deconstruct the original knowledge representation into one or more elemental concepts, one or more elemental concept relationships, or one or more elemental concepts and one or more elemental concept relationships, and including representation of at least one of the elemental concepts, at least one of the elemental concept relationships, or at least one of the elemental concepts and at least one of the elemental concept relationships in an elemental data structure.

Another embodiment is directed to at least one non-transitory computer-readable storage medium encoded with a plurality of computer-executable instructions for deconstructing an original knowledge representation, wherein the instructions, when executed, perform receiving input corresponding to the original knowledge representation; applying one or more rules to deconstruct the original knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships in an elemental data structure.

Another embodiment is directed to a method for supporting semantic interoperability between knowledge representations, the method comprising, for each input knowledge representation of a plurality of input knowledge representations, applying, with a processor, one or more rules to deconstruct the input knowledge representation into one or more elemental concepts, one or more elemental concept relationships, or one or more elemental concepts and one or more elemental concept relationships; and with a processor, including representation of at least one of the elemental concepts, at least one of the elemental concept relationships, or at least one of the elemental concepts and at least one of the elemental concept relationships for each of the plurality of input knowledge representations in a shared elemental data structure.

Another embodiment is directed to a system for supporting semantic interoperability between knowledge representations, the system comprising at least one non-transitory computer-readable storage medium storing processor-executable instructions that, when executed by at least one processor, perform, for each input knowledge representation of a plurality of input knowledge representations, applying one or more rules to deconstruct the input knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships for each of the plurality of input knowledge representations in a shared elemental data structure.

Another embodiment is directed to at least one non-transitory computer-readable storage medium encoded with a plurality of computer-executable instructions for supporting semantic interoperability between knowledge representations, wherein the instructions, when executed, perform, for each input knowledge representation of a plurality of input knowledge representations, applying one or more rules to deconstruct the input knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships for each of the plurality of input knowledge representations in a shared elemental data structure.

One aspect of this disclosure relates to a method of processing a knowledge representation based at least in part on context information. In some embodiments, the context information may comprise preference information, and the method may comprise synthesizing a complex knowledge representation based at least in part on the preference information. In some embodiments, the preference information may comprise a preference model or may be used to create a preference model. In some embodiments, the preference model may contain weights assigned to concepts based on the preference information.

In some embodiments of this aspect of the disclosure, the method may comprise synthesizing, during formation of the complex knowledge representation, more concepts that are related to a more heavily-weighted concept in the preference model, and synthesizing fewer concepts that are related to a less heavily-weighted concept in the preference model. In some embodiments, the method may comprise synthesizing, during formation of the complex knowledge representation, concepts that are related to a more heavily-weighted concept in the preference model before synthesizing concepts that are related to a less heavily-weighted concept in the preference model.

In some embodiments of this aspect of the disclosure, the method may comprise assigning rankings to the synthesized concepts in accordance with the preference information. In some embodiments, the method may comprise delivering the synthesized concepts to a user interface or a data consumer model in rank order.

Another aspect of this disclosure relates to a computer readable storage medium encoded with instructions that, when executed on a computer, cause the computer to implement some embodiment(s) of the aforementioned method.

Another aspect of this disclosure relates to a system for processing a knowledge representation based at least in part on user information. In some embodiments, the system may comprise a synthesis engine (e.g., programmed processor(s)) configured to synthesize a complex knowledge representation based at least in part on preference information. In some embodiments, the system may comprise a preference engine (e.g., programmed processor(s)) configured to provide a preference model based at least in part on the preference information. In some embodiments, the preference model may contain weights assigned to concepts based on the preference information.

In some embodiments of this aspect of the disclosure, the synthesis engine may be configured to synthesize, during formation of the complex knowledge representation, more concepts that are related to a more heavily-weighted concept in the preference model, and configured to synthesize fewer concepts that are related to a less heavily-weighted concept in the preference model. In some embodiments, the synthesis engine may, during formation of the complex knowledge representation, be configured to synthesize concepts in the complex knowledge representation that are related to a more heavily-weighted concept in the preference model before synthesizing concepts in the complex knowledge representation that are related to a less heavily-weighted concept in the preference model.

In some embodiments of this aspect of the disclosure, the preference engine may be configured to assign rankings to the synthesized concepts in accordance with the preference information. In some embodiments, the preference engine may be configured to deliver the synthesized concepts to a user interface or a data consumer model in rank order.

The foregoing is a non-limiting summary of the invention, which is defined by the attached claims, it being understood that this summary does not necessarily describe the subject matter of each claim and that each claim is related to only one or some, but not all, embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8 is a table illustrating an exemplary set of knowledge processing rules in accordance with some embodiments of the present invention;

FIG. 32 is a flow chart of an exemplary process of modifying an elemental data structure based on inference;

FIG. 33 is a flow chart of an exemplary process of inferring candidate data associated with an elemental data structure;

FIG. 34 is a flow chart of an exemplary process of modifying an elemental data structure based on inference of a probability;

FIG. 35 is a flow chart of an exemplary process of inferring a candidate probability associated with an elemental data structure;

DETAILED DESCRIPTION

I. Atomic Knowledge Representation Model (AKRM)

Figure 1:
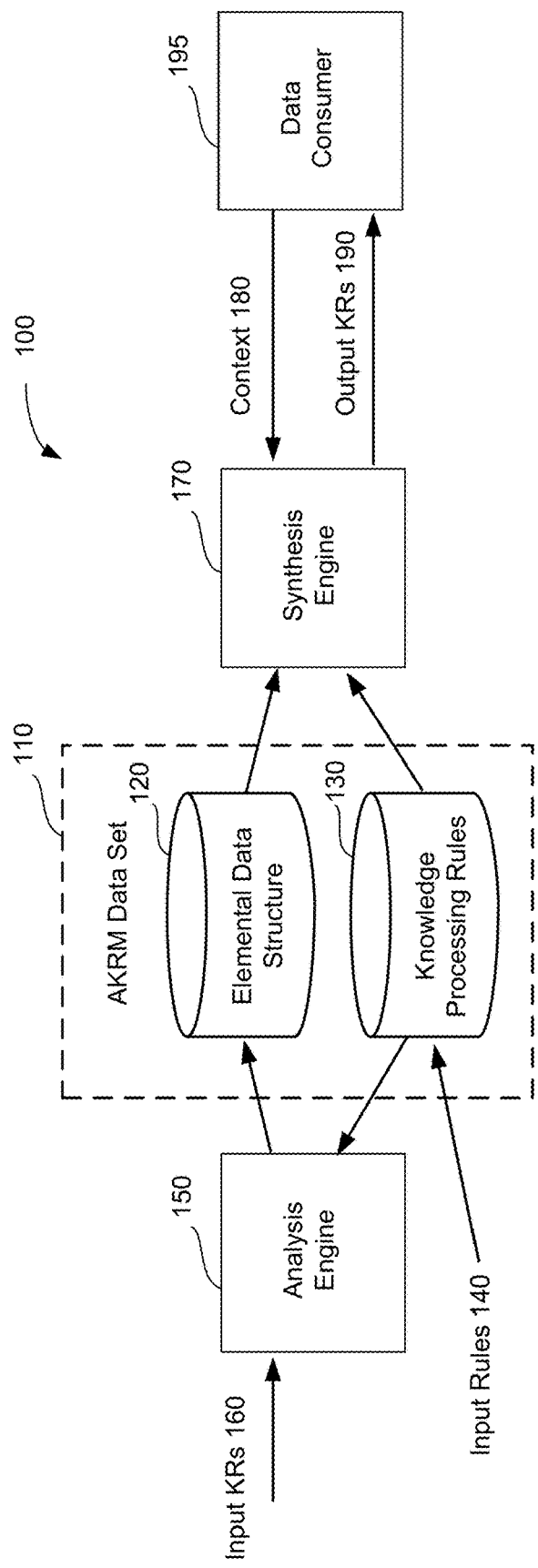
FIG. 1 is a block diagram illustrating an exemplary system for implementing an atomic knowledge representation model in accordance with some embodiments of the present invention.

As discussed above, a knowledge representation (KR) data structure created through conventional methods encodes and represents a particular set of human knowledge being modeled for a particular domain or context. As KRs are typically constructed by human developers and programmed in completed form into machine memory, a conventional KR contains only that subset of human knowledge with which it is originally programmed by a human user.

For example, a KR might encode the knowledge statement, "a dog is a mammal," and it may also express statements or assertions about animals that are mammals, such as, "mammals produce milk to feed their young." Such a combination of facts, when combined with appropriate logical and semantic rules, can support a broad range of human reasoning, making explicit various inferences that were not initially seeded as fact within the KR, such as, "dogs produce milk to feed their young." Expansions of KR data structures through such inferences may be used to support a variety of knowledge-based activities and tasks, such as inference/reasoning (as illustrated above), information retrieval, data mining, and other forms of analysis.

However, as discussed above, methods for constructing and encoding KRs have conventionally been limited to manual input of complete KR structures for access and use by machines such as computers. Continuing the example above, although a human person acting as the KR designer may implicitly understand why the fact "dogs produce milk to feed their young" is true, the properties that must hold to make it true (in this case, properties such as transitivity and inheritance) are not conventionally an explicit part of the KR. In other words, any underlying set of rules that may guide the creation of new knowledge is not conventionally encoded as part of the KR, but rather is applied from outside the system in the construction of the KR by a human designer.

A previously unrecognized consequence of conventional approaches is that knowledge can be expressed in a KR for use by machines, but the KR itself cannot be created by machines. Humans are forced to model domains of knowledge for machine consumption. Unfortunately, because human knowledge is so tremendously broad and in many cases subjective, it is not technically feasible to model all knowledge domains.

Furthermore, since so much of the knowledge must be explicitly encoded as data, the resulting data structures quickly become overwhelmingly large as the domain of knowledge grows. Since conventional KRs are not encoded with their underlying theories or practices for knowledge creation as part of the data making up the knowledge representation model, their resulting data structures can become very complex and unwieldy. In other words, since the knowledge representation cannot be created by the machine, it conventionally must either be provided as explicit data or otherwise deduced or induced by logical or statistical means.

Thus, conventional approaches to constructing knowledge representations may lead to a number of problems including difficulty scaling as data size increases, difficulty dealing with complex and large data structures, dependence on domain experts, high costs associated with large-scale data storage and processing, challenges related to integration and interoperability, and high labor costs.

Large and complex data structures: The data structures that conventionally encode knowledge representations are complex to build and maintain. Even a relatively simple domain of machine-readable knowledge (such as simple statements about dogs and mammals) can generate a volume of data that is orders of magnitude greater than its natural language counterpart.

Dependency on domain experts: The underlying theories that direct the practice of KR must be expressed by human beings in the conventional creation of a KR data structure. This is a time-consuming activity that excludes most people and all machines in the production of these vital data assets. As a result, most of human knowledge heretofore has remained implicit and outside the realm of computing.

Data created before use: Knowledge is conventionally modeled as data before such time as it is called for a particular use, which is expensive and potentially wasteful if that knowledge is not needed. Accordingly, if the knowledge could be created by machines as needed, it could greatly decrease data production and storage requirements.

Large-scale data and processing costs: Conventional KR systems must reason over very large data structures in the service of creating new facts or answering queries. This burden of scale represents a significant challenge in conventional KR systems, a burden that could be reduced by using more of a just-in-time method for creating the underlying data structures, rather than the conventional data-before-use methods.

Integration and interoperability challenges: Semantic interoperability (the ability for two different KRs to share knowledge) is a massively difficult challenge when various KRs are created under different models and expressed in different ways, often dealing with subjective and ambiguous subjects. Precision and the ability to reason accurately are often lost across multiple different KRs. In this respect, if the underlying theories for how the knowledge was created were included as part of the KR, then reconciliation of knowledge across different KRs may become a tractable problem.

High labor costs: Manual construction of a KR data structure may be a labor-intensive process. Accordingly, manual construction techniques may be insufficient to handle a corpus of information that is already enormous and continually increasing in size.

Accordingly, some embodiments in accordance with the present disclosure provide a system that encodes knowledge creation rules to automate the process of creating knowledge representations. Some embodiments employ probabilistic methods to assist in the creation of knowledge representations and/or to check their semantic coherence. Some embodiments combine new synthetic approaches to knowledge representation with computing systems for creating and managing the resulting data structures derived from such approaches. In some embodiments, an estimate of a semantic coherence of first and second concepts having first and second labels, respectively, may be obtained by calculating a frequency of co-occurrence of the first and second labels in a corpus of reference documents.

Rather than modeling all the knowledge in the domain as explicit data, some embodiments combine a less voluminous data set of 'atomic' or 'elemental' data with a set of generative rules that encode the underlying knowledge creation. Such rules may be applied by the system in some embodiments when needed or desired to create new knowledge and express it explicitly as data. It should be appreciated from the above discussion that a benefit of such techniques may be, in at least some situations, to reduce the amount of data in the system substantially, as well as to provide new capabilities and applications for machine-based creation (synthesis) of new knowledge. However, it should be appreciated that not every embodiment in accordance with the present invention may address every identified problem of conventional approaches, and some embodiments may not address any of these problems. Some embodiments may also address problems other than those recited here. Moreover, not every embodiment may provide all or any of the benefits discussed herein, and some embodiments may provide other benefits not recited.

Some embodiments also provide techniques for complex knowledge representations such as taxonomies, ontologies, and faceted classifications to interoperate, not just at the data level, but also at the semantic level (interoperability of meaning).

Other benefits that may be afforded in some embodiments and may be applied across many new and existing application areas include: lower costs in both production and application of knowledge representations afforded by simpler and more economical data structures; possibilities for new knowledge creation; more scalable systems afforded by just-in-time, as-needed knowledge; and support of "context" from users and data consumers as input variables. The dynamic nature of some embodiments in accordance with the present disclosure, which apply synthesis and analysis knowledge processing rules on a just-in-time basis to create knowledge representation data structures, may provide more economical benefits than conventional methods that analyze and model an entire domain of knowledge up front.

By incorporating an underlying set of rules of knowledge creation within the KR, the amount of data in the system may be reduced, providing a more economical system of data management, and providing entirely new applications for knowledge management. Thus, in some embodiments, the cost of production and maintenance of KR systems may be lowered by reducing data scalability burdens, with data not created unless it is needed. Once created, the data structures that model the complex knowledge in some embodiments are comparatively smaller than in conventional systems, in that they contain the data relevant to the task at hand. This in turn may reduce the costs of downstream applications such as inference engines or data mining tools that work over these knowledge models.

The synthetic, calculated approach of some embodiments in accordance with the present disclosure also supports entirely new capabilities in knowledge representation and data management. Some embodiments may provide improved support for "possibility", i.e., creating representations of entirely new knowledge out of existing data. For example, such capability of possibility may be useful for creative activities such as education, journalism, and the arts.

Figure 11:
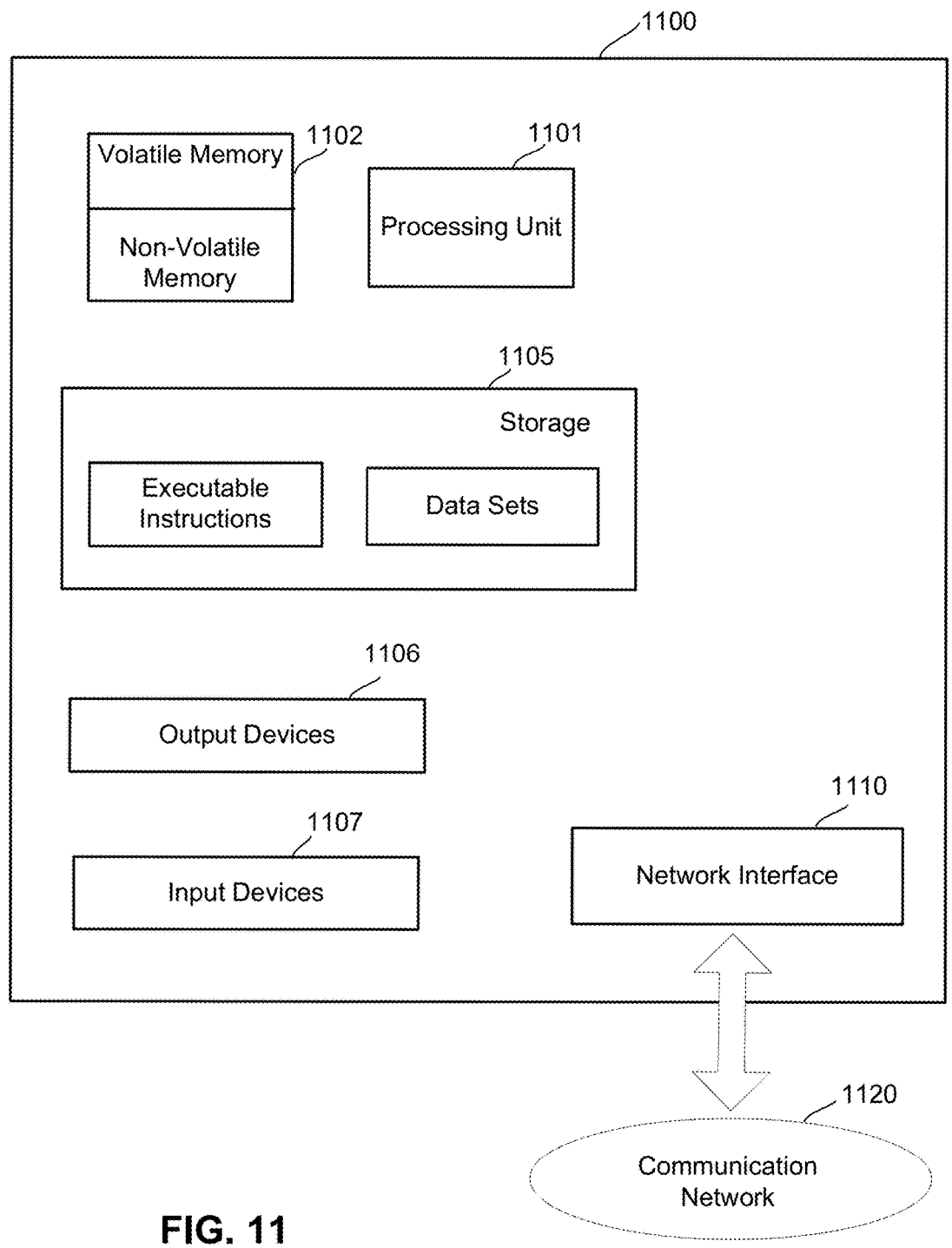
FIG. 11 is a block diagram illustrating an exemplary computing system for use in practicing some embodiments of the present invention.

Various inventive aspects described herein may be implemented by one or more computers and/or devices each having one or more processors that may be programmed to take any of the actions described herein for using an atomic knowledge representation model in analysis and synthesis of complex knowledge representations. For example, FIG. 11 shows, schematically, an illustrative computer 1100 on which various inventive aspects of the present disclosure may be implemented. The computer 1100 includes a processor or processing unit 1101 and a memory 1102 that may include volatile and/or non-volatile memory. The memory 1102 may store computer-readable instructions which, when executed on processor 1101, cause the computer to perform the inventive techniques described herein. Techniques for implementing the inventive aspects described herein, e.g. programming a computer to implement the methods and data structures described herein, are believed to be within the skill in the art.

FIG. 1 illustrates an exemplary system 100 that may be employed in some embodiments for implementing an atomic knowledge representation model (AKRM) involved in analysis and synthesis of complex knowledge representations (KRs), in accordance with some embodiments of the present invention. In an exemplary system 100, an AKRM may be encoded as computer-readable data and stored on one or more tangible, non-transitory computer-readable storage media. For example, an AKRM may be stored in a data set 110 in non-volatile computer memory, examples of which are given below, with a data schema designed to support both elemental and complex knowledge representation data structures.

In some embodiments, an AKRM may include one or more elemental data structures 120 and one or more knowledge processing rules 130. In some embodiments, rules 130 may be used by system 100 to deconstruct (analyze) one or more complex KRs to generate an elemental data structure 120. For example, system 100 may include one or more computer processors and one or more computer memory hardware components, and the memory may be encoded with computer-executable instructions that, when executed by the one or more processors, cause the one or more processors of system 100 to use the rules 130 in the analysis of one or more complex KRs to generate elemental data structure 120 of the AKRM. The memory may also be encoded with instructions that program the one or more processors to use the rules 130 to synthesize new complex KRs from elemental data structure 120. In some embodiments, the computer memory may be implemented as one or more tangible, non-transitory computer-readable storage media encoded with computer-executable instructions that, when executed, cause one or more processors to perform any of the functions described herein.

Unlike previous knowledge representation systems, a system in accordance with some embodiments of the present invention, such as system 100, may combine data structures and knowledge processing rules to create knowledge representation models encoded as data. In some embodiments, rules may not be encoded as knowledge (e.g., as rules or axioms that describe the boundaries or constraints of knowledge within a particular domain), but rather as constructive and deconstructive rules for creating the data structures that represent new knowledge. In addition to "inference rules" for generating implicit facts that are logical consequences of the explicit concepts given by an original KR, in some embodiments a knowledge representation model may be encoded with "knowledge processing rules" that can be applied to create new knowledge that may not be implicit from the original KR data structure.

For example, starting with two explicit knowledge statements, "Mary is a person," and, "All people are humans," inference rules may be applied to determine the implicit knowledge statement, "Mary is a human," which is a logical consequence of the previous two statements. In a different example in accordance with some embodiments of the present invention, starting with two explicit knowledge statements, "Mary is a friend of Bob," and, "Bob is a friend of Charlie," exemplary knowledge processing rules modeling the meaning of friendship relationships may be applied to determine the new knowledge statement, "Mary is a friend of Charlie." Notably, application of such knowledge processing rules may result in new knowledge that is not necessarily a logical consequence of the explicit knowledge given in an original input KR. As described above, a knowledge representation model in accordance with some embodiments of the present invention, including knowledge processing rules (as opposed to or in addition to logical inference rules) stored in association with data structures encoding concepts and concept relationships, may model frameworks of how new and potentially non-implicit knowledge can be created and/or decomposed.

Such focus on the synthesis of knowledge may move a system such as system 100 into new application areas. Whereas existing systems focus on deductive reasoning (i.e., in which insights are gleaned through precise deductions of existing facts and arguments), a system in accordance with some embodiments of the present invention may support inductive reasoning as well as other types of theory-building (i.e., in which existing facts may be used to support probabilistic predictions of new knowledge).

In some embodiments in accordance with the present invention, a system such as system 100 may be based loosely on frameworks of conceptual semantics, encoding semantic primitives (e.g., "atomic" or "elemental" concepts) and rules (principles) that guide how such atomic structures can be combined to create more complex knowledge. It should be appreciated, however, that a system in accordance with embodiments of the present invention may function within many such frameworks, as aspects of the present invention are not limited to any particular theory, model or practice of knowledge representation. In some embodiments, a system such as system 100 may be designed to interface with a broad range of methods and technologies (e.g., implemented as software applications or components) that model these frameworks. For example, interfacing analysis components such as analysis engine 150 may deconstruct input complex KRs 160 to elemental data structures 120. Synthesis components such as synthesis engine 170 may construct new output complex KRs 190 using elemental data structures 120.

The synthesis engine 170 may provide an output KR 190 using techniques known in the art or any other suitable techniques. For example, output KR 190 may be provided as a tabular or graphical data structure stored in a computer-readable medium. Alternatively or additionally, output KR 190 may be displayed on a monitor or any other suitable interface.

In some embodiments, analysis engine 150 may, for example through execution of appropriate computer-readable instructions by one or more processors of system 100, analyze an input complex KR 160 by applying one or more of the knowledge processing rules 130 to deconstruct the data structure of the input KR 160 to more elemental constructs. In some embodiments, the most elemental constructs included within the elemental data structure 120 of AKRM 110 may represent a minimum set of fundamental building blocks of information and information relationships which in the aggregate provide the information-carrying capacity with which to classify the input data structure. Input KR 160 may be obtained from any suitable source, including direct input from a user or software application interacting with system 100. In some embodiments, input KRs 160 may be obtained through interfacing with various database technologies, such as a relational or graph-based database system. It should be appreciated that input KRs 160 may be obtained in any suitable way in any suitable form, as aspects of the present invention are not limited in this respect.

Figure 2A:
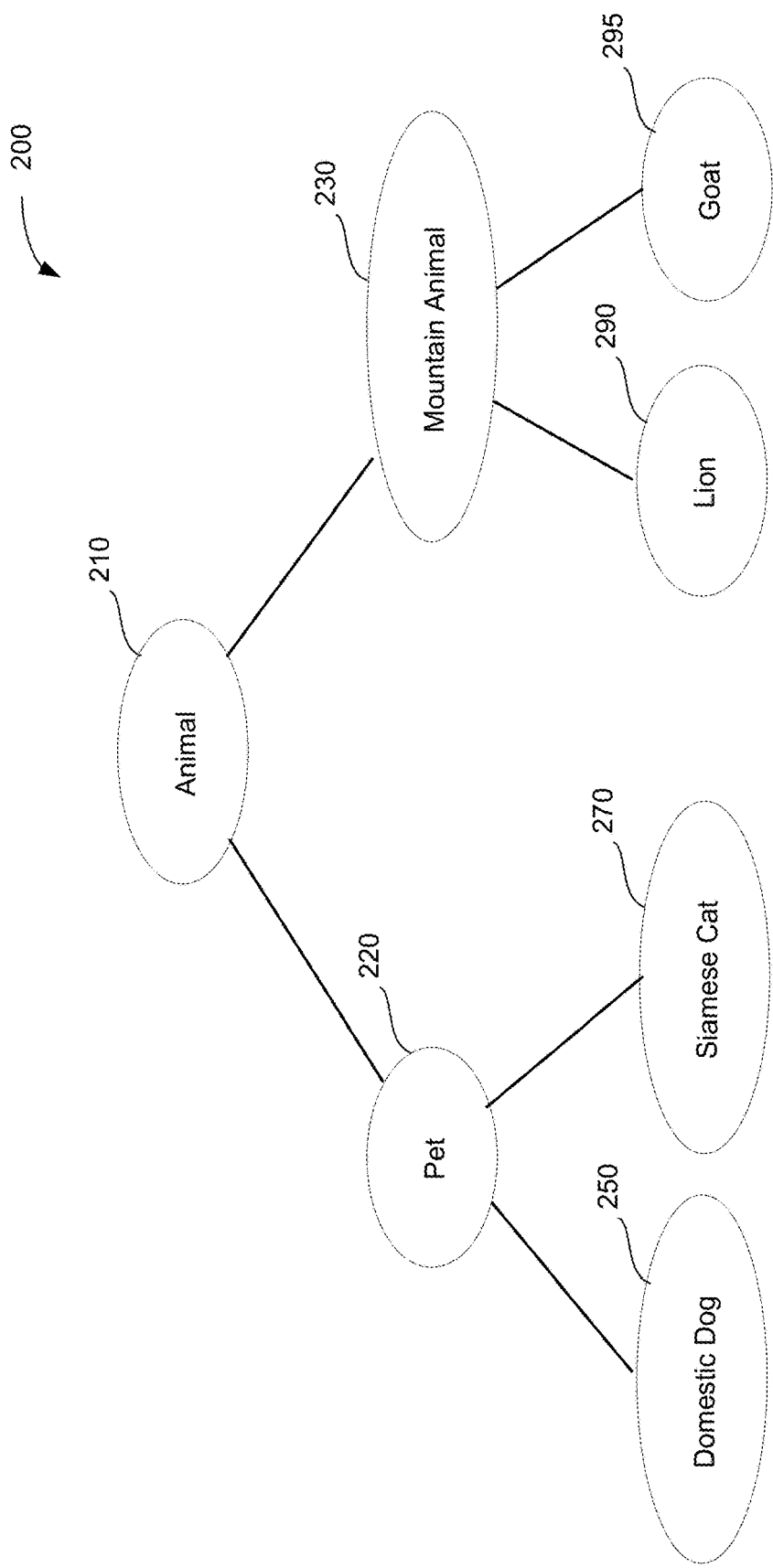
FIG. 2A illustrates an exemplary complex knowledge representation in accordance with some embodiments of the present invention.

For example, FIG. 2A illustrates a small complex KR 200 (in this example, a taxonomy) that may be input to analysis engine 150, e.g., by a user or a software application using system 100. Complex KR 200 includes a set of concepts linked by various hierarchical relationships. For example, concept 210 labeled "Animal" is linked in parent-child relationships to concept 220 labeled "Pet" and concept 230 labeled "Mountain Animal". At each level of the hierarchy, a concept entity represents a unit of meaning that can be combined to create more complex semantics or possibly deconstructed to more elemental semantics. For example, the complex meaning of "Mountain Animal" may comprise the concepts "Mountain" and "Animal".

Figure 2B:
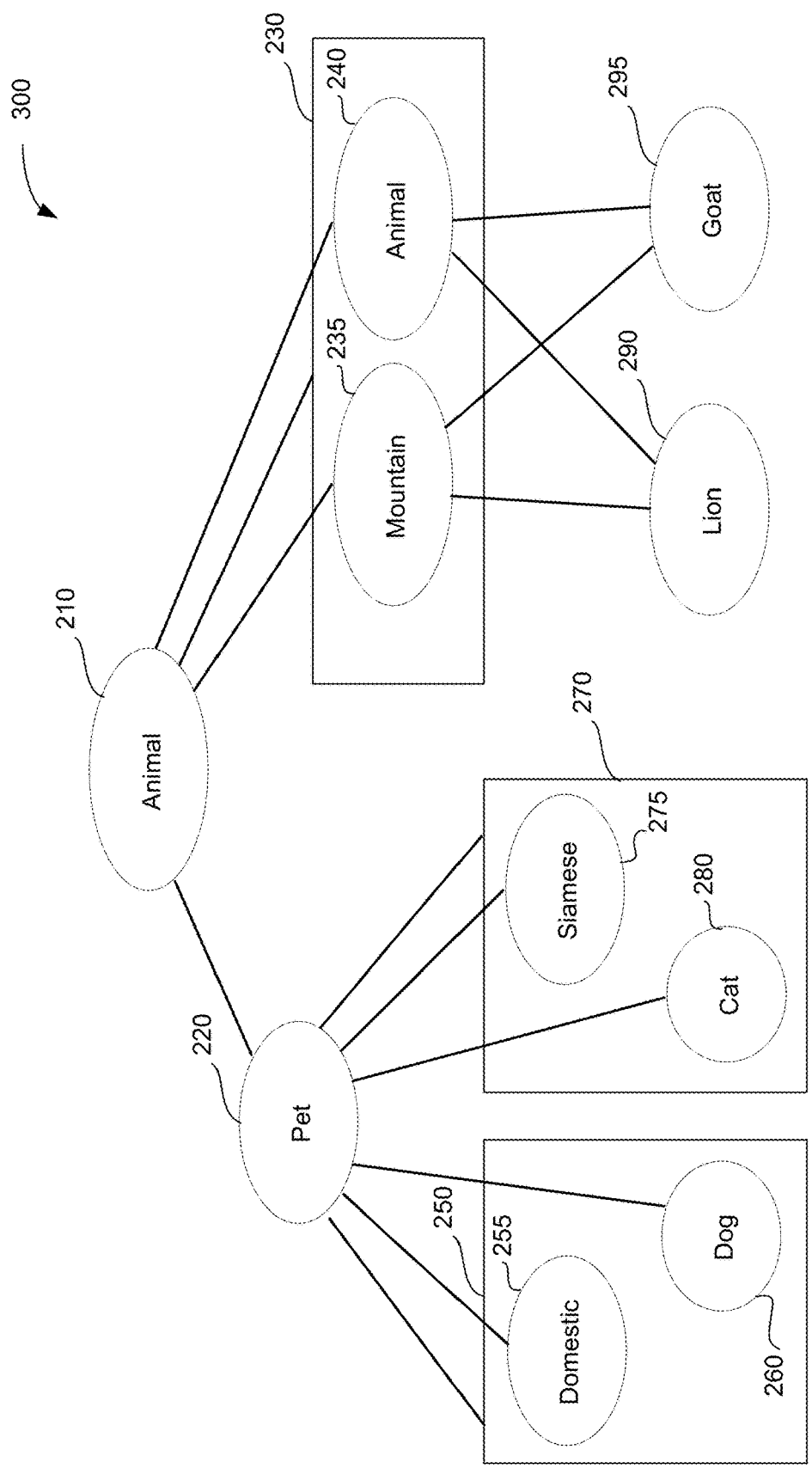
FIG. 2B illustrates an exemplary elemental data structure of an atomic knowledge representation model in accordance with some embodiments of the present invention.

In some embodiments, system 100 may, e.g., through analysis engine 150, deconstruct a complex KR such as complex KR 200 to discover at least some of the elemental concepts that comprise complex concepts of the complex KR. For example, FIG. 2B illustrates an elemental data structure 300 that may result from analysis and deconstruction of complex KR 200. In elemental data structure 300, complex concept 230 labeled "Mountain Animal" has been found to include more elemental concepts 235 labeled "Mountain" and 240 labeled "Animal". In this example, "Mountain" and "Animal" represent more elemental (i.e., "lower level" or less complex) concepts than the more complex concept labeled "Mountain Animal", since the concepts of "Mountain" and "Animal" can be combined to create the concept labeled "Mountain Animal". Similarly, complex concept 250 labeled "Domestic Dog" has been found to include more elemental concepts 255 labeled "Domestic" and 260 labeled "Dog", and complex concept 270 labeled "Siamese Cat" has been found to include more elemental concepts 275 labeled "Siamese" and 280 labeled "Cat". In addition, each newly discovered elemental concept has inherited concept relationships from the complex concept that comprises it. Thus, "Domestic", "Dog", "Siamese" and "Cat" are children of "Pet"; "Mountain" and "Animal" (concept 240) are children of "Animal" (concept 210); and "Mountain" and "Animal" (concept 240) are both parents of both concept 290 labeled "Lion" and concept 295 labeled "Goat".

Note that, although the label "Animal" is ascribed to both concept 210 and concept 240 in elemental data structure 300, the two concepts may still represent different abstract meanings that function differently within the knowledge representation hierarchy. In some embodiments, "labels" or "symbols" may be joined to abstract concepts to provide human- and/or machine-readable terms or labels for concepts and relationships, as well as to provide the basis for various symbol-based processing methods (such as text analytics). Labels may provide knowledge representation entities that are discernible to humans and/or machines, and may be derived from the unique vocabulary of the source domain. Thus, since the labels assigned to each concept element may be drawn from the language and terms presented in the domain, the labels themselves may not fully describe the abstract concepts and concept relationships they are used to name, as those abstract entities are comprehended in human knowledge.

Similarly, in some embodiments a difference should be appreciated between abstract concepts in a knowledge representation model and the objects those concepts may be used to describe or classify. An object may be any item in the real physical or virtual world that can be described by concepts (for instance, examples of objects are documents, web pages, people, etc.). For example, a person in the real world could be represented in the abstract by a concept labeled "Bob". The information in a domain to be described, classified or analyzed may relate to virtual or physical objects, processes, and relationships between such information. In some exemplary embodiments, complex KRs as described herein may be used in the classification of content residing within Web pages. Other types of domains in some embodiments may include document repositories, recommendation systems for music, software code repositories, models of workflow and business processes, etc.

In some embodiments, the objects of the domain to be classified may be referred to as content nodes. Content nodes may be comprised of any objects that are amenable to classification, description, analysis, etc. using a knowledge representation model. For example, a content node may be a file, a document, a chunk of a document (like an annotation), an image, or a stored string of characters. Content nodes may reference physical objects or virtual objects. In some embodiments, content nodes may be contained in content containers that provide addressable (or locatable) information through which content nodes can be retrieved. For example, the content container of a Web page, addressable through a URL, may contain many content nodes in the form of text and images. Concepts may be associated with content nodes to abstract some meaning (such as the description, purpose, usage, or intent of the content node). For example, aspects of a content node in the real world may be described by concepts in an abstract representation of knowledge.

Concepts may be defined in terms of compound levels of abstraction through their relationships to other entities and structurally in terms of other, more fundamental knowledge representation entities (e.g., keywords and morphemes). Such a structure is known herein as a concept definition. In some embodiments, concepts may be related through concept relationships of two fundamental types: intrinsic, referring to joins between elemental concepts to create more complex concepts (e.g., the relationship between "Mountain", "Animal" and "Mountain Animal" in elemental data structure 300); and extrinsic, referring to joins between complex relationships. Extrinsic relationships may describe features between concept pairs, such as equivalence, hierarchy (e.g., the relationship between "Animal" and "Pet"), and associations. Further, in some embodiments the extrinsic and intrinsic concept relationships themselves may also be described as types of concepts, and they may be typed into more complex relationships. For example, an associative relationship "married-to" may comprise the relationship concepts "married" and "to".

In some embodiments, the overall organization of the AKRM data model stored as elemental data structure 120 in system 100 may be encoded as a faceted data structure, wherein conceptual entities are related explicitly in hierarchies (extrinsic relationships), as well as joined in sets to create complex concepts (intrinsic relationships). Further, these extrinsic and intrinsic relationships themselves may be typed using concepts, as discussed above. However, it should be appreciated that any suitable type of knowledge representation model or theoretical construct including any suitable types of concept relationships may be utilized in representing an AKRM, as aspects of the present invention are not limited in this respect.

Figure 3:
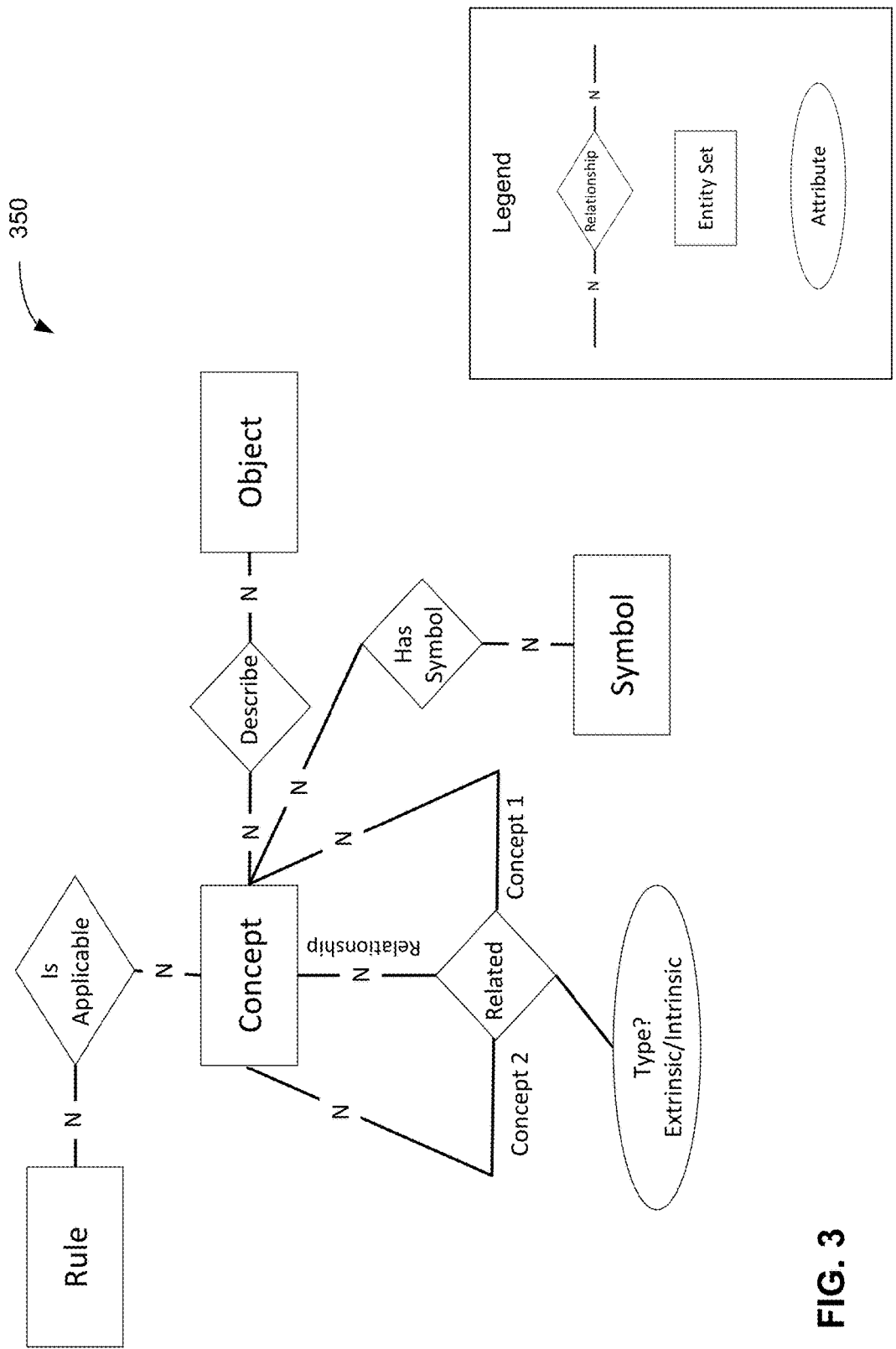
FIG. 3 illustrates an exemplary data schema in accordance with some embodiments of the present invention.

For illustration, FIG. 3 provides an exemplary data schema 350 that may be employed in the data set 110 of system 100 in accordance with some embodiments of the present invention. Such a data schema may be designed to be capable of encoding both complex knowledge representation data structures (complex KRs) such as ontologies and taxonomies, as well as the atomic knowledge representation data structures into which complex KRs are decomposed (e.g., elemental data structure 120). In schema 350, concepts may be joined to compose more complex types (has-type) using many-to-many relationships. In this way, the core concept entities in the model may represent a wide diversity of simplicity or complexity, depending on the nature of the complex knowledge representation that is being modeled by the data. By joining symbols, rules, and objects to these concepts using many-to-many relationships, such a schema may manage the data to model a broad range of knowledge representations.

In schema 350 as illustrated in FIG. 3, rectangular boxes represent entity sets, e.g., real-world objects that may be encoded as main objects in a database, as well as abstract concepts, human- and/or machine-readable symbols that reference concepts, and rules that apply to concepts in the knowledge representation. Each solid line connector represents a relationship between two entity sets, with a relationship type as represented by a diamond. "N" denotes the participation cardinality of the relationship; here, the relationships are many-to-many, indicating that many entities of each entity set can participate in a relationship with an entity of the other entity set participating in the relationship, and vice versa. By contrast, a relationship labeled "1" on both sides of the diamond would represent a one-to-one relationship; a relationship labeled "1" on one side and "N" on the other side would represent a one-to-many relationship, in which one entity of the first type could participate in the relationship with many entities of the second type, while each entity of the second type could participate in that relationship with only one entity of the first type; etc.

In some embodiments, the data structure of a knowledge representation may be encoded in accordance with schema 350 in one or more database tables, using any suitable database and/or other data encoding technique. For example, in some embodiments a data set for a KR data structure may be constructed as a computer-readable representation of a table, in which each row represents a relationship between a pair of concepts. For instance, one example of a data table could have four attribute columns, including a "concept 1" attribute, a "concept 2" attribute, a "relationship" attribute and a "type" attribute, modeling a three-way relationship for each row of the table as, "concept 1 is related to concept 2 through a relationship concept of a type (e.g., extrinsic or intrinsic)". For example, a row of such a table with the attributes (column entries) concept 1: "Hammer"; concept 2: "Nail"; relationship: "Tool"; type: "Extrinsic" } could represent the relationship: "'Hammer" is related to "Nail" as a "Tool", and the relationship is "Extrinsic'." In many exemplary data structures, each concept may appear in one or more rows of a database table, for example appearing in multiple rows to represent relationships with multiple other concepts. In addition, a particular pair of concepts may appear in more than one row, for example if that pair of concepts is related through more than one type of relationship. It should be appreciated, however, that the foregoing description is by way of example only, and data structures may be implemented and/or encoded and stored in any suitable way, as aspects of the present invention are not limited in this respect.

In some embodiments, various metadata may be associated with each of the entities (e.g., concepts and concept relationships) within the AKRM to support rules-based programming. For example, since many rules would require a sorted set of concepts, a priority of concepts within concept relationships (intrinsic or extrinsic) could be added to this schema. These details are omitted here only to simplify the presentation of the data model.

Although the exemplary data schema of FIG. 3 may be relatively simple, when it is married to machine-implemented (e.g., computer-implemented) processing rules for constructing and deconstructing knowledge representations, it may become capable of managing a very broad range of complex knowledge (as described in various examples below). Benefits may include real-time knowledge engineering to improve data economy and reduce the need for building complexity into large knowledge representation data structures. Further, as the scope of the knowledge representation data structures is reduced, it may also have beneficial effects on integrated knowledge engineering processes, such as reasoning, analytics, data mining, and search.

Returning to FIG. 1, in some embodiments knowledge processing rules 130 may be encoded and stored in system 100, for example in data set 110, and may be joined to concepts within input KRs 160 and/or elemental data structure 120. Rules may be joined to concepts such that given a specific concept, the rules may be applied through execution of programming code by one or more processors of system 100 to generate new semantic entities (concepts and relationships) from elemental data structure 120 and/or to deconstruct input KRs 160 into elemental entities to be included in elemental data structure 120. Examples of such rules are described in more detail below.

Rules 130 may be introduced to data set 110 as input rules 140, for example by a developer of system 100, and/or by end users of system 100 in accordance with their individual knowledge processing needs or preferences. It should be appreciated that input rules 140 may be obtained from any suitable source at any suitable time, rules 130 stored as part of the AKRM may be updated and/or changed at any suitable time by any suitable user before or during operation of system 100; and different stored rules 130 may be maintained for different users or applications that interact with system 100, as aspects of the present invention are not limited in these respects. In addition, in some embodiments different subsets of stored rules 130 may be applied to analysis of input KRs 160 than to synthesis of output KRs 190, while in other embodiments the same rules 130 may be applied in both analysis and synthesis operations, and different subsets of stored rules 130 may be applied to different types of knowledge representation.

Rules 130, when applied to concepts in analysis and synthesis of KRs, may provide the constructive and deconstructive logic for a system such as system 100. Methods of how knowledge is created (synthesized) or deconstructed (analyzed) may be encoded in sets of rules 130. Rules 130 may be designed to work symmetrically (single rules operating in both analysis and synthesis) or asymmetrically (where single rules are designed to work only in synthesis or analysis). In some embodiments, rules 130 may not be encoded as entities within a concept data structure of a knowledge model, but rather as rules within the knowledge representation model that operate in a generative capacity upon the concept data structure. In some embodiments, rules 130 may be encoded as data and stored along with the knowledge representation data structures, such as elemental data structure 120, in a machine-readable encoding of an AKRM including rules. Rules 130 may be applied using a rules engine software component, e.g., implemented by programming instructions encoded in one or more tangible, non-transitory computer-readable storage media included in or accessible by system 100, executed by one or more processors of system 100 to provide the rules engine.

Some embodiments include analysis engine 150 and synthesis engine 170.

Analysis engine 150 and synthesis engine 170 may use any of various methods of semantic analysis and synthesis to support the construction and deconstruction of knowledge representation data structures, as aspects of the present invention are not limited in this respect. Examples of analytical methods that may be used by analysis engine 150, along with application of rules 130, in deconstructing input complex KRs 160 include text analyses, entity and information extraction, information retrieval, data mining, classification, statistical clustering, linguistic analyses, facet analysis, natural language processing and semantic knowledge-bases (e.g. lexicons, ontologies, etc.). Examples of synthetic methods that may be used by synthesis engine 170, along with application of rules 130, in constructing complex KRs 190 include formal concept analysis, faceted classification synthesis, semantic synthesis and dynamic taxonomies, and various graphical operations as described in U.S. patent application Ser. No. 13/340,792, titled "Methods and Apparatuses for Providing Information of Interest to One or More Users," filed Dec. 30, 2011, and/or U.S. patent application Ser. No. 13/340,820, titled "Methods and Apparatuses for Providing Information of Interest to One or More Users," filed Dec. 30, 2011, all of which are hereby incorporated by reference in their entireties.

It should be appreciated that exemplary methods of analysis and synthesis of complex KRs may be performed by analysis engine 150 and synthesis engine 170 operating individually and/or in conjunction with any suitable external software application that may interface with the engines and/or system 100. Such external software applications may be implemented within the same physical device or set of devices as other components of system 100, or parts or all of such software applications may be implemented in a distributed fashion in communication with other separate devices, as aspects of the present invention are not limited in this respect.

Figure 4:
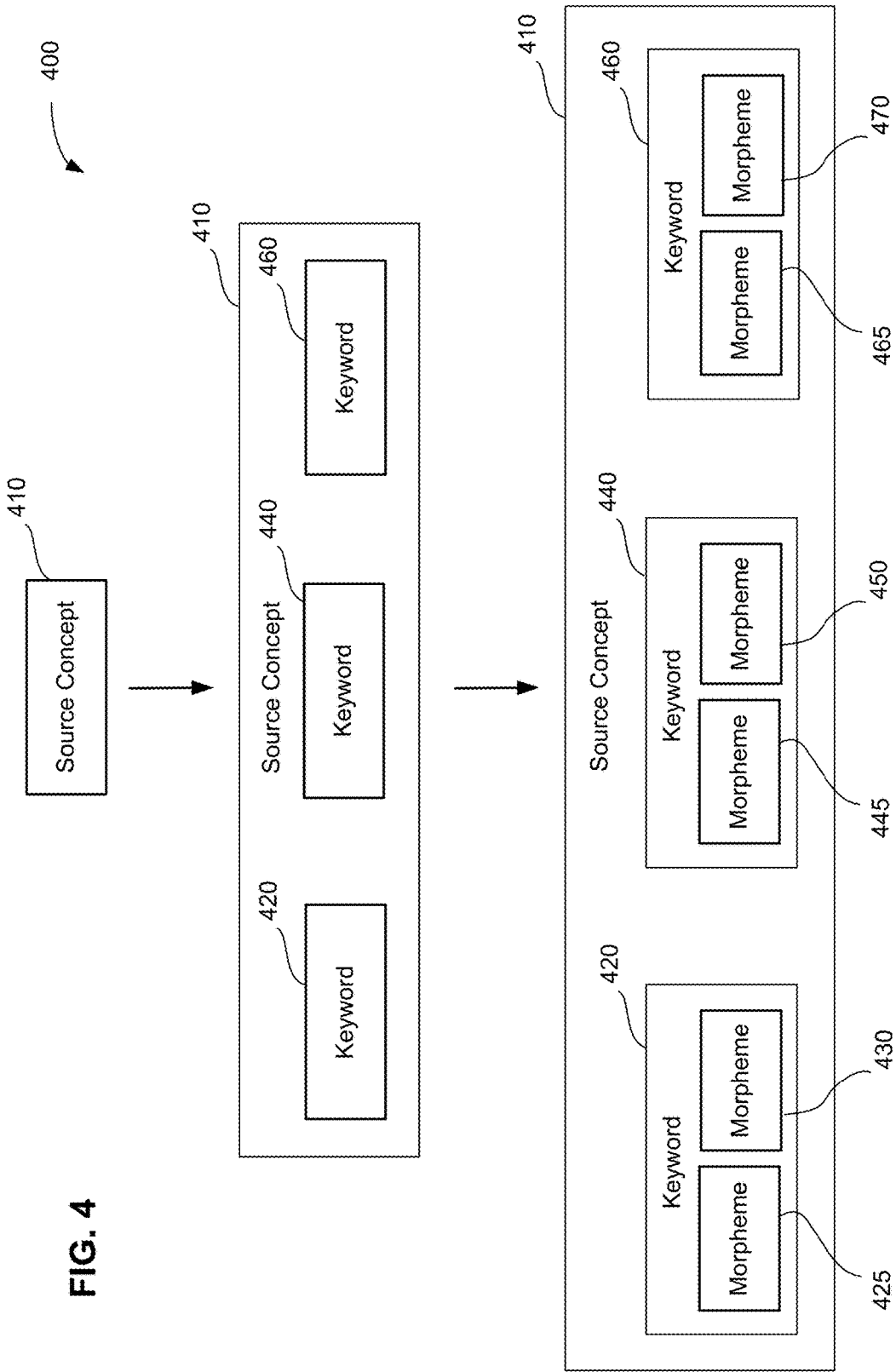
FIG. 4 illustrates an exemplary method for analysis of a complex knowledge representation in accordance with some embodiments of the present invention.

FIG. 4 illustrates one exemplary method 400 of semantic analysis that may be used by analysis engine 150 in deconstructing an input complex KR 160. It should be appreciated that the method illustrated in FIG. 4 is merely one example, and many other methods of analysis are possible, as discussed above, as aspects of the present invention are not limited in this respect. Exemplary method 400 begins with extraction of a source concept 410 with a textual concept label explicitly presented in the source data structure. Multiple source concepts 410 may be extracted from a source data structure, along with source concept relationships between the source concepts 410 that may explicitly present in the source data structure.

A series of keyword delineators may be identified in the concept label for source concept 410. Preliminary keyword ranges may be parsed from the concept label based on common structural textual delineators of keywords (such as parentheses, quotes, and commas). Whole words may then be parsed from the preliminary keyword ranges, again using common word delineators (such as spaces and grammatical symbols). Checks for single word independence may then be performed to ensure that the parsed candidate keywords are valid. In some embodiments, a check for word independence may be based on word stem (or word root) matching, hereafter referred to as "stemming". Once validated, if a word is present in one concept label with other words, and is present in a related concept label absent those other words, then the word may delineate a keyword.

Once a preliminary set of keyword labels is thus generated, all preliminary keyword labels may be examined in the aggregate to identify compound keywords, which present more than one valid keyword label within a single concept label. For example, "basketball" may be a compound keyword containing keyword labels "basket" and "ball" in a single concept label. In some embodiments, recursion may be used to exhaustively split the set of compound keywords into the most elemental set of keywords that is supported by the source data. The process of candidate keyword extraction, validation and splitting may be repeated until no additional atomic keywords can be found and/or until the most elemental set of keywords supported by the source data has been identified.

In some embodiments, a final method round of consolidation may be used to disambiguate keyword labels across the entire domain. Such disambiguation may be used to resolve ambiguities that emerge when entities share the same labels. In some embodiments, disambiguation may be provided by consolidating keywords into single structural entities that share the same label. The result may be a set of keyword concepts, each included in a source concept from which it was derived. For example, source concept 410 may be deconstructed into keywords 420, 440 and 460, parsed from its concept label, and keywords 420, 440 and 460 may make up a concept definition for source concept 410. For instance, in the example elemental data structure 300 of FIG. 2B, the more elemental concept 255 labeled "Domestic" may be deconstructed from the more complex concept 250 labeled "Domestic Dog" as a keyword parsed from the concept label.

In some embodiments, concept definitions including keyword concepts may be extended through further deconstruction to include morpheme concept entities in their structure, as a deeper and more fundamental level of abstraction. In some embodiments, morphemes may represent elemental, irreducible attributes of more complex concepts and their relationships. At the morpheme level of abstraction, many of the attributes would not be recognizable to humans performing classification as concepts. However, when combined into relational data structures across entire domains, morphemes may in some embodiments be able to carry the semantic meaning of the more complex concepts using less information.

In some embodiments, methods of morpheme extraction may have elements in common with the methods of keyword extraction discussed above. Patterns may be defined to use as criteria for identifying morpheme candidates. These patterns may establish the parameters for stemming, and may include patterns for whole word as well as partial word matching. As with keyword extraction, the sets of source concept relationships may provide the context for morpheme pattern matching. The patterns may be applied against the pool of keywords within the sets of source concept relationships in which the keywords occur. A set of shared roots based on stemming patterns may be identified. The set of shared roots may comprise the set of candidate morpheme roots for each keyword.

In some embodiments, the candidate morpheme roots for each keyword may be compared to ensure that they are mutually consistent. Roots residing within the context of the same keyword and the source concept relationship sets in which the keyword occurs may be assumed to have overlapping roots. Further, it may be assumed that the elemental roots derived from the intersection of those overlapping roots will remain within the parameters used to identify valid morphemes. Such validation may constrain excessive morpheme splitting and provide a contextually meaningful yet fundamental level of abstraction. In some embodiments, any inconsistent candidate morpheme roots may be removed from the keyword sets. The process of pattern matching to identify morpheme candidates may be repeated until all inconsistent candidates are removed.

In some embodiments, by examining the group of potential roots, one or more morpheme delineators may be identified for each keyword. Morphemes may be extracted based on the location of the delineators within each keyword label. Keyword concept definitions may then be constructed by relating (or mapping) the extracted morphemes to the keywords from which they were derived. For example, morpheme concepts 425 and 430 may be included in the concept definition for keyword concept 420, morpheme concepts 445 and 450 may be included in the concept definition for keyword concept 440, and morpheme concepts 465 and 470 may be included in the concept definition for keyword concept 460. Thus, an original source concept 410 may be deconstructed through semantic analysis to the level of keyword concepts, and further to the most elemental level of morpheme concepts for inclusion in an elemental data structure of an AKRM.

It should be appreciated, however, that any suitable level of abstraction may be employed in generating an elemental data structure, and any suitable method of analysis may be used, including methods not centered on keywords or morphemes, as aspects of the present invention are not limited in this respect. In some embodiments, an elemental data structure included in an AKRM for use in analysis and/or synthesis of more complex KRs may include and encode concepts and relationships that are more elemental than concepts and relationships included in the complex KRs deconstructed to populate the elemental data structure and/or synthesized from the elemental data structure. For example, abstract meanings of complex concepts encoded in a complex KR may be formed by combinations of abstract meanings of elemental concepts encoded in the elemental data structure of the AKRM.

In some embodiments, concepts stored in an elemental data structure as part of a centralized AKRM may have been deconstructed from more complex concepts to the level of single whole words, such as keywords. The example of FIG. 2B illustrates such an elemental data structure encoding single whole words. In some embodiments, concepts in the elemental data structure may have been deconstructed to more elemental levels representing portions of words. In some embodiments, concepts in the elemental data structure may have been deconstructed to a more elemental semantic level represented by morphemes, the smallest linguistic unit that can still carry semantic meaning. For example, the whole word concept "Siamese" may be deconstructed to create two morpheme concepts, "Siam" and "-ese", with "Siam" representing a free morpheme and "-ese" representing an affix. In some embodiments, an elemental data structure of an AKRM may include only concepts at a specified level of elementality; for example, an elemental data structure may in some embodiments be formed completely of morphemes or completely of single word concepts. In other embodiments, an elemental data structure may include concepts at various different levels of elementality (e.g., including morpheme concepts, keyword concepts and/or other concepts at other levels of elementality), with at least some of the concepts in the elemental data structure being more elemental than the complex concepts in input KRs they are deconstructed from and/or the complex concepts in output KRs that they create in combination with other elemental concepts. It should be appreciated that any suitable basis for deconstructing complex KRs into more elemental data structures may be utilized, including bases tied to paradigms other than linguistics and semantics, as aspects of the present invention are not limited in this respect.

Returning to FIG. 1, data consumer 195 may represent one or more human users of system 100 and/or one or more machine-implemented software applications interacting with system 100. In some embodiments, data consumer 195 may make requests and/or receive output from system 100 through various forms of data. For example, a data consumer 195 may input a complex KR 160 to system 100 to be deconstructed to elemental concepts and concept relationships to generate and/or update elemental data structure 120. A data consumer 195 (the same or a different data consumer) may also receive an output complex KR 190 from system 100, synthesized by application of one or more of the knowledge processing rules 130 to part or all of elemental data structure 120.

In some embodiments of exemplary system 100, a context 180 (or "context information" 180) associated with one or more data consumers 195 is provided to the synthesis engine 170. Context information may comprise any information that may be used to identify what information the data consumer(s) may be seeking and/or may be interested in. Context information may also comprise information that may be used to develop a model of the data consumer(s) that may be subsequently used to provide those data consumer(s) with information. As such, context information may include, but is not limited to, any suitable information related to the data consumer(s) that may be collected from any available sources and/or any suitable information directly provided by the data consumer(s).

In some embodiments, information related to a data consumer may be any suitable information about the data consumer. For example, information related to a data consumer may comprise demographic information (e.g., gender, age group, education level, etc.), biographical information, employment information, familial information, relationship information, preference information, interest information, financial information, geo-location information, etc. associated with the data consumer. As another example, information related to a data consumer may comprise details of the data consumer's Internet browsing history. Such information may comprise a list of one or more websites that the data consumer may have browsed, the time of any such browsing, and/or the place (i.e., geographic location) from where any such browsing occurred. The data consumer's browsing history may further comprise information that the data consumer searched for and any associated browsing information including, but not limited to, the search results the data consumer obtained in response to any such searches. In some embodiments, information related to a data consumer may comprise records of hyperlinks selected by a user.

As another example, information related to a data consumer may comprise any information that the data consumer has provided via any user interface on the data consumer's computing device or on one or more websites that the data consumer may have browsed. For instance, information related to a data consumer may comprise any information associated with the data consumer on any website such as a social networking website, job posting website, a blog, a discussion thread, etc. Such information may include, but is not limited to, the data consumer's profile on the website, any information associated with multimedia (e.g., images, videos, etc.) corresponding to the data consumer's profile, and any other information entered by the data consumer on the website. In some embodiments, exemplary system 1800 may acquire profile information by scraping a website or a social networking platform. As yet another example, information related to a data consumer may comprise consumer interaction information as described in U.S. patent application Ser. No. 12/555,293, filed Sep. 8, 2009, and entitled "Synthesizing Messaging Using Content Provided by Consumers," which is hereby incorporated by reference in its entirety.

In some embodiments, information related to a data consumer may comprise geo-spatial information. For instance, the geo-spatial information may comprise the current location of the data consumer and/or a computing device of the data consumer (e.g., data consumer's home, library in data consumer's hometown, data consumer's work place, a place to which the data consumer has traveled, and/or the geographical location of the data consumer's device as determined by the data consumer's Internet IP address, etc.). Geo-spatial information may include an association between information about the location of the data consumer's computing device and any content that the data consumer was searching or viewing when the data consumer's computing device was at or near that location. In some embodiments, information related to a data consumer may comprise temporal information. For example, the temporal information may comprise the time during which a data consumer was querying or viewing specific content on a computing device. The time may be specified at any suitable scale such as on the scale of years, seasons, months, weeks, days, hours, minutes, seconds, etc.

Additionally or alternatively, context information associated with one or more data consumers may comprise information provided by the data consumer(s). Such information may be any suitable information indicative of what information the data consumer(s) may be interested in. For example, context information may comprise one or more search queries input by a data consumer into a search engine (e.g., an Internet search engine, a search engine adapted for searching a particular domain such as a corporate intranet, etc.). As another example, context information may comprise one or more indicators, specified by the data consumer, of the type of information the data consumer may be interested in. A data consumer may provide the indicator(s) in any of numerous ways. The data consumer may type in or speak an indication of preferences, select one or more options provided by a website or an application (e.g., select an item from a dropdown menu, check a box, etc.), highlight or otherwise select a portion of the content of interest to the data consumer on a website or in an application, and/or in any other suitable manner. For example, the data consumer may select one or more options on a website to indicate a desire to receive news updates related to a certain topic or topics, advertisements relating to one or more types of product(s), information about updates on any of numerous types of websites, newsletters, e-mail digests, etc.

Context information may be obtained in any of a variety of possible ways. For example, in some embodiments, the context information may be provided from a data consumer's client computer to one or more server computers. That is, for example, a data consumer may operate a client computer that executes an application program. The application program may send context information (e.g., a search query entered by the data consumer into the application program) to a server computer. Thus, the server may receive context information from the application program executing on the client.

The application program may be any of a variety of types of application programs that are capable of, directly or indirectly, sending and receiving information. For example, in some embodiments, the application program may be an Internet or WWW browser, an instant messaging client, or any other suitable application.

The context information need not be sent directly from a client to a server. For example, in some embodiments, the data consumer's search query may be sent to a server via a network. The network may be any suitable type of network such as a LAN, WAN, the Internet, or a combination of networks.

It should also be recognized that receiving context information from a data consumer's client computer is not a limiting aspect of the present invention as context information may be obtained in any other suitable way. For example, context information may be obtained, actively by requesting and/or passively by receiving, from any source with, or with access to, context information associated with one or more data consumers.

In some embodiments, data consumer 195 may provide a context 180 for directing synthesis and/or analysis operations. For example, by inputting a particular context 180 along with a request for an output KR, data consumer 195 may direct system 100 to generate an output KR 190 with appropriate characteristics for the information required or the current task being performed by the data consumer. For example, a particular context 180 may be input by data consumer 195 as a search term that may be mapped to a particular concept about which data consumer 195 requires or would like to receive related information. In some embodiments, synthesis engine 170 may, for example, apply rules 130 to only those portions of elemental data structure 120 that are conceptually related (i.e., connected in the data structure) to the concept corresponding to the context 180. In another example, an input context 180 may indicate a particular type of knowledge representation model with which data consumer 195 would like output KR 190 to conform, such as a taxonomy. Accordingly, embodiments of synthesis engine 170 may apply only those rules of the set of rules 130 that are appropriate for synthesizing a taxonomy from elemental data structure 120.

It should be appreciated that input context 180 may include any number of requests and/or limitations applying to the synthesis of output KR 190, and components of input context 180 may be of any suitable type encoded in any suitable form of data or programming language, as aspects of the present invention are not limited in this respect. Examples of suitable input contexts include, but are not limited to, free text queries and submissions, e.g., mediated by a natural language processing (NLP) technology, and structural inputs such as sets of terms or tags, consistent with various Web 2.0 systems. In some embodiments, generating output KR 190 in accordance with a particular context 180 may enable a more fluid and dynamic interchange of knowledge with data consumers. However, it should be appreciated that an input context 180 is not required, and system 100 may produce output KRs 190 without need of input contexts in some embodiments, as aspects of the present invention are not limited in this respect.

Data consumers 195 may also provide input KRs 160 of any suitable type to system 100 in any suitable form using any suitable data encoding and/or programming language, as aspects of the present invention are not limited in this respect. Examples of suitable forms of input KRs include, but are not limited to, semi-structured or unstructured documents, again used with various forms of NLP and text analytics, and structured knowledge representations such as taxonomies, controlled vocabularies, faceted classifications and ontologies.

Figure 5:
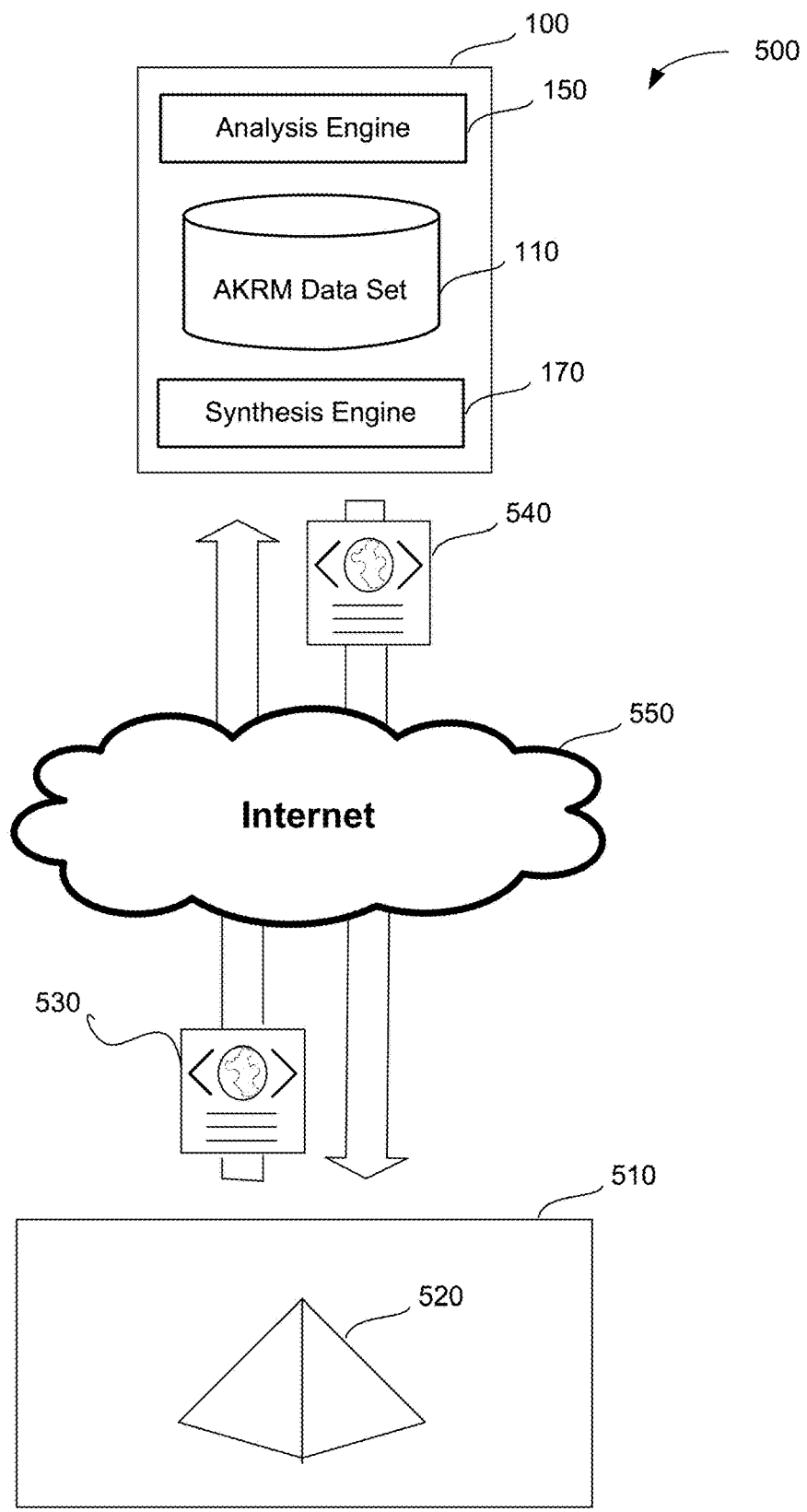
FIG. 5 is a block diagram illustrating an exemplary distributed system for implementing analysis and synthesis of complex knowledge representations in accordance with some embodiments of the present invention.

In some embodiments in accordance with the present disclosure, a system for analysis and synthesis of complex KRs using an AKRM, such as system 100, may be implemented on a server side of a distributed computing system with network communication with one or more client devices, machines and/or computers. FIG. 5 illustrates such a distributed computing environment 500, in which system 100 may operate as a server-side transformation engine for KR data structures. The transformation engine (e.g., one or more programmed processors) may take as input one or more source complex KR data structures 520 provided from one or more domains by a client 510, e.g., through actions of a human user or software application of client 510. In some embodiments, the input complex KR 520 may be encoded into one or more XML files 530 that may be distributed via web services (or API or other distribution channels) over a network such as (or including) the Internet 550 to the computing system(s) on which system 100 is implemented. Similarly, system 100 may return requested output KRs to various clients 510 through the network as XML files 540. However, it should be appreciated that data may be communicated between server system 100 and client systems 510 in any suitable way and in any suitable form, as aspects of the present invention are not limited in this respect.

Through this and/or other modes of distribution and decentralization, in some embodiments a wide range of developers and/or publishers may use the analysis engine 150 and synthesis engine 170 to deconstruct and create complex KR data structures. Exemplary applications include, but are not limited to, web sites, knowledge bases, e-commerce stores, search services, client software, management information systems, analytics, etc.

In some embodiments, an advantage of such a distributed system may be clear separation of private domain data and shared data used by the system to process domains. Data separation may facilitate hosted processing models, such as a software-as-a-service (SaaS) model, whereby a third party may offer transformation engine services to domain owners. A domain owner's domain-specific data may be hosted by the SaaS platform securely, as it is separable from the shared data (e.g., AKRM data set 110) and the private data of other domain owners. Alternately, the domain-specific data may be hosted by the domain owners, physically removed from the shared data. In some embodiments, domain owners may build on the shared knowledge (e.g., the AKRM) of an entire community of users, without having to compromise their unique knowledge.

Figure 6:
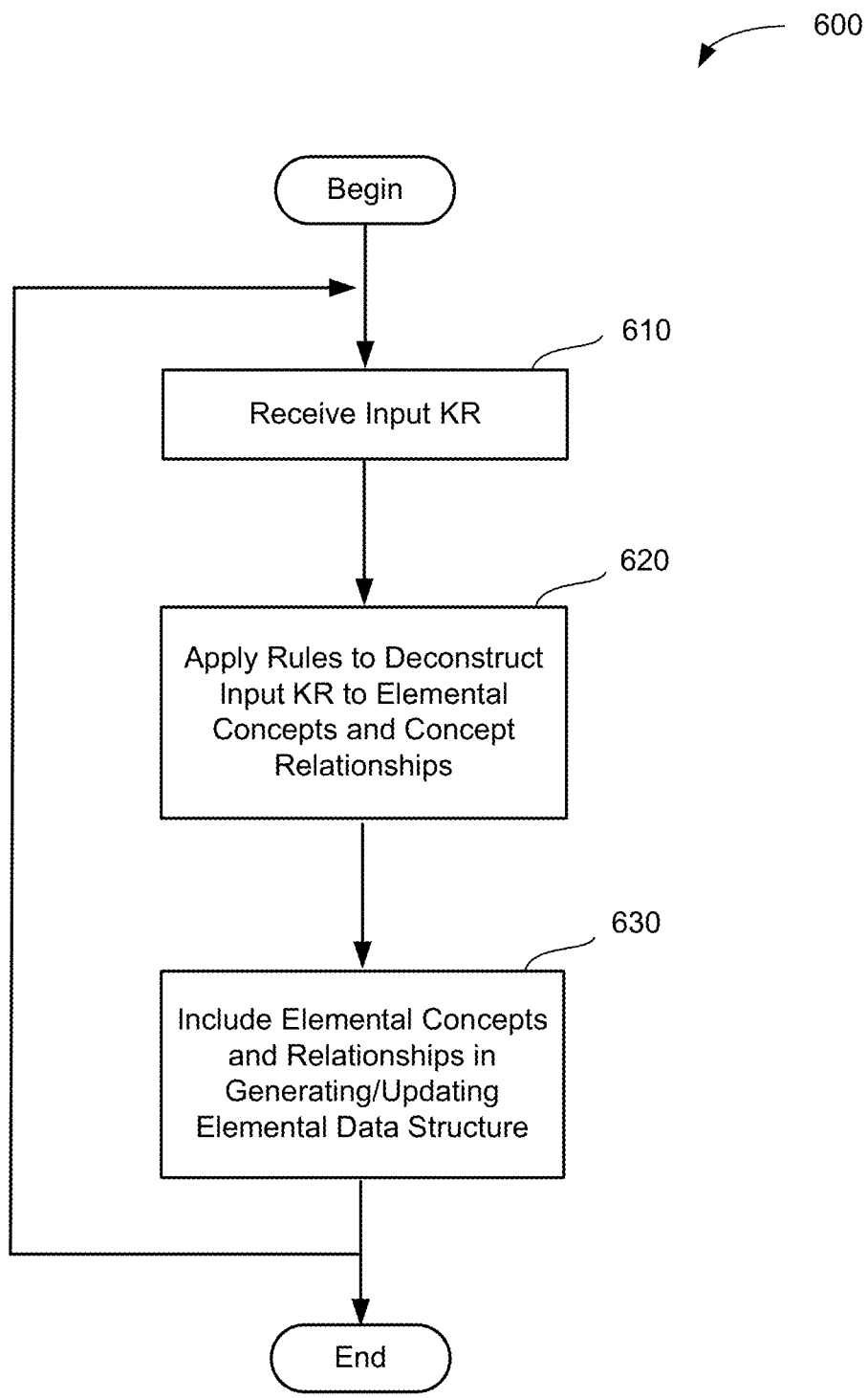
FIG. 6 is a flowchart illustrating an exemplary method for analyzing complex knowledge representations to generate an elemental data structure in accordance with some embodiments of the present invention.

As should be appreciated from the foregoing discussion, some embodiments in accordance with the present disclosure are directed to techniques of analyzing an original complex knowledge representation to deconstruct the complex KR and generate or update an elemental data structure of an atomic knowledge representation model. FIG. 6 illustrates one such technique as exemplary process 600. Process 600 begins at act 610, at which an input complex KR may be received, for example from a data consumer by an analysis/synthesis system such as system 100.

At act 620, one or more knowledge processing rules encoded in system 100 as part of an AKRM may be applied to deconstruct the input complex KR to one or more elemental concepts and/or one or more elemental concept relationships. Examples of knowledge processing rules applicable to various types of input KRs are provided below. However, it should be appreciated that aspects of the present invention are not limited to any particular examples of knowledge processing rules, and any suitable rules encoded in association with an atomic knowledge representation model may be utilized. As discussed above, such rules may be provided at any suitable time by a developer of the analysis system and/or by one or more end users of the analysis system.

At act 630, one or more of the elemental concepts and/or elemental concept relationships discovered and/or derived in act 620 may be included in an elemental data structure encoded and stored as part of the AKRM of the system. In some embodiments, some or all of the elemental concepts and relationships derived from a single input complex KR may be used to populate a new elemental data structure of an AKRM. In some embodiments, when a stored elemental data structure has already been populated, new elemental concepts and/or relationships discovered from subsequent input KRs may be included in the stored elemental data structure to update and/or extend the centralized AKRM. In some embodiments, process 600 may continue to loop back to the beginning to further update a stored elemental data structure and/or generate new elemental data structures as new input KRs become available. In other embodiments, process 600 may end after one pass or another predetermined number of passes through the process, after a stored elemental data structure has reached a predetermined size or complexity, or after any other suitable stopping criteria are met.

Figure 7:
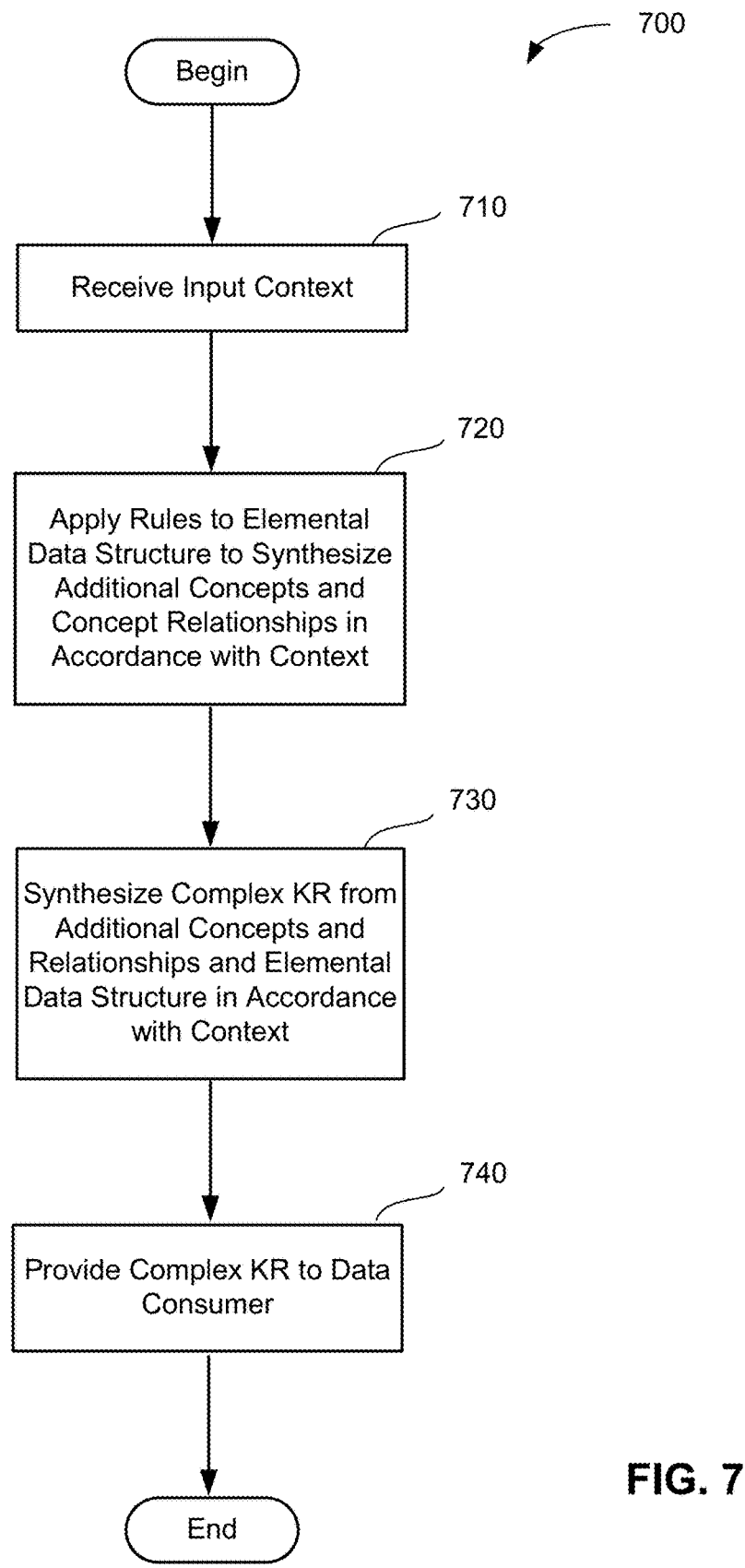
FIG. 7 is a flowchart illustrating an exemplary method for synthesizing complex knowledge representations from an elemental data structure in accordance with some embodiments of the present invention.

As should be appreciated from the foregoing discussion, some further embodiments in accordance with the present disclosure are directed to techniques for generating (synthesizing) complex knowledge representations using an atomic knowledge representation model. FIG. 7 illustrates such a technique as exemplary process 700. Process 700 begins at act 710, at which an input context may be received, for example from a data consumer such as a human user or a software application. As discussed above, such a context may include a textual query or request, one or more search terms, identification of one or more active concepts, etc. In addition, the context may indicate a request for a particular form of complex KR. In some embodiments, however, a request for a complex KR may be received without further context to limit the concepts and/or concept relationships to be included in the complex KR, as aspects of the present invention are not limited in this respect. Furthermore, in some embodiments, receipt of a context may be interpreted as a request for a complex KR, without need for an explicit request to accompany the context.

At act 720, in response to the input request and/or context, one or more appropriate knowledge processing rules encoded in the AKRM may be applied to the elemental data structure of the AKRM to synthesize one or more additional concepts and/or concept relationships not explicitly encoded in the elemental data structure. Examples of knowledge processing rules applicable to synthesizing various types of output KRs are provided below. As discussed above, in some embodiments rules may be applied bi-directionally to accomplish both analysis and synthesis of complex KRs using the same knowledge processing rules, while in other embodiments one set of rules may be applied to analysis and a different set of rules may be applied to synthesis. However, it should be appreciated that aspects of the present invention are not limited to any particular examples of knowledge processing rules, and any suitable rules encoded in association with an atomic knowledge representation model may be utilized. As discussed above, such rules may be provided at any suitable time by a developer of the analysis system and/or by one or more end users of the analysis system.

In some embodiments, appropriate rules may be applied to appropriate portions of the elemental data structure in accordance with the received input request and/or context. For example, if the input request specifies a particular type of complex KR to be output, in some embodiments only those rules encoded in the AKRM that apply to synthesizing that type of complex KR may be applied to the elemental data structure. In some embodiments, if no particular type of complex KR is specified, a default type of complex KR, such as a taxonomy, may be synthesized, or a random type of complex KR may be selected, etc. In some embodiments, if the input context specifies one or more particular active concepts of interest, for example, only those portions of the elemental data structure related (i.e., connected through concept relationships) to those active concepts may be selected and the rules applied to them to synthesize the new complex KR. In some embodiments, some predetermined limit on the size and/or complexity of the output complex KR may be set, e.g., by a developer of the synthesis system or by an end user, for example conditioned on a number of concepts included, hierarchical distance between the active concepts and selected related concepts in the elemental data structure, encoded data size of the resulting output complex KR, processing requirements, etc.

At act 730, a new complex KR may be synthesized from the additional concepts and relationships synthesized in act 720 and the selected appropriate portions of the elemental data structure, and encoded in accordance with any specified type of KR indicated in the received input. At act 740, the resulting synthesized complex KR may be provided to the data consumer from which the request was received. As discussed above, this may be a software application or a human user who may view and/or utilize the provided complex KR through a software user interface, for example. Process 700 may then end with the provision of the newly synthesized complex KR encoding new knowledge.

In some embodiments, an "active concept" may be used during synthesis of a complex KR. In one aspect, an active concept may be an elemental concept corresponding to at least a portion of the context information associated with a data consumer. In some embodiments, an active concept may be provided as part of context information. In some embodiments, an active concept may be extracted from context information.

Extracting an active concept from context information may comprise identifying a portion of the context information that pertains to a synthesis operation. For example, when a data consumer searches for information, a pertinent portion of the context information may comprise a user's search query, and/or additional information that may be helpful in searching for the information that the data consumer seeks (e.g., the data consumer's current location, the data consumer's browsing history, etc.). As another example, when presenting a data consumer with one or more advertisements, a pertinent portion of the context information may comprise information indicative of one or more products that the data consumer may have interest in. As another example, when providing a data consumer with news articles (or any other suitable type of content), a pertinent portion of the context information may comprise information indicative of the data consumer's interests. The pertinent portion of the context information may be identified in any suitable way as the manner in which the pertinent portion of the context information is identified is not a limitation of aspects of the present invention. It should be also recognized that, in some instances, the pertinent portion of the context information may comprise a subset of the context information, but, in other embodiments, the pertinent portion may comprise all the context information, as aspects of the present invention are not limited in this respect.

The pertinent portion of the context information may be represented in any of numerous ways. For example, in some embodiments, the pertinent portion of context information may be represented via one or more alphanumeric strings. An alphanumeric string may comprise any suitable number of characters (including spaces), words, numbers, and/or any of numerous other symbols. An alphanumeric string may, for example, represent a user search query and/or any suitable information indicative of what information the data consumer may be interested in. Though, it should be recognized that any of numerous other data structures may be used to represent context information and/or any portion thereof.

In some embodiments, an active concept corresponding to the pertinent portion of context information may be identified in an elemental data structure. Identification of the active concept in the elemental data structure may be made in any suitable way. In some embodiments, the pertinent portion of the context information may be compared with a concept identifier. For example, when the pertinent portion of the context information is represented by an alphanumeric string, the alphanumeric string may be compared with a string identifying the concept (sometimes referred to as a "concept label") to determine whether or not the strings match. A match may be an exact match between the strings, or a substantially exact match in which all words, with the exception of a particular set of words (e.g., words such as "and," "the," "of," etc.), match. Moreover, in some embodiments, an order of words in the strings may be ignored. For instance, it may be determined that the string "The Board of Directors," matches the concept label "Board Directors" as well as the concept label "Directors Board."

In some embodiments, if an active concept corresponding to the pertinent portion of context information is not identified in the elemental data structure, an active concept may be generated. In some embodiments, a generated active concept may be added to the elemental data structure.

FIGS. 12-17 are discussed in detail below. FIG. 18 illustrates an exemplary system 1800 that may be employed in some embodiments for implementing an atomic knowledge representation model (AKRM) involved in analysis and synthesis of complex knowledge representations (KRs), in accordance with some embodiments of the present invention. In an exemplary system 1800, analytical components (i.e. components configured to deconstruct or otherwise analyze input data, and to store analytical results in an AKRM data set 110), such as analysis engine 150, may be implemented as software executed on one or more processors, as hardware, or as a combination of software and hardware. Likewise, synthetical components (i.e. components configured to synthesize complex knowledge representations from an AKRM data set 110), such as synthesis engine 170, may be implemented as software executed on one or more processors, as hardware, or as a combination of software and hardware.

In some embodiments, analytical components may be co-located with one another (e.g., stored on the same computer-readable medium, or executed on the same processor). In some embodiments, analytical components may be remotely located from each other (e.g., provided as remote services or executed on remotely located computers connected by a network). Likewise, synthetical components may be co-located with each other or remotely located from each other. Analytical and synthetical components may also be referred to as "units" or "engines."

As described above, in some embodiments an elemental data structure may comprise elemental concepts and elemental concept relationships. In some embodiments, an elemental concept relationship may be unidirectional and may describe a relationship between two elemental concepts. That is, an elemental concept relationship may denote that elemental concept A has a particular relationship to elemental concept B, without denoting that elemental concept B has the same relationship to elemental concept A. In some embodiments, an elemental concept relationship may be assigned a type, such as a subsumptive type or a definitional type.

A subsumptive relationship may exist between two concepts when one of the concepts is a type, field, or class of the other concept. For example, a subsumptive relationship may exist between the concepts "biology" and "science" because biology is a field of science. The notation A→B may denote a subsumptive relationship between concepts A and B. More precisely, the notation A→B may denote that concept B subsumes concept A, or (equivalently), that concept A is a type of concept B. A subsumptive relationship may also be referred to as a 'subsumption' relationship, an 'is-a' relationship, or a 'hyponymy.'

A definitional relationship may exist between two concepts when one of the concepts may define the other concept, at least in part. For example, a definitional relationship may exist between the concepts "apple" and "skin" because an apple may have a skin. As another example, a definitional relationship may exist between the concepts "apple" and "round" because an apple may be round. The notation A-•B may denote a definitional relationship between concepts A and B. More precisely, the notation A-•B may denote that concept B defines concept A, or (equivalently), that concept A is defined by concept B. A definitional relationship may also be referred to as a 'defined-by' relationship.

In some embodiments, a definitional relationship may exist only between a concept and constituents of that concept. For example, in some embodiments, a definitional relationship may exist between the concept "apple pie" and the concept "apple" or the concept "pie," because the concepts "apple" and "pie" are constituents of the concept "apple pie." In some embodiments, concept X may be a constituent of concept Y only if a label associated with concept Y comprises a label associated with concept X.

II. Pseudo-Code

The following sections of pseudo-code may serve as further illustration of the above-described methods.

```
KnowledgeCreation(KR_in, RULES_in, CONTEXT, ANALYSIS,
   SYNTHESIS)
Input:
   CONTEXT: User/Application Context (e.g., requests, active
   concepts, domain restrictions)
   KR_in: Knowledge representation (e.g., taxonomy)
   RULES: Relevant Knowledge Processing Rules
   ANALYSIS: a flag for enabling Analysis event
   SYNTHESIS: a flag for enabling Synthesis event
Output:
   Concepts and relationships to be stored in AKRM
   Complex KR_out to present to user/applications
Procedure:
   C_a = AKRM.C     /*a set concepts definitions defined in the
                      AKRM*/
   R_a = AKRM.R     /* a set of concept relationships defined in
                      the AKRM*/
   C = { }          /* a set of new concept definitions*/
   R = { }          /* a set of new relationships*/
   KR_out = C + R   /* a complex knowledge representation */
   /* keep performing analysis tasks as long as more rules can be
   applied*/
   whenever (ANALYSIS) do {
      Apply an analysis rule from RULES to the KRin + C_a + R_a
      C_a = C_a U {set of generated atomic concepts}
      R_a = R_a U {set of generated relationships}
      If no more rules can be applied set ANALYSIS to false
   }
   /* keep performing synthesis tasks as long as more rules can be
   applied*/
```

```
whenever (SYNTHESIS} do {
  Apply a synthesis rule from RULES to $C_a$ + C + $R_a$ + R +
  CONTEXT
  C = C U {set of generated complex concepts}
  R = R U {set of generated complex relationships}
  If no more rules can be applied set SYNTHESIS to false
  /*Possibly materialize a subset of generated KR*/
  if (enough support or user request)
    $C_a$ = $C_a$ U C and $R_a$ = $R_a$ U R
}
/*present the generated complex KR to user/applications*/
output complex $KR_{out}$ = C + R (to user/application)
```

As should be appreciated from the foregoing discussion, some embodiments in accordance with the present disclosure are directed to techniques for supporting semantic interoperability between knowledge representations using an atomic knowledge representation model. As discussed above, maintaining a shared centralized AKRM with a stored elemental data structure in some embodiments may allow multiple different input complex KRs (in some cases of different types or knowledge representation models) to be deconstructed to elemental concepts and/or concept relationships used in the generating and/or updating of a single shared elemental data structure that is semantically compatible with all types of complex KRs. In addition, through deconstruction to an elemental data structure and subsequent synthesis to a new complex KR, an input KR of one type may in some embodiments be transformed to an output KR of a different type based on the same source data.

The following pseudo-code may serve as a further illustration of methods of integrating multiple different KRs under an AKRM as described herein, to provide benefits of semantic interoperability.

```
Input:
  $KR_1$, $KR_2$, ..., $KR_n$: /*n possible different KR*/
  $RULES_1$, $RULES_2$, ..., $RULES_n$ /*Relevant Knowledge Processing
  Rules*/
  User/application context
Output:
  Concepts and relationships to be stored in AKRM
  Complex KR to present to user/applications
Procedure:
  $C_a$ = AKRM.C       /*a set concepts definitions defined in the
                         AKRM*/
  $R_a$ = AKRM.R       /* a set of concept relationships defined in
                         the AKRM*/
  C = { }              /* a set of new concept definitions*/
  R = { }              /* a set of new relationships*/
  $KR_{out}$ = C + R   /* a complex knowledge representation */
  /* Analyze the input KRs and populate AKRM */
  for (i: 1 to n){
    Apply all possible analysis rules from $RULES_i$ to the $KR_i$
      + $C_a$ + $R_a$
    $C_a$ = $C_a$ U {set of generated atomic concepts}
    $R_a$ = $R_a$ U {set of generated relationships}
  }
  /* Synthesize new knowledge */
  Apply possible synthesis rules from $RULES_i$ to $C_a$ + C + $R_a$ + R
  C = C U {set of generated complex concepts}
  R = R U {set of generated complex relationships}
  /*Possibly materialize a subset of generated KR*/
  $C_a$ = $C_a$ U C and $R_a$ = $R_a$ U R
```

FIG. 8 provides a table illustrating six exemplary knowledge processing rules that may be used in some embodiments in accordance with the present disclosure in analysis and/or synthesis of five exemplary types of complex knowledge representations (i.e., taxonomies, synonym rings, thesauri, faceted classifications and ontologies). However, as discussed above, it should be appreciated that these examples are provided merely for purposes of illustration, and aspects of the present invention are not limited to any particular set of rules or KR types or models. In addition, in some embodiments an analysis/synthesis system may be seeded with an initial set of knowledge processing rules (e.g., by a developer of the system) which may be expanded with additional rules and/or updated with changed and/or deleted rules at later times, for example by end users of the system. Different sets of rules applicable to different types of KRs may also be stored for different end users or applications, for example in user accounts. Further, in some embodiments knowledge processing rules may be reused and combined in novel ways to address the requirements for specific KRs.

The exemplary rules presented in FIG. 8 are discussed below with reference to specific examples involving the exemplary KR types provided in the figure. It should be appreciated that any of the generalized methods described above may be applied to any of the following examples, with differing inputs, outputs and knowledge processing rules being involved. It should also be appreciated that, although many different aspects of a knowledge creation theory may be modeled through the exemplary rules discussed herein, various other types of rules are possible. The examples that follow are largely driven by the topology of the knowledge representation data structures. Other bases for rules may include linguistic morphology and syntax, phonology, metaphor, symbolism, and sensory perception, among others.

In some embodiments, encoding a set of knowledge processing rules such as the exemplary rules given in FIG. 8 within an atomic knowledge representation model may allow for analyzing and/or synthesizing any complex KR within a set of supported KR types, such as those represented in FIG. 8. In the example of FIG. 8, "X" marks show which rules of the exemplary set of six rules apply to which KR types of the exemplary set of five KR types. In these examples, each rule may be applied bi-directionally in analysis or synthesis of complex KRs of types to which it applies. For instance, given an input thesaurus KR, FIG. 8 makes clear that rules 1, 2, 3 and 4 may be applied to the input thesaurus to deconstruct it to elemental concepts and concept relationships to be included in the elemental data structure. In another example, applying rules 1, 2 and 3 to an elemental data structure results in an output synonym ring KR. The use of each of these exemplary rules to perform analysis and/or synthesis of appropriate complex KRs is described below with reference to examples.

Taxonomy Rules

The following inputs/outputs and knowledge processing rules provide features of a taxonomy, as a hierarchical classification of concepts.

Input/Output:

A set of concepts C

A set of hierarchical relationships (acyclic)

$$R=\{r(c_i,c_j):c_i,c_j \in C \text{ and } c_i \text{ Is-a } c_j\}$$

Definition 1 (Coherent Concepts):

Two concepts $c_i, c_j$ are considered coherent if according to some distance metric M, $M(c_i,c_j)<T$, where T is a pre-chosen threshold. Possible example metrics include: frequency of co-occurrence of the two concepts in an input corpus, or a tree distance function applied on the taxonomy hierarchy.

Rule 1 (Coherent Concepts Synthesis):

Create a new concept $c=\{c_i,c_j\}$.

c is said to be comprised of $c_i$ and $c_j$ if and only if $c_i$ and $c_j$ are coherent with respect to Definition 1.

Rule 2 (Hierarchical Relationship Synthesis): Let $c_1=\{c_{11}, c_{22}, \ldots c_{1n}\}$ be a concept comprised of n concepts, $c_{11}$ to $c_{1n}$. Similarly, let $c_2=\{c_{21}, c_{22}, \ldots C_{2m}\}$ be a concept comprised of m concepts, $c_{21}$ to $c_{2m}$. Create a new hierarchical relationship $r(c_{1i}, c_{2j})$ if and only if for each $c_{1i}$ there exists a relationship $r(c_{1i}, c_{2j})$ for some concept $c_{2j}$.

Note that the if-and-only-if part of each of the exemplary Rules (e.g., Rule 1 and Rule 2) reflects the bi-directional analysis/synthesis nature of the rule. For example, Analysis will enforce the "if" part (forcing an explicit hierarchical relationship to be presented in the AKRM to satisfy the condition). On the other hand, Synthesis will discover the "only-if" part (discover hierarchical relationships if the conditions apply).

An example of application of these exemplary rules to analyze and deconstruct an input taxonomy 200 to a more elemental data structure 300 has been given in FIGS. 2A and 2B. In the example, complex concepts 230, 250 and 270 are deconstructed to generate new more elemental concepts 235, 240, 255, 260, 275 and 280 through application of Rule 1, and their relationships through application of Rule 2. In addition, new complex concepts may be synthesized through application of Rule 1 using (for example) external corpora as evidence: {domestic, lion}, {mountain, dog}, {mountain, cat}, {domestic, goat}, {domestic, pet}, {domestic, cat}. Application of Rule 2 in synthesis may generate new concept relationships; for example, because hierarchical relationships exist between "Animal" and "Dog" and between "Animal" and "Mountain", a new hierarchical relationship between "Animal" and "Mountain Dog" may be synthesized.

Synonym Ring Rules

The following inputs/outputs and knowledge processing rules provide features of a synonym ring, as defined by the proximity of meaning across terms or concepts, or in logic, the inner substitutability of terms that preserve the truth value.

Input/Output:
A set of concepts C (possibly with "comprised of" relationships)
Lists of synonyms: Synonym $(C_i, C_j)$ Definition 2 (Semantic Similarity):
Let $c_1=\{c_{11}, c_{22}, \ldots c_{1n}\}$ be a concept comprised of n concepts, $c_{11}$ to $c_{1n}$. Similarly, let $c_2=\{c_{21}, c_{22}, \ldots c_{2m}\}$. A similarity function S, $S(C_1, C_2)$, describes the semantic similarity between two concepts. An example function is as follows:

$$S(c_1, c_2) = \sum_{i,j} S(c_1, c_2 \mid c_i, c_j)$$

$$S(c_1, c_2 \mid c_i, c_j) = \begin{cases} 1 & \text{if Synonym}(c_i, c_j) \\ 1 & \text{if } c_i = c_j \\ 1 & \text{if } \exists c_k \mid r(c_i, c_k) \wedge r(c_j, c_k) \\ 0 & \text{otherwise} \end{cases}$$

Definition 3 (Concept Intersection):
Let $C_1=\{C_{11}, C_{22}, \ldots C_{1n}\}$ be a concept comprised of n concepts, $C_{11}$ to $C_{1n}$. Similarly, let $C_2=\{C_{21}, C_{22}, \ldots C_{2m}\}$ $$c_1 \cap c_2 = \{c_l \mid \forall c_i \in c_1 \wedge c_j \in c_2 \begin{cases} c_l = c_i & \text{if } c_i = c_j \vee r(c_j, c_i) \\ c_l = c_j & \text{if } r(c_j, c_i) \\ c_l = c_k & \text{if } \exists c_k \mid r(c_k, c_k) \wedge r(c_j, c_k) \end{cases}\}$$

Rule 3 (Synonym Concepts Synthesis): Let $c_1=\{c_{11}, c_{22}, \ldots c_{1n}\}$ and $c_2=\{c_{21}, c_{22}, \ldots c_{2m}\}$ be two synonym concepts according to Definition 2. A concept $c_3=c_1 \cap c_2$ and the hierarchical relationships $r(c_1, c_3)$ and $r(c_2, c_3)$ exist if and only if $S(c_1, c_2) > T_{synonym}$, where $T_{synonym}$ is a threshold of semantic similarity that warrants the declaring of "synonyms":

$$\text{Synonym} ::= c_3 = c_1 \cap c_2 \neq \phi \wedge r(c_1, c_3) \wedge r(c_2, c_3)$$

$S(c_1, c_2) > T$ synonym

An example of a synonym ring is as follows:
Pet: Domestic Animal: Household Beast: Cat
Analysis according to Rule 3 may derive hierarchical relationships through which all four concepts are children of "Household Animal". Analysis according to Rule 1 may derive the following new concepts:
House, Domestic, Household, Animal, Beast, Mammal
Analysis according to Rule 2 may discover hierarchies in which "Domestic" and "Household" are children of "House", and "Pet", "Mammal", "Beast" and "Cat" are children of "Animal". These hierarchical relationships may be created based on the relationships between the complex concepts from which the simpler concepts were extracted. Accordingly, the following new synonym rings may be synthesized through application of Rule 3:
Cat: Pet: Mammal: Beast
Domestic: Household Thesaurus Rules The following inputs/outputs and knowledge processing rules provide features of a thesaurus, including features of the KRs described above as well as associative relationships (related terms).

Input/Output:
A set of concepts C (possibly with "comprised of" relationships)
List of Associative relationships, e.g., Synonym $(c_i, c_j)$ RelatedTerm $(c_i, c_j)$
A set of hierarchical relationships (acyclic) $R=\{r(c_i, c_i): c_i, c_j \in \text{ and } c_i \text{ NT } c_j\}$
Rule 1 (Coherent Concepts Synthesis)
applies to thesauri.
Rule 2 (Hierarchical Relationship Synthesis)
applies to thesauri.
Rule 4 (Associative Relationship Synthesis):
Let $c_1=\{c_{11}, c_{22}, \ldots c_{1n}\}$ and $c_2=\{c_{21}, c_{22}, \ldots c_{2m}\}$ be two related concepts according to some associative relationship AR. A concept $c_3=c_1 \cap c_2$, $c_4=\{AR\}$ and the three hierarchical relationships $r(c_1, c_3)$, $r(c_2, c_3)$ and $r(c_4, c_3)$ exist if and only if $S(c_1, c_2) > T_{AR}$, where $T_{AR}$ is a threshold of semantic similarity that warrants the declaring of an "AR" relationship between the two concepts:

$$\text{Associative Relation } AR ::= c_4 = \{AR\}, c_3 = c_1 \cap c_2 \neq \phi, r(c_1, c_3), r(c_2, c_3) S(c_1, c_2) > T_{AR}$$

Note that $T_{AR}$ might be set to zero if no semantic similarity is required and association via $c_3$ is enough to capture the relationship.

An example thesaurus may include the associative relationship: {Cat, Diet} is-associated-with {Fish, Food}. Analysis according to Rule 1 may derive the following new concepts:
Cat, Diet, Fish, Food
Given the appropriate patterns in the hierarchical relationships presented, new associative relationships may be synthesized through application of Rule 4, for example "Cat" is-associated-with "Fish" and "Diet" is-associated-with "Food". Again, the associative relationships may be created based on the relationships between the complex concepts from which the simpler concepts were extracted.

Faceted Classification Rules

The following inputs/outputs and knowledge processing rules provide features of a faceted classification, including facets and facet attributes as concepts, and facets as categories of concepts organized in class hierarchies. Additionally, the following examples add features of mutually exclusive facet hierarchies (facet attributes constrained as strict/mono hierarchies, single inheritance) and the assignment of facet attributes to the objects (or nodes) to be classified as sets of concepts. Further, facets are identified topologically as the root nodes in the facet hierarchies.

Input/Output:

Facet hierarchies (hierarchy of value nodes for each root facet)

Labeled terms/concepts with respect to facet values

Definition 4 (Mutually Exclusive Facet Hierarchies):

Any concept can be classified by picking one and only one node label/value/attribute from each facet hierarchy. That is, the semantics of concepts representing nodes in any facet hierarchy do not overlap.

Rules 1, 2 and 4 apply to facet classification.

Rule 5 (Facet Attribute Assignments):

Each node/value/attribute in a facet hierarchy corresponds to a concept c. A relation $r(c_i, c_j)$ exists if and only if $c_i$ appears as a child of only one parent $c_j$ in some facet hierarchy and if for any two concepts $c_1$, $c_2$ in a facet hierarchy, $C_1 \cap C_2 = \{\ \}$.

Rule 6 (Labeled Concept Assignments):

Each labeled term in the faceted classification corresponds to a concept $c_i = \{c_{i1}, c_{i2}, \ldots c_{in}\}$, where $c_{ij}$ is a label concept according to Rule 5.

An example input faceted classification is as follows:

Facet: Domestication
  Domesticated
  Wild
Facet: Species
  Animals
    Canine
      Dog
    Feline
      Cat
      Lion
    Primate
      Chimpanzee
Facet: Habitat
  Natural
    Mountain
    Jungle
    Desert
    Savanna
    Ocean
  Man-made
    City
    Farm
Facet: Region
  World
    Africa
    Asia
    Europe
    Americas
      North America
        US
        Canada
      South America Objects with assignments of facet attributes/nodes/values "Domestic dog" (North America, Domesticated, Dog)
"Mountain lion" {Americas, Wild, Cat, Mountain}
"Siamese Cat" {World, Domesticated, Cat}
"Lion" {Africa, Wild, Lion, Savanna}

As illustrated in the examples above, analysis according to Rules 2 and 5 may be used to decompose the input faceted classification into a broader facet hierarchy (using, for example, methods of facet analysis or statistical clustering).

Facet: "Pets"/* Synthetic label */
  "common pet"/* derived from cluster {domesticated, animals}*/
  "exotic pet"/* derived from cluster {wild, animals}*/

Since "Dog" and "Cat" are both "Animals" (derived from the facet hierarchy, "Animals"), the new concept, "Domesticated, Animals", may be found coherent as evident in the sets, "Domesticated, Dog", "Domesticated, Cat", etc.

Similarly, new objects with assignments of facet attributes/nodes/values may be created according to Rules 1 and 6. For example, using the rules for concept synthesis described above, new concepts could also be synthesized, such as "Lion Pet" {Man-made, Lion, domesticated}. Although this might not exist in real-life, it can be justified as possible new knowledge given the evidence in the input KR, and assessed later through (for example) user interactions with the data.

Ontology Rules

Rules 1, 2, 4, 5 and 6 apply to provide features of an ontology, including facets and facet attributes as concepts, and facets as categories of concepts organized in class hierarchies.

Consider the example complex relationship Cohabitate (COH):

Wild Cat ←COH→ Lion
Domestic Dog ←COH→ Domestic Cat

Analyzing COH relationships may break them down to more atomic relationships and concepts. The following atomic constructs are possibilities:

Wild Cat, Lion, Domestic Dog, Domestic Cat, Co-habitat

The above-described rules for knowledge creation may be applicable in a complex way to represent richer relationships, e.g., $c_1$ Relation $c_2$, where Relation is a general associative relationship. For complex relationships that are associative relationships (bi-directional), the property of intersection of meanings between the concepts that are paired in the relationship may be leveraged. For complex relationships that are hierarchical (unidirectional), the property of subsumption of meanings between the concepts that are paired in the relationship may be leveraged. The label derived for synthesized complex relationships can conform to a conventional presentation, e.g., "C1 and C2 are related because they have C3 in common."

Applying Rule 1 (Coherent Concepts Synthesis) and Rule 4 (Associative Relationship Synthesis) may result in the following more atomic concepts:

Wild, Cat, Dog, Domestic, Habitat, Wild Habitat, Domestic Habitat, "Wild Habitat" is-a Habitat, "Domestic Habitat" is-a Habitat Synthesis might construct the following concepts and relationships if found coherent:

"Wild Dog" is-comprised-of {Wild, Dog, Wild Habitat}

Hence the following higher order relationships can be deduced:

Wild Dog ←COH→ Lion
Wild Dog ←COH→ Wild Cat

Here, both "Wild Dog" and the relationships with "Lion" and "Wild Cat" are newly synthesized constructs.

Free Text (Natural Language) Example

The following is an example of natural language text that may be transformed into a structured semantic representation using approaches such as natural language processing, entity extraction and statistical clustering. Once transformed, the exemplary rules described above may be applied to process the data.

The cat (*Felis silvestris catus*), also known as the domestic cat or housecat to distinguish it from other felines and felids, is a small carnivorous mammal that is valued by humans for its companionship and its ability to hunt vermin and household pests. Cats have been associated with humans for at least 9,500 years, and are currently the most popular pet in the world. Due to their close association with humans, cats are now found almost everywhere on Earth.

Figure 9:
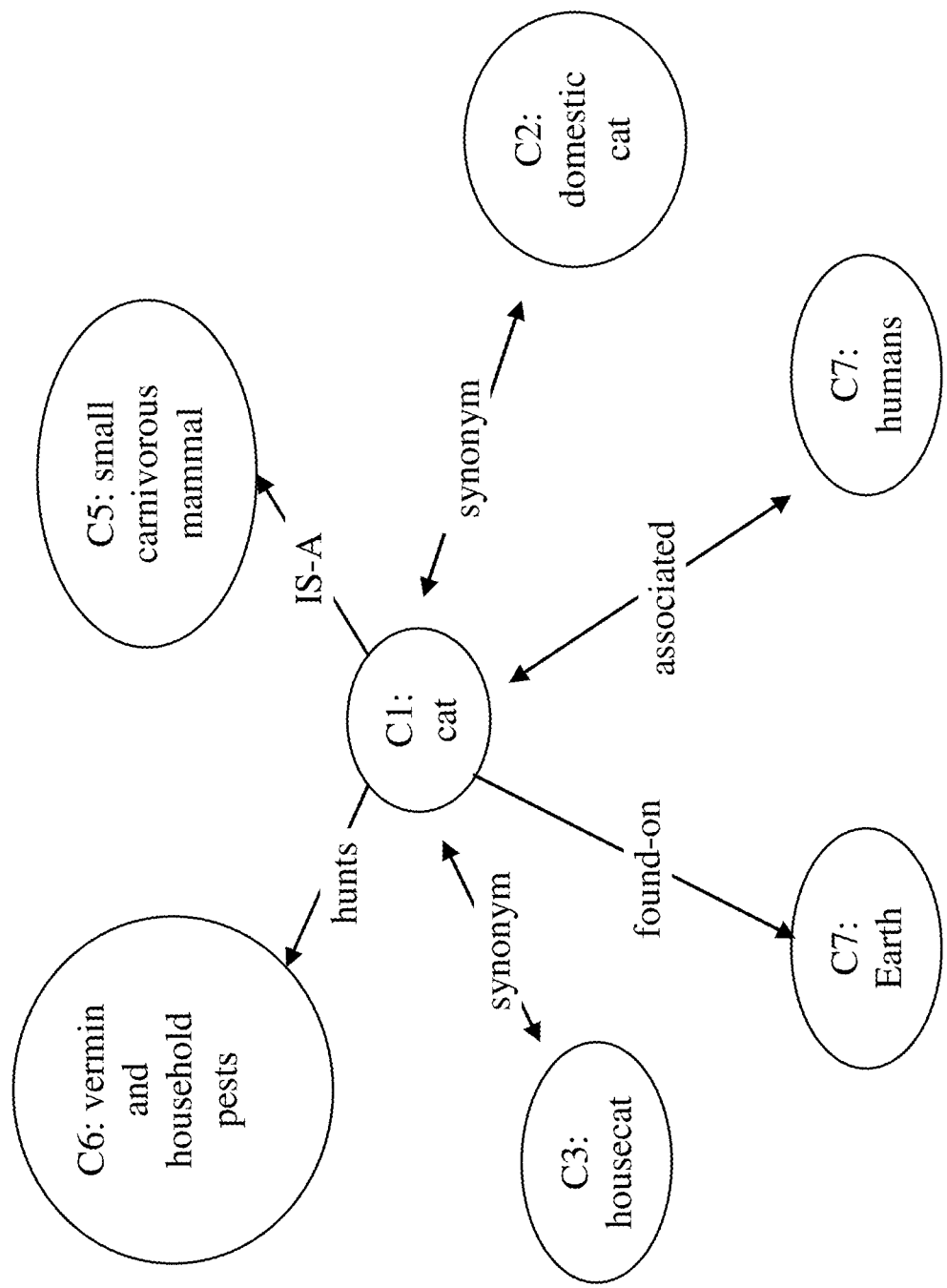
FIG. 9 illustrates an example of a knowledge representation that may be derived from an exemplary natural language text.

A structured knowledge representation as illustrated in FIG. 9 may be derived from this natural language text. This knowledge representation may be processed using the rules described under each illustrative knowledge representation type, as follows:

Taxonomy:
C1 is-a C5 (hierarchy)
Synonym Ring:
C1: C2: C3
Thesaurus:
C1 is-associated-with C7
Ontology:
C1 hunts C6; C1 is-found-on C7

Applying synthesis to this example, additional structured data may be derived. For example, applying Rule 1 (Coherent Concepts Synthesis), additional concepts may be derived:
C8: domestic
C9: house New relationships may then be synthesized, for example by application of
Rule 3 (Synonym Concepts Synthesis):
C8::C9 ("domestic" is a synonym of "house")
Semantic Interoperability Example The following example illustrates semantic interoperability, where an input in one KR may be transformed into a different KR as output. The exemplary processing described below may be implemented, for example, in accordance with the general data flow of the pseudo-code presented above for semantic interoperability processing.

---

Input (The input KR is a thesaurus; :: stands for synonym-of; |- stands for narrower.)
    finch :: sparrow :: chickadee
    bird :: woodpecker :: finch
    woodpecker
        |- red-headed woodpecker
        |- black-backed woodpecker
    sparrow
        |- golden-crowned sparrow
    color
        |- red
        |- black
        |- gold
    anatomy
        |- back
        |- head
            |- cap

---

Figure 10:
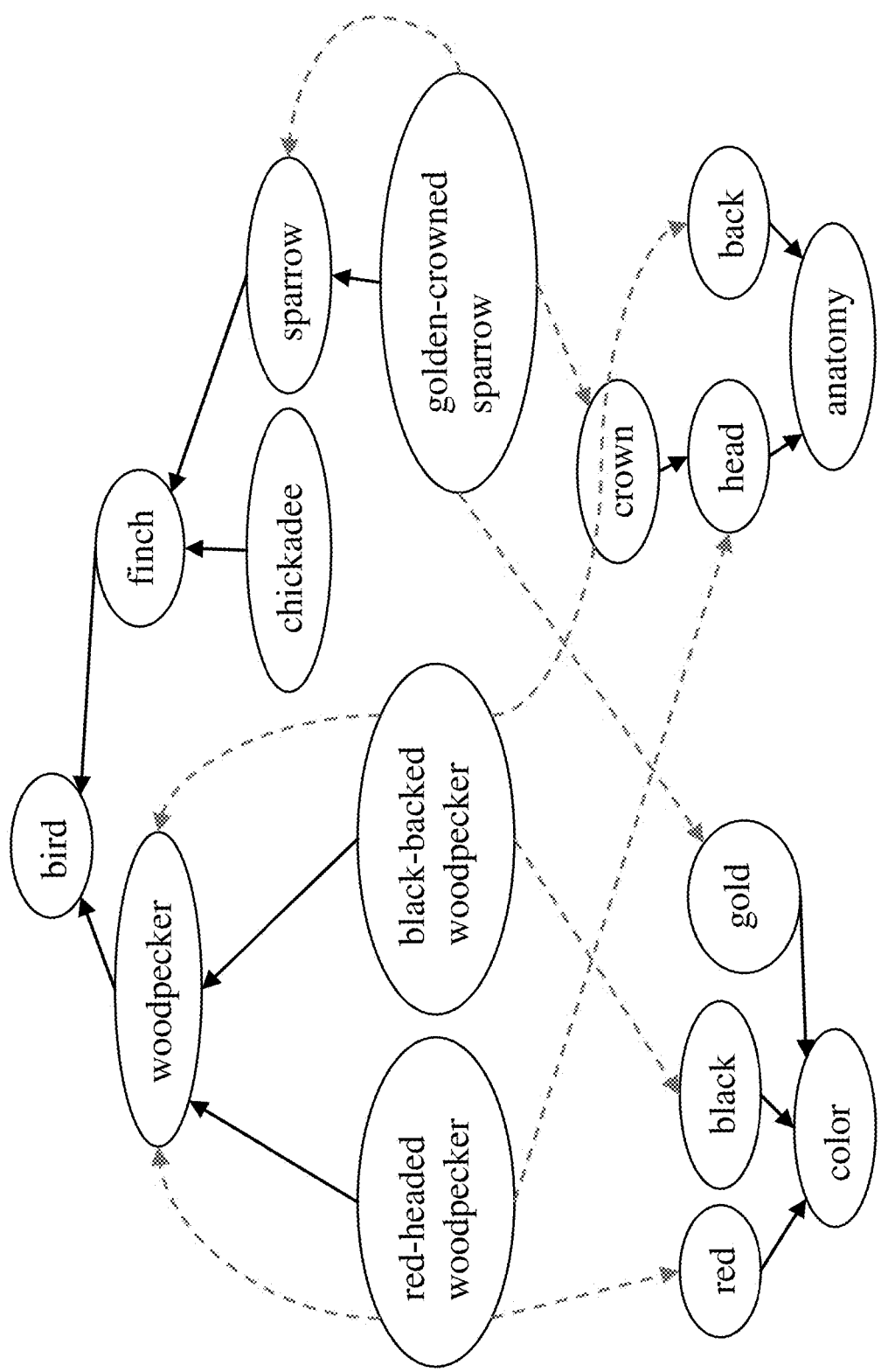
FIG. 10 illustrates an example of an elemental data structure that may be analyzed from an exemplary thesaurus.

An elemental data structure that may be analyzed from the above input KR is illustrated in FIG. 10. In the figure, solid arrows denote "is-a" relationships, and dashed arrows denote "comprised-of" relationships.

---

Output (The output KR is a facet hierarchy of the concept "red-headed woodpecker".)
    Facets
    Facet 1: Bird Species
        - woodpecker
        - finch
            - chickadee
        - sparrow -continued Facet 2: Coloration
        - red
        - black
        - gold
    Facet 3: Namesake Anatomy
        - head
            - crown
        - back
    Labeling
    "red-headed woodpecker" is {Bird Species: woodpecker, Coloration: red, Namesake Anatomy: head}

---

Note that in the example above, the atomic semantics in the AKRM representation may be used to explore the intersection of meanings across each KR (semantic interoperability). For example, the atomic concepts, "crown" and "head" may provide connections of meaning across formerly disjoint concepts, "sparrow" and "woodpecker".

III. Probabilistic Analytical Processing

A user of a knowledge representation (KR), such as an elemental data structure, may wish to ascertain information about concepts and/or relationships in the KR, such as a relevance of one concept in the KR to another concept in the KR, or a relevance of a concept in the KR to a concept in which the user has expressed interest. For example, an individual may be interested in information regarding leading goal scorers in the history of international soccer. The individual may submit a query, such as "all-time leading goal scorers," to a KR system containing information about soccer. Based on the query, a KR system may identify or generate an active concept in the KR that is relevant to the query. The KR system may then identify additional concepts in the KR that are relevant to the active concept. Because the number of concepts relevant to the active concept may be very high, the KR system may seek to distinguish more relevant concepts from less relevant concepts, and return to the user information related to a certain number of the more relevant concepts.

In some embodiments, a KR system, such as exemplary KR system 1800 of FIG. 18, may model a KR as a graph (or network) and use various parameters associated with the graph to estimate a relevance of one concept to another concept. In some embodiments, the nodes of the graph may correspond to the concepts of the KR, and the edges of the graph may correspond to the relationships among the concepts. In some embodiments, the graph may be directed. Though, in some embodiments, some or all of the edges may be undirected. In some embodiments, system 1800 may estimate a relevance of a first concept to a second concept as a shortest path length, an average path length, or a number of paths from the first concept to the second concept. In some embodiments, system 1800 may estimate a relevance of a first concept to a second concept as a function of the shortest path length, average path length, and/or number of paths. Though, embodiments of system 1800 are not limited in this regard. System 1800 may estimate a relevance of a first concept to a second concept using any flow algorithm, routing algorithm, or other appropriate graph algorithm as is known in the art or otherwise suitable for assessing a relationship between two nodes in a graph.

However, in some cases, the above-mentioned techniques may not accurately discriminate among concepts that are more relevant to an active concept and concepts that are less relevant to the active concept, because the above-mentioned techniques for estimating relevance may fail to account for uncertainties associated with the concepts and relationships in the KR. In some cases, a conventional KR system may fail to account for such uncertainties because conventional techniques for constructing a KR, such as manual KR construction techniques, may fail to identify or quantify such uncertainties. For example, conventional techniques may simply determine that a first concept is or is not relevant to a second concept, rather than estimating a strength of the first concept's relevance to the second concept. As another example, conventional techniques may simply determine that two concepts are related, rather than estimating a probability that the relationship exists.

Figure 19A:
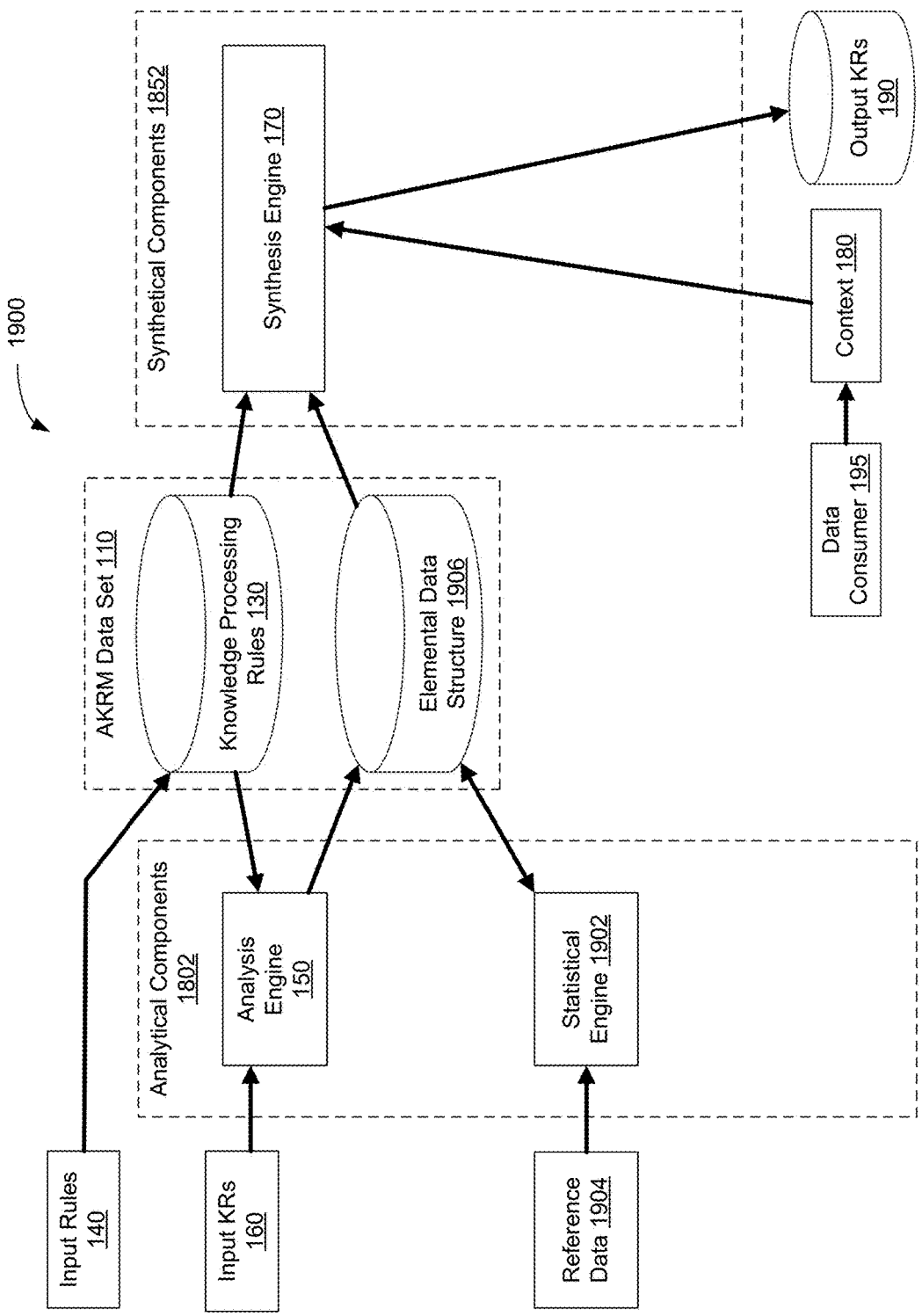
FIG. 19A is a block diagram illustrating yet another exemplary system for implementing an atomic knowledge representation model in accordance with some embodiments of the present invention.

FIG. 19A illustrates an exemplary system 1900 that may be employed in some embodiments for implementing an atomic knowledge representation model (AKRM) involved in analysis and synthesis of complex knowledge representations (KRs), in accordance with some embodiments of the present invention. In some embodiments, statistical engine 1902 may estimate probabilities associated with elemental concepts and/or elemental concept relationships in an elemental data structure 1906. In some embodiments, statistical engine 1902 may model elemental data structure 1906 as a statistical graph, with the nodes and edges of the statistical graphical model corresponding to the elemental concepts and elemental concept relationships, respectively, of the elemental data structure 1906. In some embodiments, a probability associated with an elemental component of elemental data structure 1906 may be assigned to the corresponding graphical component (i.e. node or edge) of the statistical graphical model. In some embodiments, statistical engine 1902 may apply statistical inference techniques to the graphical model to estimate the relevance of a first elemental concept of the elemental data structure 1906 to a second elemental concept of the elemental data structure 1906, and/or to estimate a relevance of an elemental concept of the elemental data structure 1906 to a data consumer 195, context information 180, or an active concept. In some embodiments, exemplary system 1900 may use these estimates to distinguish concepts that are more relevant to a data consumer 195, context information 180, or an active concept, from concepts that less relevant thereto.

In some embodiments, a probability associated with an elemental component may represent an estimate of a relevance of the elemental component. In some embodiments, a probability associated with an elemental concept relationship between first and second elemental concepts may represent an estimate of a relevance of the first elemental concept to the second elemental concept, and/or a relevance of the second elemental concept to the first elemental concept. In some embodiments, a probability associated with an elemental concept may represent an estimate of a relevance of the elemental concept to a data consumer 195, context information 180 associated with the data consumer 195, and/or an active concept extracted from context information 180. In some embodiments, a probability associated with a concept may represent a frequency with which the concept's label appears in reference data 1904. In some embodiments, the probability associated with a concept may represent an importance of the concept, which may be assigned by a data consumer 195 or determined by statistical engine 1902 based on reference data 1904.

In some embodiments, statistical engine 1902 may estimate a relevance of an elemental concept relationship between a first elemental concept and a second elemental concept by calculating a frequency of occurrence in reference data 1904 of a label associated with the first concept and/or a label associated with the second concept. In some embodiments, the calculated frequency may be a term frequency, a term-document frequency, or an inverse document frequency. For example, statistical engine 1902 may estimate a probability associated with a relationship between first and second concepts by calculating a percentage of documents in reference data 1904 that contain first and second labels associated with the first and second concepts, respectively. Methods of calculating term frequency, term-document frequency, and inverse document frequency are described in the Appendix, below. In some embodiments, a search engine may be used to determine a frequency of occurrence of a symbol or label associated with a concept in external data 1904. In some embodiments, the term-document frequency of a concept may correspond to a number of search engine hits associated with the concept's label. Additionally or alternatively, embodiments of statistical engine 1902 may estimate a relevance of an elemental concept relationship using techniques known in the art or any other suitable techniques.

In some embodiments, statistical engine 1902 may estimate a relevance of a concept to a data consumer 195 or to context information 180 by calculating a frequency of occurrence in reference data 1904 of a label associated with the concept and/or a label associated with an active concept. In some embodiments, an active concept may be provided by data consumer 195 as part of context information 180. In some embodiments, an active concept may be extracted from context information 180 using techniques known in the art or any other suitable techniques. For example, an active concept may be extracted using techniques disclosed in U.S. patent application Ser. No. 13/162,069, titled "Methods and Apparatus for Providing Information of Interest to One or More Users," filed Dec. 30, 2011, and incorporated herein by reference in its entirety. In some embodiments, an active concept may be extracted from a data consumer model associated with data consumer 195.

In some embodiments, a statistical engine 1902 may estimate that a concept is either relevant (e.g., the estimate relevance is 1) or irrelevant (e.g., the estimated relevance is 0) to a data consumer 195. In some embodiments, treating concepts as relevant or irrelevant to a data consumer 195 may facilitate construction of user-specific elemental data structures, by allowing exemplary system 1900 to identify concepts in which the data consumer has little or no interest and prune such concepts from the user-specific elemental data structure.

In some embodiments of exemplary system 1900, statistical engine 1902 may apply statistical inference techniques to compute a joint probability distribution of two or more nodes in a statistical graphical model associated with elemental data structure 1906. In some embodiments, the statistical inference techniques may account for a priori assumptions about relationships among concepts. For instance, it may be known that certain concepts are not related, or it may be known that some concepts are strongly related. In some embodiments, exemplary system 1900 may use the joint probability distribution of two or more nodes in the statistical graphical model to answer queries about relationships among concepts in elemental data structure 1906, or to synthesize an output KR 190 associated with context information 180. In some embodiments, statistical engine 1902 may estimate an extent to which two concepts are related, semantically coherent, or relevant to one another by computing appropriate marginal posterior probabilities associated with the statistical graphical model. The statistical inference techniques applied by statistical engine 1902 may be techniques known in the art or any other suitable techniques.

In some embodiments of exemplary system 1902, reference data 1904 may include knowledge representations such as documents and unstructured text, as well as non-text data sources such as images and sounds. In some embodiments, a document in reference data 1904 may comprise a phrase, a sentence, a plurality of sentences, a paragraph, and/or a plurality of paragraphs. Reference data 1904 may include a corpus or corpora of such knowledge representations. In some embodiments, reference data 1904 differs from input KRs 160 deconstructed by analysis unit 150.

FIG. 19A illustrates an exemplary system 1900 in which a computer-readable data structure storing data associated with elemental data structure 1906 may also store data associated with a statistical graphical model associated with elemental data structure 1906. For example, elemental data structure 1906 may be represented as a graph, with elemental concepts and elemental concept relationships encoded as node data structures and edge data structures, respectively. In some embodiments, the node and edge data structures associated with elemental data structure 1906 may also be associated with the statistical graphical model. In some embodiments, a relevance associated with an elemental component of elemental data structure 1906 may also be stored in a node or edge data structure. In other words, in some embodiments, the encoding of the statistical graphical model may simply be the encoding of elemental data structure 1906, or a portion thereof.

Figure 19B:
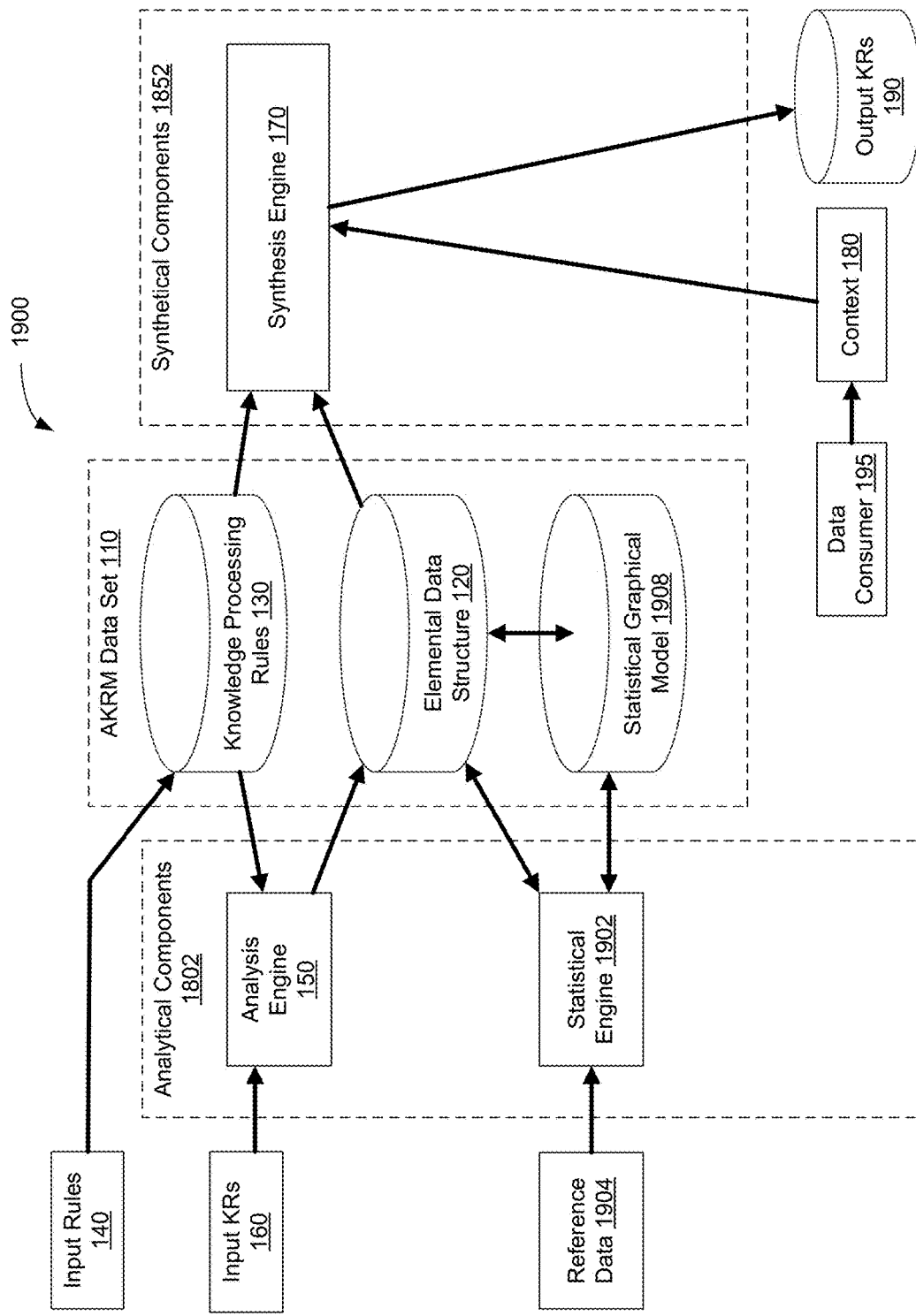
FIG. 19B is a block diagram illustrating yet another exemplary system for implementing an atomic knowledge representation model in accordance with some embodiments of the present invention.

By contrast, FIG. 19B illustrates an exemplary system 1900 in which at least a portion of statistical graphical model 1908 is encoded separately from an encoding of elemental data structure 120. In some embodiments, elemental data structure 120 may be represented as a graph, with concepts and relationships encoded as node and edge data structures, respectively. Though, in some embodiments, elemental data structure 120 may be represented as a table, with concepts and relationships encoded as entries in the table. Embodiments of exemplary system 1900 are not limited in this regard. In some embodiments, a relevance associated with an elemental component of elemental data structure 120 may be encoded as a probability in a distinct data structure associated with statistical graphical model 1908.

In some embodiments, statistical graphical model 1908 comprise nodes and edges corresponding to concepts and relationships of elemental data structure 120. In some embodiments, statistical graphical model 1908 may further comprise nodes and/or edges that do not correspond to concepts and relationships of elemental data structure 120. Accordingly, in some embodiments, statistical graphical model 1908 may be encoded as a graph data structure. The graph data structure may comprise data associated with nodes and edges of the statistical graphical model 1908. In some embodiments, the encoded data may include data corresponding to concepts and relationships of elemental data structure 120. In some embodiments, the encoded data may further comprise data corresponding to other concepts and/or relationships. In some embodiments, the encoded data may include probabilities corresponding to relevance values associated with the nodes and edges of the statistical graphical model 1908.

In some embodiments, statistical engine 1902 may modify elemental data structure 120 based on probabilities associated with statistical graphical model 1908. For example, if statistical graphical model 1908 contains an edge between two nodes corresponding to two concepts in elemental data structure 120, and a probability assigned to the edge exceeds a first relationship threshold, statistical engine 1902 may add a relationship corresponding to the edge to elemental data structure 120, and assign a relevance to the relationship that corresponds to the edge's probability. Likewise, if statistical graphical model 1908 contains an edge, and a probability assigned to the edge is less than a second relationship threshold, statistical engine 1902 may remove a relationship corresponding to the edge from elemental data structure 120.

In some embodiments, if the probability associated with a node of the statistical graphical model 1908 exceeds a first concept threshold, statistical engine 1902 may add a concept corresponding to the node to elemental data structure 120, and assign the concept a relevance that corresponds to the node's probability. Likewise, if statistical graphical model contains a node, and a probability assigned to the node is less than a second concept threshold, statistic engine 1902 may remove a concept corresponding to the node from elemental data structure 120.

Figure 12:
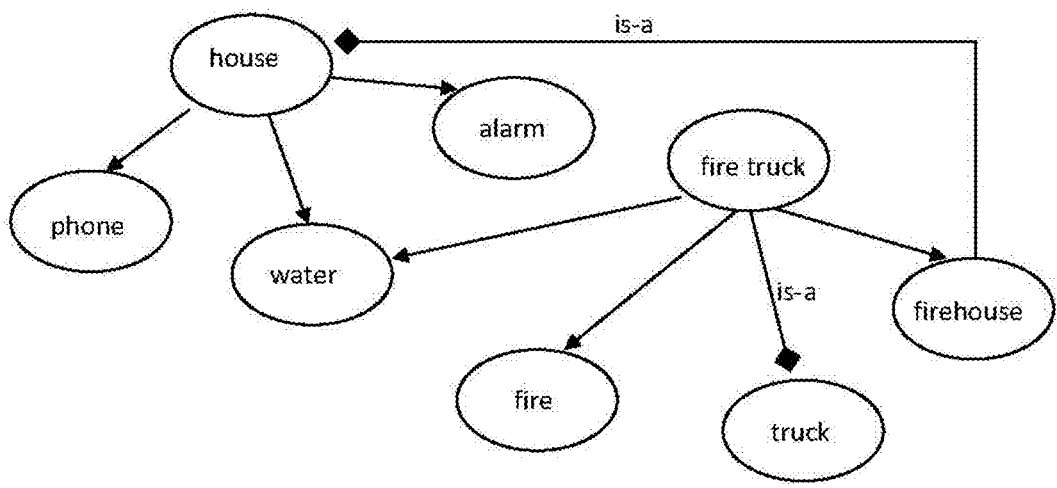
FIG. 12 is an illustration of a KR that fails to account for uncertainties associated with the concepts and relationships in the KR.

FIG. 12 illustrates limitations of a conventional KR through an example of a KR constructed in accordance with conventional KR construction techniques and represented as a graph. The graph of FIG. 12 comprises a set of vertices representing concepts such as "house," "fire truck," and "alarm," and a set of edges representing relationships between concepts, such as the subsumptive relationship between the concepts "fire truck" and "truck." Because the graph of FIG. 12 fails to account for uncertainties associated with the concepts and relationships in the KR, a user of the graph may have difficulty determining, for example, whether the concept "phone" or the concept "alarm" is more relevant to the concept "house."

Figure 14:
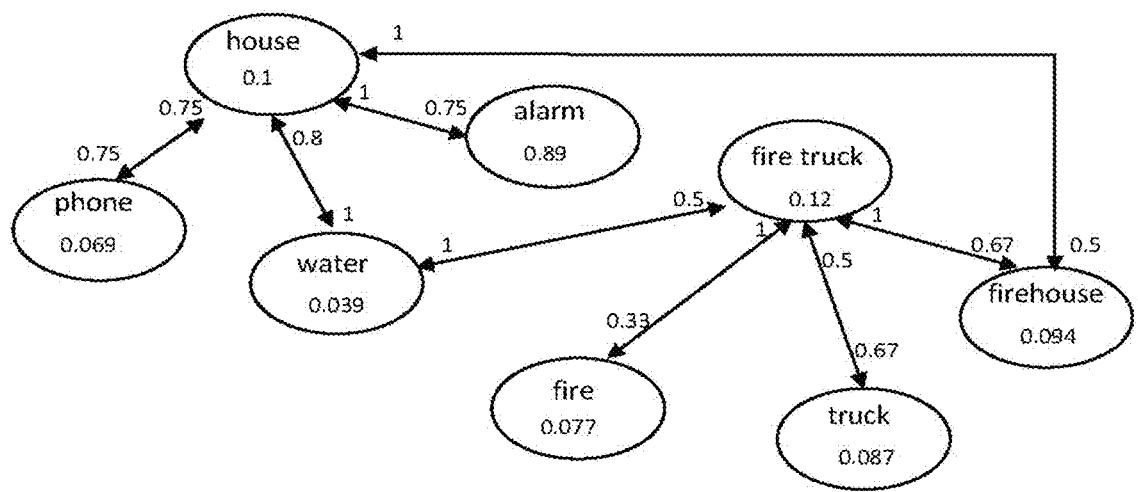
FIG. 14 is an illustration of a statistical graphical model associated with an elemental data structure.
Figure 15:
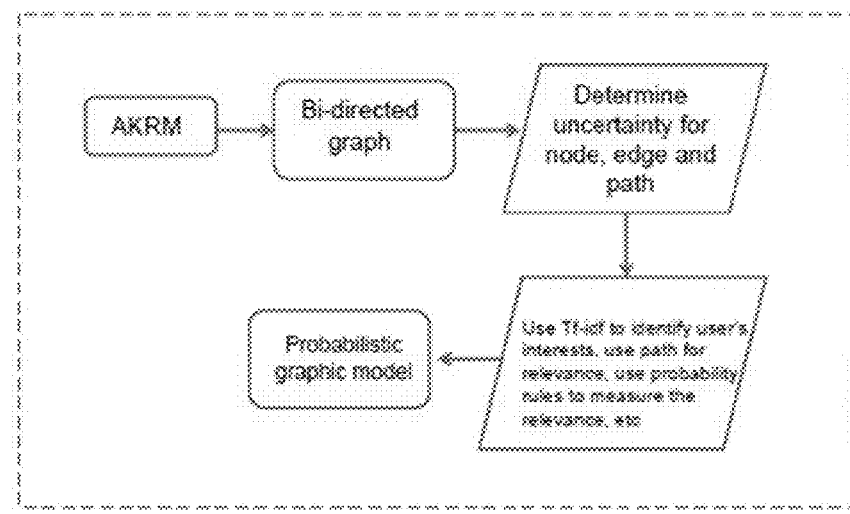
FIG. 15 is a flow chart of an exemplary process for deriving a graphical model from an AKRM.

FIG. 14 depicts an illustrative statistical graphical model associated with a KR. The nodes of the model correspond to the concepts shown in the graph of FIG. 12. The illustrated model comprises a directed graph, wherein bidirectional edges are shown using a line with arrows on each end. A probability is associated with each node and with each edge. In order to determine a relevance of the concept "fire-truck" to the concept "alarm," statistical engine 1902 may apply statistical inference techniques to the graphical model of FIG. 14. Suitable statistical inference techniques are described in the Appendix.

In some embodiments, the statistical graphical model of exemplary system 1900 may comprise a semantic network associated with an elemental data structure, with the nodes and edges of the semantic network corresponding to the concepts and relationships of the elemental data structure. In some embodiments, statistical engine 1902 may use the semantic network to check a semantic coherence associated with the elemental data structure. In some embodiments, checking a semantic coherence of an elemental data structure may comprise calculating a semantic coherence of two or more concepts in the elemental data structure. In some embodiments, calculating a semantic coherence of two or more concepts in the elemental data structure may comprise using the probabilities associated with the nodes of the statistical graphical model to compute joint probabilities associated with the nodes corresponding to the two or more concepts.

Figures 36, 37:
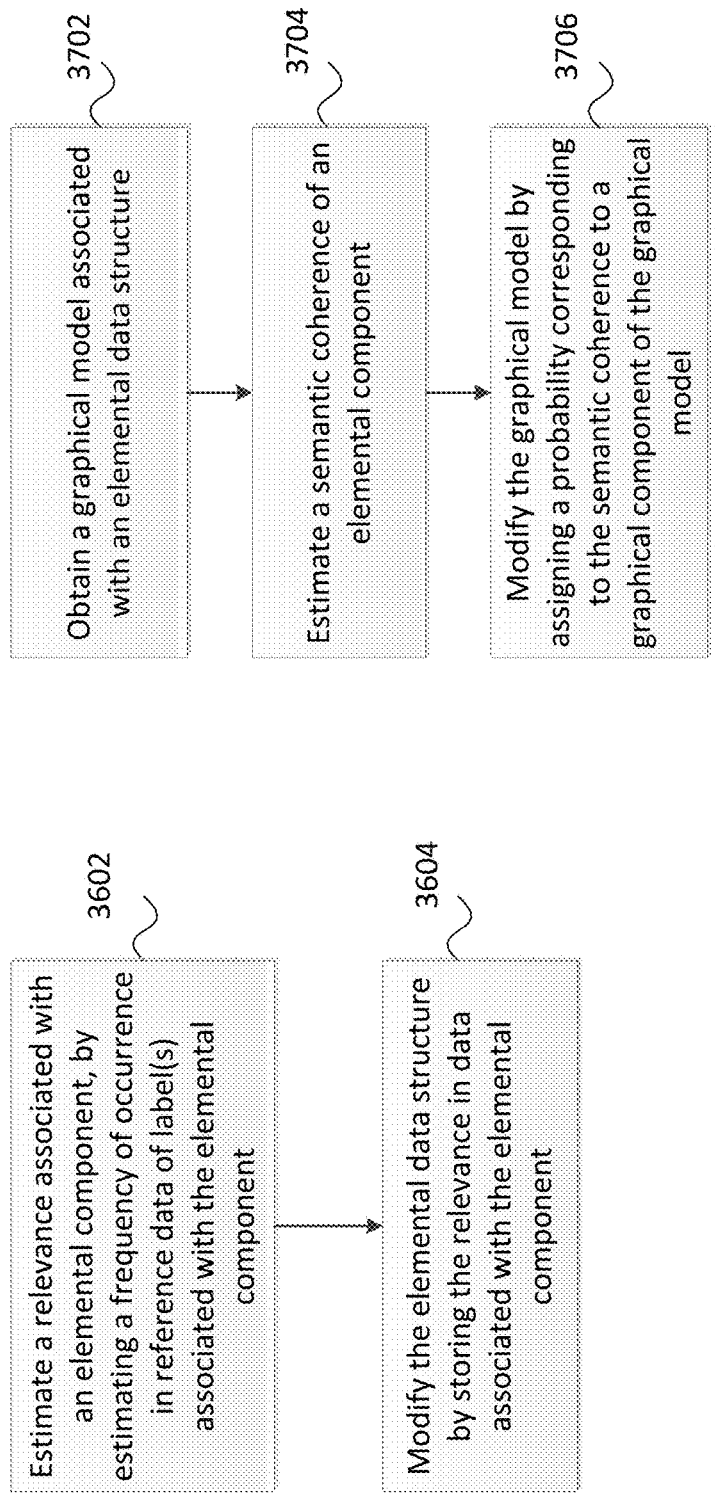
FIG. 36 is a flow chart of an exemplary process of modifying an elemental data structure based on relevance.
FIG. 37 is a flow chart of an exemplary process of a graphical model associated with an elemental data structure based on semantic coherence.

FIG. 36 depicts an exemplary method of modifying an elemental data structure to account for uncertainty associated with components of the elemental data structure. At act 3602 of the exemplary method, a relevance associated with an elemental component may be estimated. In act 3602, estimating the relevance associated with the elemental component comprises estimating a frequency of occurrence in reference data of one or more labels associated with the elemental component.

In some embodiments, the relevance estimated at act 3602 may be a relevance of a first elemental concept to a second elemental concept. In some embodiments, if the first and second elemental concepts are included in the elemental data structure, the relevance may be associated with a relationship between the two concepts. In some embodiments, if the first elemental concept is included in the elemental data structure and the second elemental concept is not, the relevance may be associated with the first elemental concept. In some embodiments, the relevance may be a relevance of a first elemental concept of the elemental data structure to a data consumer, context information, a data consumer model, or an active concept.

In some embodiments, the a frequency of occurrence in reference data of one or more labels associated with the elemental component may be a term frequency, a term-document frequency, and/or an inverse document frequency. In some embodiments, estimating a frequency of occurrence of label(s) associated with the elemental component may comprise using a search engine to identify documents containing the label(s).

At act 3604 of the exemplary method, the elemental data structure may be modified to store the computed relevance in data associated with the elemental component. Though, in some embodiments, a probability corresponding to the relevance may be stored in data associated with a node of a statistical graphical model corresponding to the elemental data structure.

FIG. 37 depicts an exemplary method of modifying a graphical model associated with an elemental data structure to store probabilities associated with components of the elemental data structure. At act 3702 of the exemplary method, a graphical model associated with the elemental data structure may be obtained. In some embodiments, the graphical model may be created with nodes and edges corresponding to the concepts and relationships of the elemental data structure, respectively. In some embodiments, the data associated with a node may include a probability corresponding to semantic coherence of the corresponding concept. In some embodiments, the data associated with an edge may include a probability corresponding to a semantic coherence of the corresponding relationship.

At act 3704 of the exemplary method, a semantic coherence of an elemental component may be estimated. In some embodiments, the elemental component may be contained in the elemental data structure. Though, in some embodiments, the elemental component may not be part of the elemental data structure. In some embodiments, the semantic coherence of an elemental component may be estimated by calculating a frequency of occurrence in reference data of one or more labels associated with the elemental component. In some embodiments, the calculated frequency may be a term frequency, term-document frequency, and/or inverse document frequency. In some embodiments the semantic coherence of two or more elemental components may be estimated by calculating a joint probability of the graphical components (nodes and/or edges) corresponding to the two or more elemental components.

At act 3706 of the exemplary method, the graphical model may be modified by assigning a probability corresponding to the semantic coherence of the elemental component to a graphical component of the graphical model. In some embodiments, the graphical component may not correspond to any elemental component in the elemental data structure. In some embodiments, such a graphical component may be used to determine a semantic coherence of a candidate concept or relationship. If the semantic coherence of a candidate concept exceeds a first threshold semantic coherence, the candidate concept may be added to the elemental data structure. If the semantic coherence of a candidate relationship exceeds a second threshold semantic coherence, the candidate relationship may be added to the elemental data structure. Likewise, if the semantic coherence associated with a component of an elemental data structure is less than a threshold semantic coherence, the component may be removed from the elemental data structure.

The above-described techniques may be implemented in any of a variety of ways. In some embodiments, the techniques described above may be implemented in software. For example, a computer or other device having at least one processor and at least one tangible memory may store and execute software instructions to perform the above-described techniques. In this respect, computer-executable instructions that, when executed by the at least one processor, perform the above described techniques may be stored on at least one non-transitory tangible computer-readable medium.

IV. Analytical Processing of User Models

Figure 20:
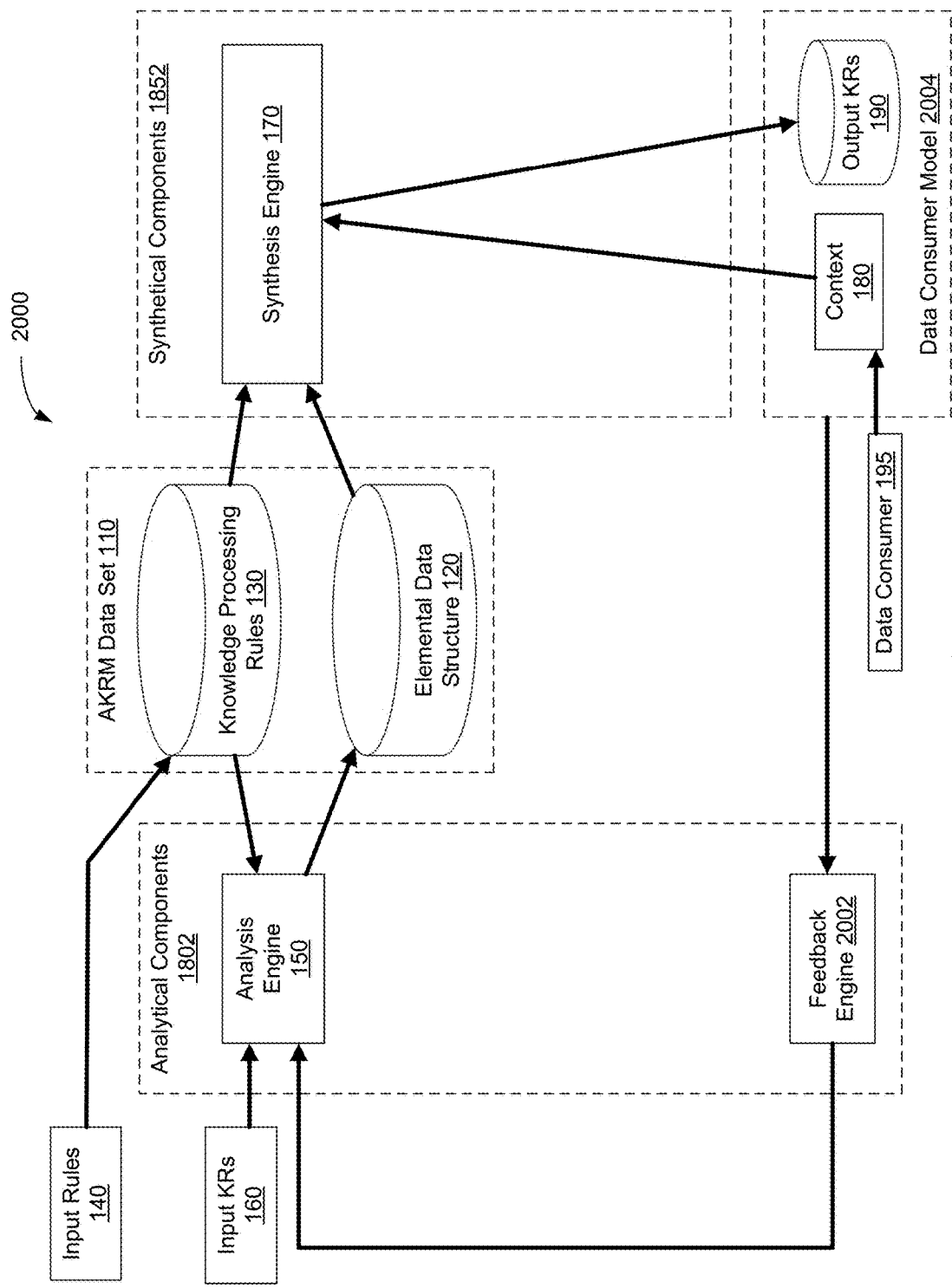
FIG. 20 is a block diagram illustrating yet another exemplary system for implementing an atomic knowledge representation model in accordance with some embodiments of the present invention.

FIG. 20 illustrates an exemplary system 2000 that may be employed in some embodiments for implementing an atomic knowledge representation model (AKRM) involved in analysis and synthesis of complex knowledge representations (KRs), in accordance with some embodiments of the present invention. In some embodiments, exemplary system 2000 may implement a complex-adaptive feedback loop through a feedback engine 2002. In some embodiments, the feedback loop may facilitate maintenance and quality improvements of one or more elemental data structures 120 in AKRM data set 110. In some embodiments, the feedback loop may facilitate disambiguation (i.e. detection and resolution of ambiguities in an AKRM), crowd sourcing (i.e. analyzing data associated with a population and modifying an AKRM to include new concepts and/or relationships associated with a threshold portion of the population), and/or tailoring (i.e. analyzing user-specific data and maintaining different elemental data structures for different users).

In an exemplary system 2000, analytical components 1802 may include a feedback engine 2002. Feedback engine 2002 may receive, as input, data consumer models 2004. Feedback engine 2002 may provide, as output, selected data consumer models 2004, or portions thereof. Analysis engine 150 may receive, as input, the selected data consumer models 2004, or portions thereof, provided by feedback engine 2002.

In some embodiments, data associated with a data consumer model 2004 may be encoded using the exemplary data schema 350 of FIG. 3, or any other suitable data structure. The data structure corresponding to a data consumer model 2004 may be stored on a computer-readable medium.

In some embodiments, a data consumer model 2004 (or "user model" 2004) may comprise data acquired from one or more information sources. For example, a user model 2004 may comprise one or more output KRs 190 provided by synthesis engine 170. In some embodiments, a user model 2004 may comprise data derived from an interaction of a data consumer 195 with an output KR 190. Exemplary interactions of a data consumer 195 with an output KR 190 may include selection, highlighting, or specification by a data consumer 195 of one or more output KRs 190 from a plurality of output KRs presented by synthesis engine 170, or selection, highlighting, or specification by the data consumer 195 of a particular aspect or portion of an output KR 190. Though, a user model 2004 may comprise data derived from any interaction of a data consumer 195 with an output KR 190. Embodiments of exemplary system 2000 are not limited in this respect. As discussed below, analysis of data derived from an interaction of a data consumer 195 with an output KR 190 may allow embodiments of analytical components 1802 to resolve ambiguities in an AKRM.

In some embodiments, a user model 2004 may comprise context information 180 or data associated with context information 180. As discussed above, context information 180 may include a textual query or request, one or more search terms, identification of one or more active concepts, etc. As discussed below, analysis of data associated with context information 180 may allow embodiments of analytical components 1802 to tailor elemental data structures to users or groups of users.

In some embodiments, a data consumer model 2004 may correspond to a data consumer 195. In some embodiments, a data consumer model 2004 corresponding to a data consumer 195 may persist for the duration of the data consumer's session with exemplary system 2000. Some embodiments of a data consumer model 2004 may persist across multiple sessions. A session may begin when a data consumer logs in or connects to exemplary system 2000, and may end when a data consumer logs out or disconnects from exemplary system 2000. Though, the scope of a session may be determined using conventional techniques or any suitable techniques. Embodiments are not limited in this respect.

In some embodiments, by feeding back user models 2004 to analytical components 1802, exemplary system 2000 may cause analytical components 1802 to modify an elemental data structure 120 based on data contained in a user model 2004. Such modifications may include adding an elemental concept to the elemental data structure, removing an elemental concept, resolving two or more elemental concepts into a single elemental concept, splitting an elemental concept into two or more elemental concepts, adding an elemental concept relationship between two elemental concepts, and/or removing an elemental concept relationship. Further, a level to which the analytical components 1802 deconstruct an elemental data structure may depend on concepts and/or relationships contained in a user model 2004. In some embodiments, a level to which the analytical components 1802 deconstruct an elemental data structure 120 may comprise an intra-word level or an inter-word level, such as with phrases and larger language fragments.

In one aspect, analytical components 1802 may resolve ambiguities in an elemental data structure 120 based on data contained in a user model 2004. In some embodiments, analytical components 1802 may resolve ambiguities in an elemental data structure 120 based on data contained in context information 180. For example, a user model 2004 may contain context information 180 including query data or active concepts that a data consumer 195 supplied to synthetical components 1852. The user model 2004 may further contain data indicating that, in response to the query data or active concepts, the synthetical components 1852 provided multiple output KRs 190 to the data consumer. The user model 2004 may further contain data indicating that the data consumer 195 selected one of output KRs. Based on this data, analytical components 1802 may ascertain one or more relationships between concepts associated with context information 180 and concepts associated with the selected output KR 190, and may add these one or more relationships to an elemental data structure 120. The addition of these one or more relationships may resolve ambiguities in the elemental data structure 120, thereby increasing the relevance of output KRs synthesized by synthetical components 1852 in response to user-supplied context information 180.

In a second aspect, exemplary system 2000 may use a feedback loop to tailor an elemental data structure to a particular data consumer or group of data consumers 195. In some embodiments, analytical components 1802 may perform tailoring by modifying a user-specific elemental data structure based on data contained in a corresponding user model 2004. In some embodiments, synthetical components 1852 may rely on user-specific elemental data structures to synthesize output KRs that are particularly relevant to the data consumer 195 associated with context information 180.

For example, a first user model 2004 corresponding to a first data consumer 195 may include data associated with baseball. Based on first user model 2004, analytical components 1802 may modify a first user-specific elemental data structure 120 corresponding to first data consumer 195 to include concepts and relationships associated with baseball. When first data consumer 195 provides a concept "bat" as part of context information 180, synthetical components 1852 may provide an output KR that is relevant to baseball bats, rather than an output KR that is relevant to (for example) winged bats.

Continuing the example, a second user model 2004 corresponding to a second data consumer 195 may include data associated with nature. Based on second user model 2004, analytical components 1802 may modify a second user-specific elemental data structure 120 corresponding to a second data consumer 195 to include concepts and relationships associated with nature. When second data consumer 195 provides a concept "bat" as part of context information 180, synthetical components 1852 may provide an output KR that is relevant to winged bats, rather than an output KR that is relevant to (for example) baseball bats.

In some embodiments, a user-specific elemental data structure may be an elemental data structure 120 constructed using at least one user model 2004 that corresponds to a particular data consumer or group of data consumers 195. In some embodiments, a user-specific elemental data structure may be encoded independent of any other elemental data structure 120, or may be encoded as one or more modifications to another elemental data structure 120.

In a third aspect, analytical components 1802 may crowd-source an elemental data structure 120. Crowd-sourcing may refer to a process of ascertaining information by relying on data associated with a population (the crowd) to verify, discredit, or discover information. In some embodiments, analytical components 1802 may perform processing, such as mathematical or statistical processing, on user models 2004 to estimate a prevalence of a concept or a relationship in a population. In some embodiments, the population may comprise all data consumers. In some embodiments, the population may comprise a group of data consumers, such as a group of data consumers having a common interest or attribute. In some embodiments, a subset of the user models 2004 may be fed back from the synthetical components 1852, the subset representing a statistical sample of the population. Upon identifying a concept or relationship associated with a threshold portion of a population, embodiments of analytical components 1802 may modify an elemental data structure 120 to include the concept or relationship. In some embodiments, a crowd-sourced elemental data structure may contain an aggregation of concepts and relationships that is associated with the crowd collectively, even if the aggregation of concepts and relationships is not associated with an individual member of the crowd.

In some embodiments, the processing performed by the analytical components 1802 may comprise calculating a portion (e.g., a number or a percentage) of user models 2004 that contain a concept or relationship. In some embodiments, the processing performed by the feedback engine 2002 may comprise estimating a portion (e.g., a number or a percentage) of population members associated with the concept or relationship. In some embodiments, if the calculated or estimated portion exceeds a threshold, the feedback engine 2002 may provide a knowledge representation containing the concept or relationship to the analysis engine 150. The threshold may be fixed or configurable.

For example, if a threshold portion of user models contain evidence of a first relationship between a concept "bat" and a concept "baseball," the feedback engine 2002 may provide a knowledge representation containing a relationship between the concept "bat" and the concept "baseball" to analysis engine 150, and the analysis engine may apply knowledge processing rules 130 to modify an elemental data structure 120 to include the first relationship.

Figure 26:
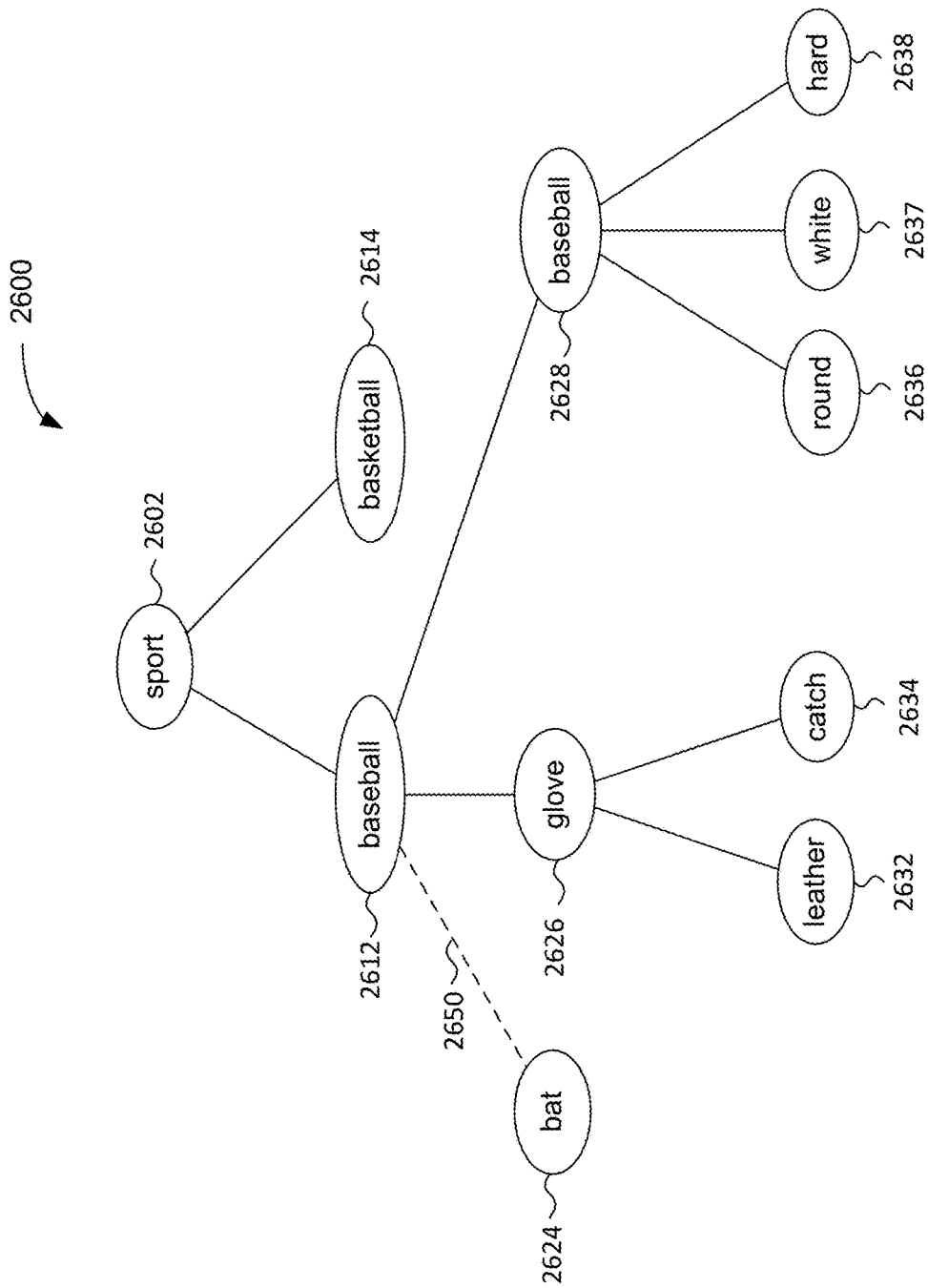
FIG. 26 illustrates an example of a knowledge representation that may be modified by to include a relationship detected in a user model.

If the elemental data structure already contains the concepts "baseball" and "bat," but does not contain a relationship between the concepts, modifying the elemental data structure to include the first relationship between "bat" and "baseball" may comprise adding the first relationship to the elemental data structure. FIG. 26 illustrates such a scenario. In FIG. 26, a relationship 2650 is added to an elemental data structure 2600. The relationship 2650 relates two concepts, baseball 2612 and bat 2624, which were already present in elemental data structure 2600.

Figure 27:
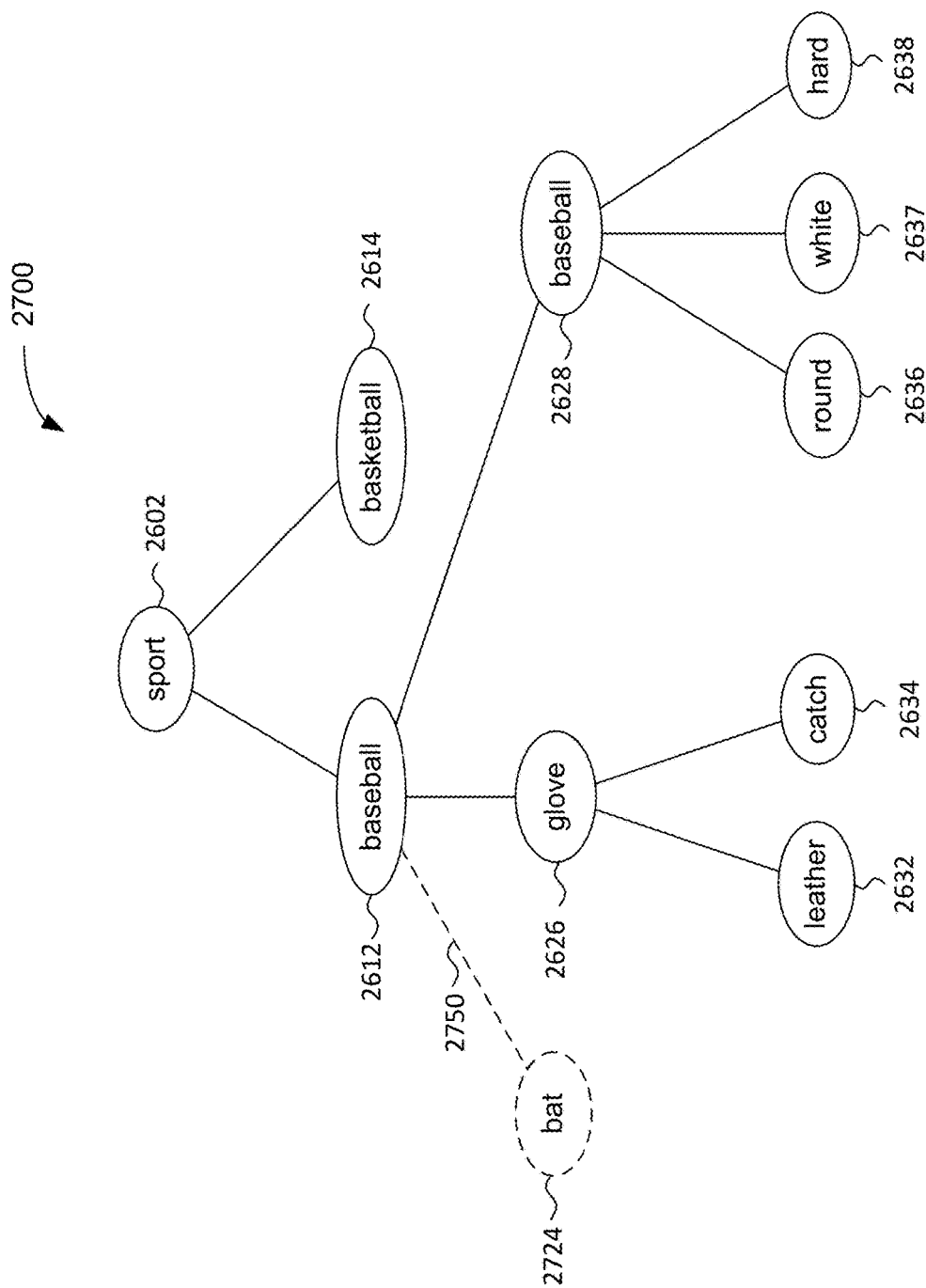
FIG. 27 illustrates an example of a knowledge representation that may be modified by to include a relationship and a concept detected in a user model.

If the elemental data structure contains the concept "baseball" but not the concept "bat," modifying the elemental data structure to include the first relationship between "bat" and "baseball" may comprise adding the concept "bat" and the first relationship to the elemental data structure. FIG. 27 illustrates such a scenario. In FIG. 27, a concept "bat" 2724 and a relationship 2750 are added to an elemental data structure 2700. The relationship 2750 relates the new concept, "bat" 2724, to the pre-existing concept "baseball" 2612.

Some embodiments involve applying knowledge processing rules 130.

In some embodiments, application of knowledge processing rules 130 by analysis engine 150 to a crowd-sourced knowledge representation may result in merging a first concept and a second concept (i.e. resolving the two concepts into a single concept). The first and second concepts may be associated with first and second labels. In some embodiments, the first and second labels may be identical. In some embodiments, the relationships associated with the single concept (after the merge operation) may comprise the union of the relationships associated with the first and second concepts (prior to the merge operation). For example, an elemental data structure 120 may contain a first concept "bat" related to a concept "wood" and a second concept "bat" related to a concept "swing." The first and second concepts may be merged into a single concept "bat" that is related to both "wood" and "swing."

Figure 28A:
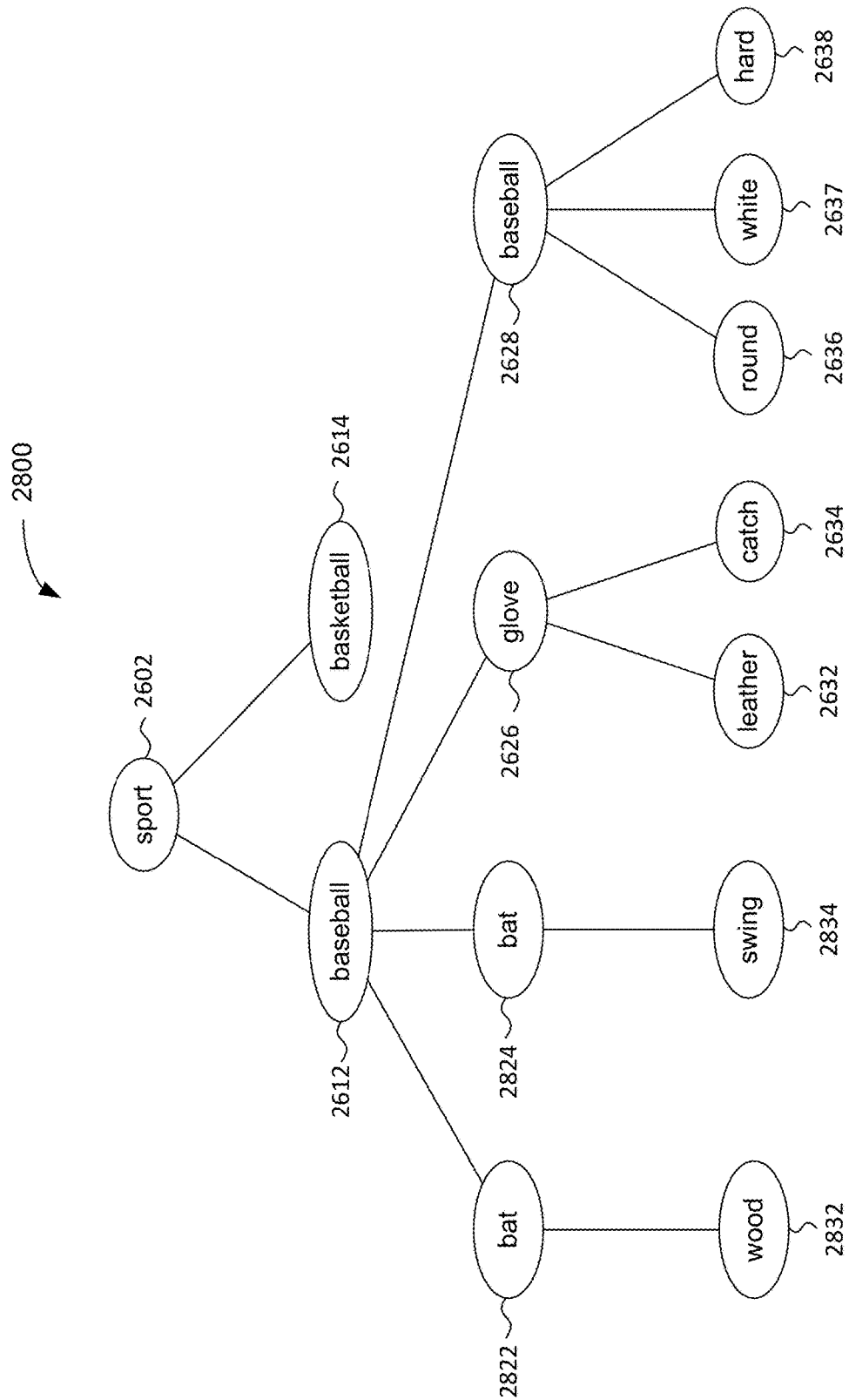
FIG. 28A illustrates an example of a knowledge representation containing two concepts that may eligible for merging.
Figure 28B:
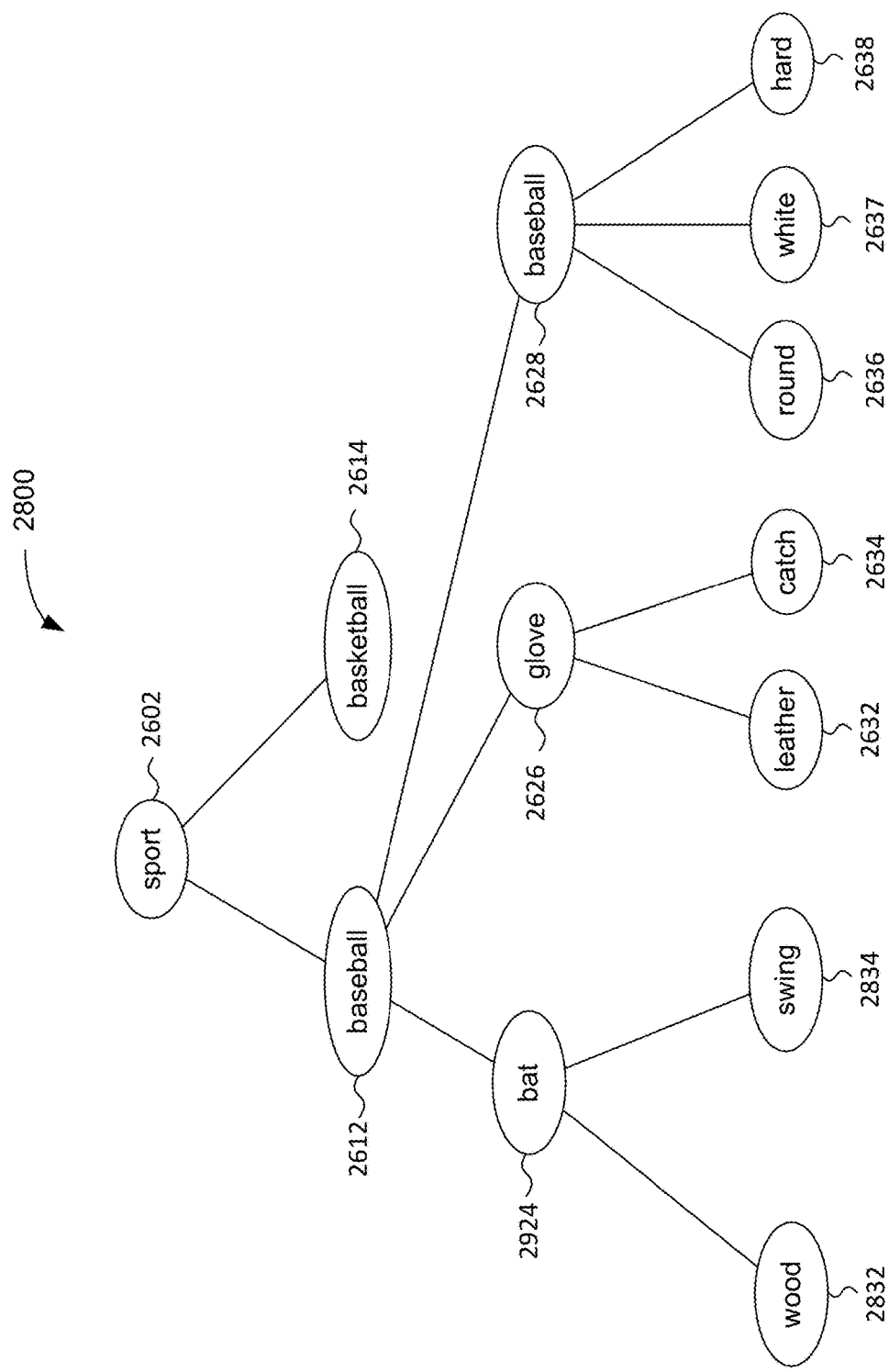
FIG. 28B illustrates an example of the knowledge representation of FIG. 28A after merging two concepts.

FIGS. 28A and 28B illustrate an example of resolving a first concept "bat" 2822 and a second concept "bat" 2824 into a merged concept "bat" 2924. In FIG. 28A, an exemplary elemental data structure 2800 includes a concept "baseball" 2612 that is related to a first concept "bat" 2822 and a second concept "bat" 2824. The first concept "bat" 2822 is also related to a concept "wood" 2832, and the second concept "bat" 2824 is also related to a concept "swing" 2834. FIG. 28B illustrates the exemplary elemental data structure 2800 after the two "bat" concepts have been resolved into a merged concept, "bat" 2924. In FIG. 28B, the merged concept "bat" 2924 is related to the concepts "baseball" 2612, "wood" 2832, and "swing" 2834.

Such a concept resolution operation may, according to some approaches, occur in response to data provided by feedback engine 2002, such as data consumer model 2004. Continuing the example of FIGS. 28A and 28B, a data consumer model 2004 may include the three concepts "bat", "swing" and "wood." Such concepts may be constituents of other concepts, such as in a situation where data consumer model 2004 includes the concepts "wood bat" and "swing". Alternatively, each of these three concepts may independently co-occur in data consumer model 2004. The co-occurrence of these three concepts in data consumer model 2004 may suggest that the concept "bat" 2822 as it pertains to "swing" 2834, and the concept "bat" 2824 as it pertains to "wood" 2832, may be represented as one entity "bat" 2924.

According to some aspects, feedback engine 2002 may initiate such concept resolution when a threshold number of distinct data consumer models 2004 provide evidence that two concepts may be represented as a single concept. In yet other aspects, concept resolution may occur in a user-specific elemental data structure. For example, the merged concept may be stored in a user-specific elemental data structure associated with data consumers 195 who provided evidence that the two concepts could be represented as a single concept.

Figures 24, 25:
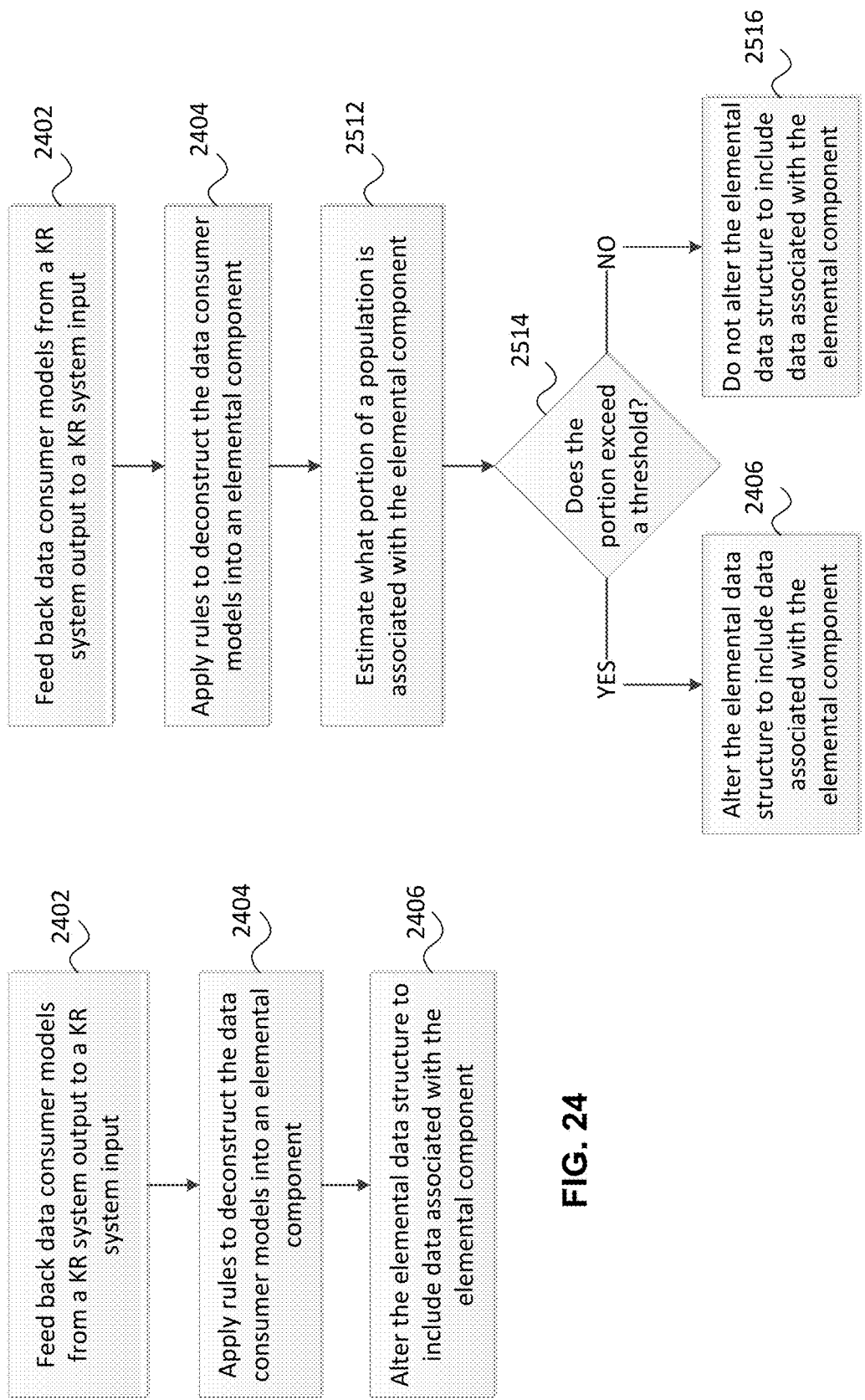
FIG. 24 is a flow chart of an exemplary process of modifying an elemental data structure based on feedback.
FIG. 25 is a flow chart of an exemplary process of crowd-sourcing an elemental data structure.

FIG. 24 depicts an exemplary method of modifying an elemental data structure based on feedback. At act 2402 of the exemplary method, one or more data consumer models (user models) are fed back from an output of a knowledge representation system to an input of a knowledge representation system. In some embodiments, the user models may correspond to one or more data consumers 195 associated with the knowledge representation system. In some embodiments, feeding back the user models may comprise sending the user models to analytical components 1802 of the knowledge representation system. In some embodiments, analytical components may include an analysis engine 150 and/or a feedback engine 2002. In some embodiments, feeding back the user models may comprise sending the user models directly to analysis engine 150. In some embodiments, feeding back the user models may comprise sending the user models to a feedback engine 2002 (i.e. supplying the user models to feedback engine 2002 as input to the engine). In some embodiments, feedback engine 2002 may send at least a portion of the user models to analysis engine 150 (i.e. supplying the user models to analysis engine 150 as input to the engine). In some embodiments, the portion may comprise a part of a user model.

At act 2404 of the exemplary method, knowledge processing rules are applied to the user models (or portions of user models) fed back by the knowledge representation system. In some embodiments, the applied rules may be knowledge processing rules 130. In some embodiments, the same knowledge processing rules that are applied to input KRs 160 may be applied to the user models. In some embodiments, knowledge processing rules that are not applied to input KRs may be applied to the user models. By applying knowledge processing rules to the user models, analytical components 1802 may deconstruct the user models into elemental components. In some embodiments, an elemental component may comprise an elemental concept and/or an elemental concept relationship.

At act 2406 of the exemplary method, an elemental data structure 120 may be altered to include a representation of an elemental component provided by analysis engine 150. Such alterations may include adding an elemental concept to the elemental data structure, removing an elemental concept, resolving two or more elemental concepts into a single elemental concept, splitting an elemental concept into two or more elemental concepts, adding an elemental concept relationship between two elemental concepts, and/or removing an elemental concept relationship.

FIG. 25 depicts an exemplary method of crowd-sourcing an elemental data structure. See above for descriptions of embodiments of acts 2402, 2404, and 2406. At act 2512 of the exemplary method, analytical components 1802 may estimate what portion of a population is associated with the elemental component provided during act 2404. In some embodiments, the population may be data consumers 195, and the user models 2004 fed back from the synthetical components 1852 may comprise a statistical sample of the user models 2004 associated with data consumers 195. In some embodiments, the population may be a group of data consumers 195 sharing an attribute or interest, and the user models 2004 fed back from the synthetical components 1852 may comprise a statistical sample of the user models 2004 associated with the group of data consumers 195.

At act 2514 of the exemplary method, analytical components 1802 may determine whether the estimated portion of the population associated with the elemental component exceeds a crowd-sourcing threshold. In some embodiments, the portion may be expressed as a percentage of data consumers 195. In some embodiments, the portion may be expressed as a quantity of data consumers 195.

At act 2406 of the exemplary method of FIG. 25, the elemental data structure 120 is altered to include data associated with the elemental component, because the portion of the population associated with the elemental component exceeds the crowd-sourcing threshold. At act 2516 of the exemplary method, the elemental data structure 120 is not altered to include data associated with the elemental component, because the portion of the population associated with the elemental component does not exceed the crowd-sourcing threshold.

Figure 29:
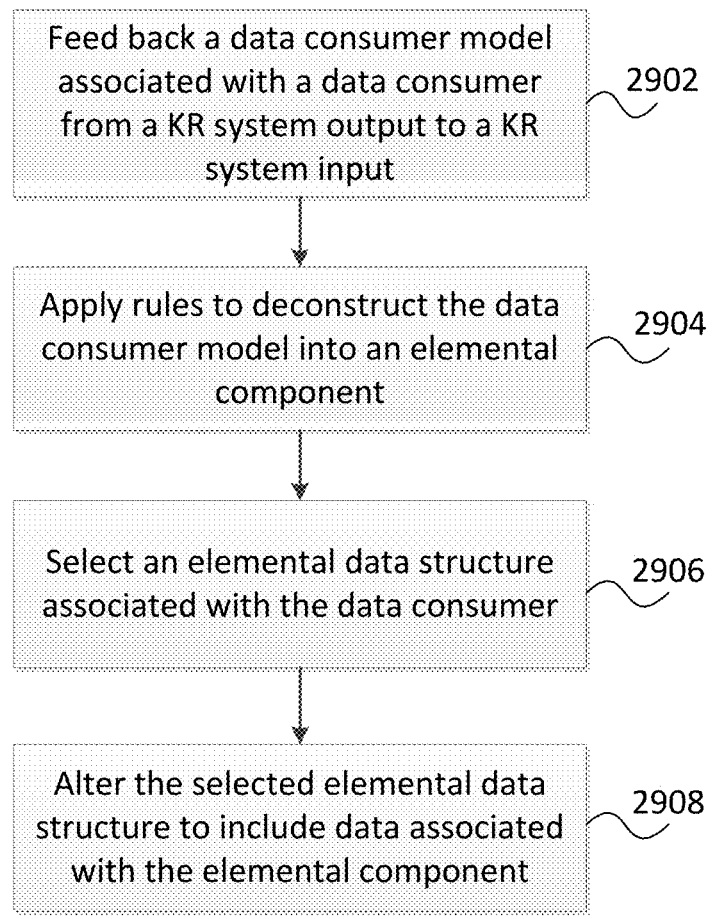
FIG. 29 is a flow chart of an exemplary process of tailoring an elemental data structure.

FIG. 29 depicts an exemplary method of tailoring an elemental data structure. At act 2902 of the exemplary method, a data consumer model is fed back from an output of a knowledge representation system to an input of a knowledge representation system. In some embodiments, the data consumer model is associated with a data consumer. At act 2904 of the exemplary method, knowledge processing rules are applied to deconstruct the data consumer model into elemental components.

At act 2906 of the exemplary method, an elemental data structure associated with the data consumer is selected. In some embodiments, AKRM data set 110 may comprise a plurality of elemental data structures. In some embodiments, some elemental data structures may be associated with all data consumers. In some embodiments, some elemental data structures may be associated with groups of data consumers. In some embodiments, some elemental data structures may be associated with individual data consumers. Associations between elemental data structures and data consumers or groups of data consumers may be tracked using techniques known in the art or any other suitable techniques. Likewise, selection of an elemental data structure associated with a data consumer may be implemented using techniques known in the art or any other suitable techniques. Embodiments are not limited in this regard.

At act 2908 of the exemplary method, the selected elemental data structure may be altered to include data associated with elemental component provided at act 2904.

V. Inferential Analytical Processing

Some concepts and relationships may be omitted from or under-represented in manually created knowledge representations (KRs). For example, a manually created KR relating to biology may not expressly indicate any relationship between the concept "biology" and the concept "science," even though biology is a field of science. Such a relationship may be omitted, for example, because an individual who manually creates the KR may consider such a relationship to be self-evident. Automatic deconstruction of manually created KRs that omit or under-represent certain concepts or relationships may yield atomic knowledge representation models (AKRMs) with associated omissions or under-representations.

Natural-language communication may implicitly convey data associated with concepts or relationships. Concepts and relationships associated with implied meanings of communication may be susceptible to detection via inferential analysis techniques. Inferential analysis techniques may be applied to natural-language communication to ascertain elemental concepts and elemental concept relationships. In some embodiments, the elemental concepts and relationships ascertained via inferential analysis techniques may augment or complement elemental concepts and relationships ascertained via techniques for deconstructing knowledge representations. Though, embodiments are not limited in this regard.

Figure 21:
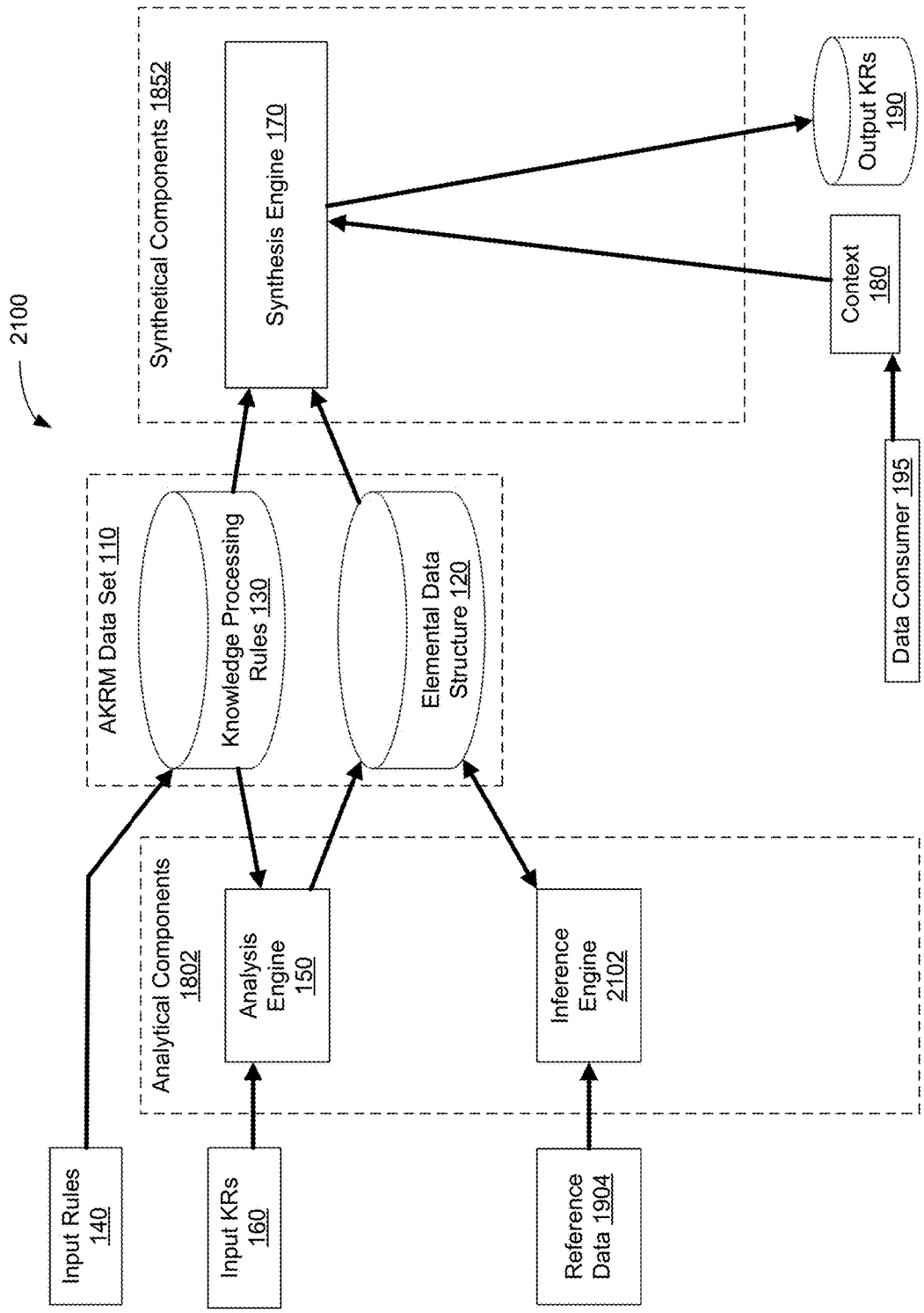
FIG. 21 is a block diagram illustrating yet another exemplary system for implementing an atomic knowledge representation model in accordance with some embodiments of the present invention.

FIG. 21 illustrates an exemplary system 2100 that may be employed in some embodiments for implementing an atomic knowledge representation model (AKRM) involved in analysis and synthesis of complex knowledge representations (KRs), in accordance with some embodiments of the present invention. In some embodiments, exemplary system 2100 may implement inferential analysis techniques through an inference engine 2102. In some embodiments, an inference engine 2102 may be implemented as software executed on one or more processors, as hardware, or as a combination of software and hardware. In some embodiments, the inference engine 2102 may apply inference rules (or "rules of implied meaning") to reference data 1904 and/or to elemental data structure 120 to ascertain concepts and relationships, and/or to estimate probabilities associated with concepts and relationships.

In some embodiments, reference data 1904 may comprise natural language documents. Natural language documents may include text-based documents, audio recordings, or audiovisual recordings. In some embodiments, natural language documents may be collected in a reference corpus or in reference corpora. In some embodiments, natural language documents may contain words organized into sentences and/or paragraphs. In some embodiments, natural language documents may be encoded as data on one or more computer-readable media.

In some embodiments, inference engine 2102 may identify elemental components by applying linguistic inference rules to reference data 1904. In some embodiments, a linguistic inference rule may comprise a linguistic pattern and an extraction rule. In some embodiments, applying a linguistic inference rule to reference data 1904 may comprise searching reference data 1904 for language that matches the linguistic pattern, and, upon detecting such language, applying the extraction rule to extract an elemental component from the detected language.

In some embodiments, a linguistic pattern may comprise a description of one or more linguistic elements and one or more constraints associated with the linguistic elements. A linguistic element may be a word, a phrase, or any other linguistic unit. Elements in a linguistic pattern may be fully constrained or partially constrained. For example, one or more attributes of an element, such as the element's part-of-speech, may be specified, while other attributes of an element, such as the element's spelling, may be unspecified. As another example, a linguistic pattern may constrain one or more elements to appear in a specified order, or may simply constrain one or more elements to appear in the same sentence. A linguistic pattern may be represented using techniques known in the art or any other suitable techniques. One of skill in the art will appreciate that techniques for using ASCII characters to represent a search pattern, template, or string may be used to represent a linguistic pattern. Though, embodiments are not limited in this respect.

As a simple illustration, the following text may represent a linguistic pattern: SEQUENCE(ELEM1.NOUN, ELEM2.WORDS("is a"), ELEM3.NOUN). The illustrative pattern contains three elements. The first element, ELEM1, is constrained to be a noun. The second element, ELEM2, is constrained to include the words "is a." The third element, ELEM3, is constrained to be a noun. The illustrative pattern imposes a constraint that the elements must be detected in the specified sequence. Thus, a portion of the reference data 1904 containing the sentence fragment "biology is a science" would match the illustrative pattern, because the fragment contains the noun "biology," the words "is a," and the noun "science" in a sequence.

As a second illustration, the following text may represent a linguistic pattern: SENTENCE(ELEM1.NOUN, ELEM2.NOUN). This illustrative pattern contains two elements. The first element, ELEM1, is constrained to be a noun. The second element, ELEM2, is also constrained to be a noun. The illustrative pattern further imposes a constraint that the elements must be detected in the same sentence. Thus, a portion of the reference data 1904 containing a sentence with the nouns "biology" and "science" would match the illustrative pattern.

In some embodiments, an extraction rule may comprise instructions for constructing an elemental component based on the portion of the reference data that matches the linguistic pattern. In some embodiments, the extraction rule may specify construction of an elemental component comprising an elemental concept, an elemental concept relationship, or an elemental concept and a relationship. In some embodiments, the extraction rule may comprise instructions for setting the elemental component's attributes, such as an elemental concept's label or an elemental concept relationship's type. An extraction rule may be represented using techniques known in the art or any other suitable techniques.

For example, the first illustrative linguistic pattern described above (SEQUENCE(ELEM1.NOUN, ELEM2.WORDS("is a"), ELEM3.NOUN)) may be associated with an extraction rule. The associated extraction rule may specify that upon detection of text matching the linguistic pattern, an elemental concept relationship should be constructed. The extraction rule may specify that the relationship's type is subsumptive, i.e. that ELEM3 subsumes ELEM1.

In some embodiments, inference engine 2102 may identify elemental components by applying elemental inference rules to elemental data structure 120. An elemental inference rule may comprise a rule for inferring an elemental component from data associated with elemental data structure 120.

In some embodiments, an elemental inference rule may comprise a rule for detecting a subsumption relationship between two elemental concepts by comparing characteristic concepts associated with the two elemental concepts. In some embodiments, concept $A_1$ may be a characteristic concept of concept A if concepts A and $A_1$ have a definitional relationship such that concept $A_1$ defines concept A. In some embodiments, an elemental inference rule may specify that concept A subsumes concept B if each characteristic concept $A_i$ of concept A is also a characteristic concept $B_j$ of concept B, or subsumes a characteristic concept $B_j$ of concept B.

Figure 30:
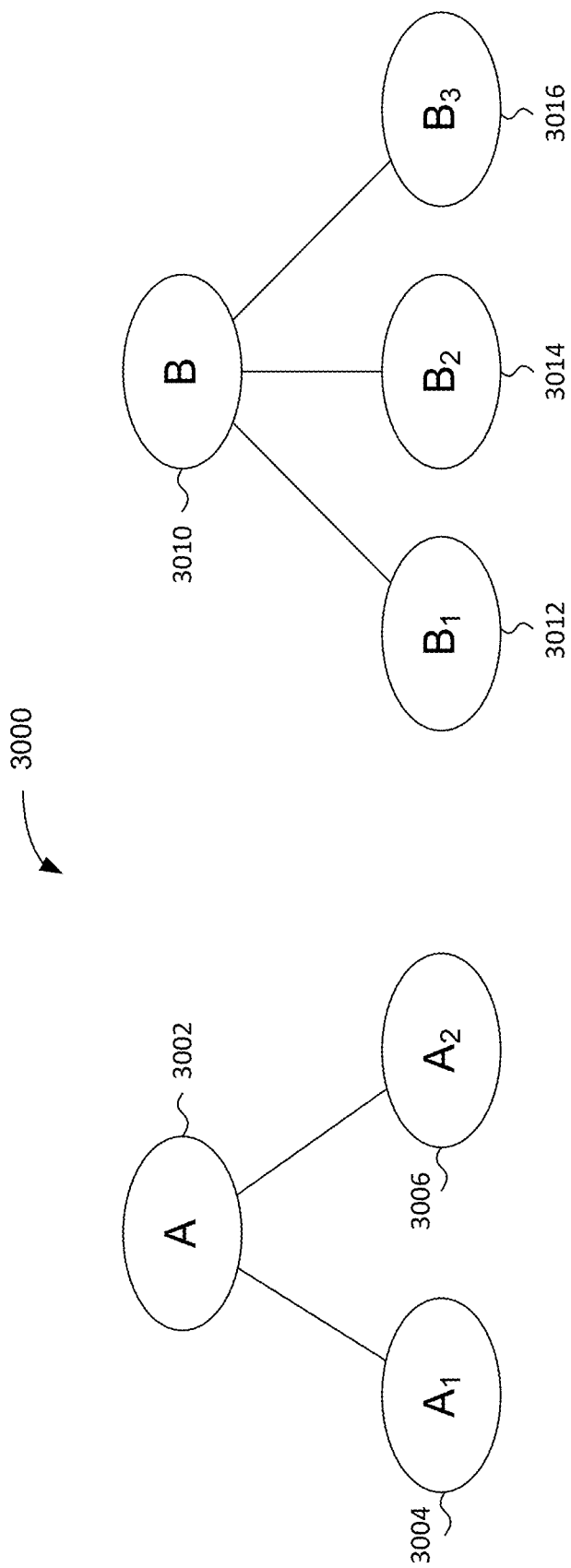
FIG. 30 illustrates portions of an elemental data structure, including two concepts and their associated characteristic concepts.

For example, FIG. 30 illustrates concept A 3002 and concept B 3010. As FIG. 30 illustrates, concept A has two characteristic concepts, $A_j$ 3004 and $A_2$ 3006, while concept B has three characteristic concepts, $B_{1j}$ 3012, $B_2$ 3014, and $B_3$ 3016. According to the elemental inference rule described above, concept A subsumes concept B if (1) concept $A_1$ subsumes (or is identical to) one of $B_1$, $B_2$, $B_3$, and (2) concept $A_2$ subsumes (or is identical to) one of $B_1$, $B_2$, $B_3$.

Figure 31:
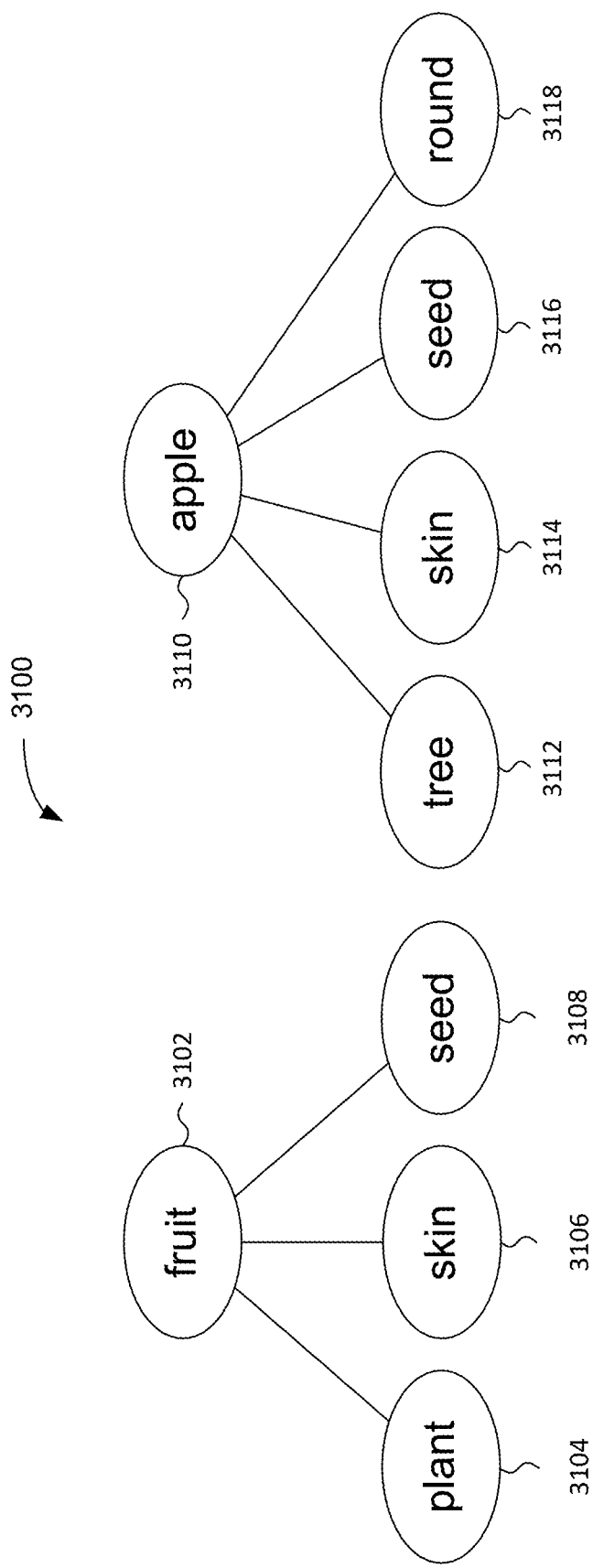
FIG. 31 illustrates portions of an elemental data structure, including two concepts and their associated characteristic concepts.

FIG. 31 further illustrates the elemental inference rule described above. In the illustration of FIG. 31, concept "fruit" 3102 has three characteristic concepts, "plant" 3104, "skin" 3106, and "seed" 3108. In the illustration, concept "apple" has four characteristic concepts, "tree" 3112, "skin" 3114, "seed" 3116, and "round" 3118. According to the elemental inference rule described above, concept "fruit" subsumes concept "apple" (or, equivalently, an "apple" is a "fruit") because two of the characteristic concepts of "fruit" 3102 ("skin" 3106 and "seed" 3108) are identical to characteristic concepts of "apple" 3110 ("skin" 3114 and "seed" 3116," respectively), while the third characteristic concept of "fruit" 3110 ("plant" 3104) subsumes "tree" 3112, which is a characteristic concept of "apple" 3110. Though, in some embodiments, a definitional relationship may exist only between a concept and constituents of that concept.

In some embodiments, inference engine 2102 may estimate probabilities associated with elemental components by applying elemental inference rules to elemental data structure 120. In some embodiments, an elemental inference rule may comprise a rule for estimating a probability of a subsumption relationship between two elemental concepts A and B based on probabilities associated with the characteristic concepts of A and B ($A_1$ and $B_j$, respectively). For example, an elemental inference rule may estimate a probability of a subsumption relationship between elemental concepts A and B as follows:

$$Pr(\text{concept } A \text{ subsumes concept } B) =$$
$$Pr(\text{an object is an instance of } A \mid \text{it is an instance of } B) =$$
$$\frac{1}{m}\sum_{i=1}^{m} Pr(A_i \mid B_{j(i)})$$

where m is a number of characteristic concepts $A_i$ of concept A, Pr denotes a probability, and $B_{j(i)}$ is a characteristic concept of B such that $A_i$ and any remaining characteristic concepts of B are independent.

Characteristic concept $B_{j(i)}$ may be identified using statistical parameter estimation techniques known in the art and any other suitable techniques. Embodiments are not limited in this regard. In some embodiments, maximum-a-posteriori or minimum-mean-squared error estimators may be used. In some embodiments, an estimator derived by minimizing an appropriate loss function may be used. In some embodiments, characteristic concept $B_{j(i)}$ may be identified through a maximum likelihood estimate approach:

$$B_{j(i)} = \mathrm{argmax}_{BK} Pr(\widehat{A_i} | B_k)$$

where $B_k$ is a characteristic concept of concept B, and $Pr(A_i|B_k)$ may be calculated based on a model of probabilities associated with elemental concepts and relationships in elemental data structure 120, such as the statistical graphical model associated with a statistical engine 1902 described above. Though, $Pr(A_i|B_k)$ may be calculated using techniques known in the art, such as maximum-a-posteriori error estimators, minimum-mean-squared error estimators, other statistical parameter estimation techniques, or any other suitable techniques. Embodiments are not limited in this regard.

In one aspect, an elemental concept relationship may be added to an elemental data structure if a probability associated with the relationship exceeds a threshold. The threshold may be adjusted based on a user's preference for certainty and aversion to error. In another aspect, any probabilities calculated by inference engine 2102 may be shared with statistical engine 1902 and integrated into a statistical graphical model of elemental data structure 120.

In some embodiments, linguistic inference rules and elemental inference rules may be used individually. That is, in some embodiments, elemental components identified by a first linguistic inference rule or elemental inference rule may be added to an elemental data structure without first applying a second linguistic inference rule or elemental inference rule to confirm the inference obtained by applying the first rule.

In some embodiments, linguistic inference rules and elemental inference rules may be used jointly. That is, in some embodiments, elemental components identified by a first linguistic inference rule or elemental inference rule may not be added to an elemental data structure until the inference obtained by applying the first rule is confirmed via application of a second linguistic inference rule or elemental inference rule.

In some embodiments, inferential rules may be applied to reference data 1904 or to elemental data structure 120 in response to the occurrence of a triggering event. In some embodiments, a triggering event may be an event associated with analytical activity or synthetical activity involving an elemental component of elemental data structure 120. In some embodiments, adding a new elemental concept or a new elemental concept relationship to elemental data structure 120 may be a triggering event. Additionally or alternatively, removing an elemental component from data structure 120 may be a triggering event. Alternatively or additionally, using an elemental component of data structure 120 during synthesis of an output KR 190 may be a triggering event.

For example, when an analytical component 1802, such as analysis engine 150, adds an elemental concept to elemental data structure 120, inference engine 2102 may apply elemental inference rules to elemental data structure 120 to infer relationships between the new elemental concept and other elemental concepts. Alternatively or additionally, inference engine 2102 may apply elemental inference rules to infer relationships between a concept related to the new elemental concept and other elemental concepts. Alternatively or additionally, inference engine 2102 may apply linguistic inference rules to reference data 1904 to infer relationships between the new elemental concept and other elemental concepts. Alternatively or additionally, inference engine 2102 may apply linguistic inference rules to reference data 1904 to infer relationships between a concept related to the new elemental concept and other elemental concepts.

In some embodiments, a triggering event may be an event associated with obtaining context information 180 associated with an elemental component of elemental data structure 120. For example, when synthesis engine 170 receives context information 180 containing an active concept, inference engine 1902 may apply inference rules to infer elemental concepts related to the active concept.

In some embodiments, linguistic inference rules may be applied other than in response to a triggering event. For example, linguistic inference rules may be applied continually or periodically to curate or refine elemental data structure 120.

FIG. 32 depicts an exemplary method of modifying an elemental data structure based on an inference. At act 3202 of the exemplary method, a first analysis rule is applied to deconstruct a knowledge representation into an elemental component. At act 3204 of the exemplary method, the elemental component obtained by applying the first analysis rule is added to the elemental data structure.

At act 3206 of the exemplary method, candidate data associated with the elemental data structure is inferred. In some embodiments, the candidate data comprises an elemental component, such as an elemental concept and/or an elemental concept relationship. In some embodiments, the candidate data comprises a probability associated with an elemental concept or an elemental concept relationship. The probability may be associated with an elemental component already present in the elemental data structure, or may be associated with an elemental component that is not present in the data structure.

At act 3206, the act of inferring the candidate data comprises detecting, in reference data, language corresponding to a linguistic pattern. In some embodiments, the linguistic pattern is encoded as a computer-readable data structure storing data associated with the linguistic pattern. In some embodiments, the linguistic pattern comprises a description of one or more linguistic elements. In some embodiments, a description of a linguistic element may fully specify the linguistic element, such a single, predetermined word or phrase may satisfy the specification. In some embodiments, a description of a linguistic element may partially specify the linguistic element, such that a plurality of words or phrases may satisfy the specification. In some embodiments, the linguistic pattern further comprises one or more constraints associated with the linguistic elements. In some embodiments, a constraint may impose a total or partial ordering on two or more linguistic elements. For example, the constraint may require two or more of the linguistic elements to appear sequentially. In some embodiments, a constraint may impose a proximity constraint on two or more linguistic elements. For example, the constraint may require two or more of the linguistic elements to appear within a specified number of words of each other, within the same sentence, or within the same paragraph.

At act 3206, in some embodiments, detecting the language corresponding to the predetermined linguistic pattern comprises detecting a first word or phrase followed by a subsumptive expression followed by a second word or phrase. In some embodiments, the first word or phrase is associated with a first elemental concept. In some embodiments, the first word or phrase is a label of the first elemental concept. In some embodiments, the second word or phrase is associated with a second elemental concept. In some embodiments, the second word or phrase is a label of the second elemental concept. In some embodiments, the subsumptive expression comprises a word or phrase that denotes a subsumptive relationship. In some embodiments, the subsumptive expression comprises "is a," "is an," "is a type of," "is a field of," or any other expression having a meaning similar to or synonymous with the meanings of the enumerated expressions.

At act 3206, in some embodiments, detecting the language corresponding to the predetermined linguistic pattern comprises detecting a first word or phrase followed by a definitional expression followed by a second word or phrase. In some embodiments, the definitional expression comprises a word or phrase that denotes a definitional relationship. In some embodiments, the definitional expression comprises "has a," "has an," "is characterized by," "includes a," "includes an," or any other expression having a similar or synonymous meaning.

At act 3206, in some embodiments, the act of inferring the candidate data further comprises applying an extraction rule associated with the linguistic pattern to obtain data associated with the detected language. In some embodiment, the candidate data comprises the obtained data.

At act 3208 of the exemplary method, the elemental data structure is modified to combine the candidate data and data associated with the elemental data structure. In some embodiments, the candidate data is added to the elemental data structure. In some embodiments, an elemental component is added to or removed from the elemental data structure based on the candidate data. In some embodiments, the candidate data is assigned as an attribute of an elemental component of the elemental data structure.

In some embodiments, the exemplary method of FIG. 32 further comprises inferring second candidate data associated with the elemental data structure. FIG. 33 depicts an exemplary method of inferring second candidate data. At act 3302 of the exemplary method, a first elemental concept is identified in the elemental data structure. In some embodiments, the first elemental concept identified at act 3302 of the exemplary method of FIG. 33 is associated with the first word or phrase detected at act 3206 of the exemplary method of FIG. 32. At act 3304 of the exemplary method, a second elemental concept is identified in the elemental data structure. In some embodiments, the second elemental concept identified at act 3304 of the exemplary method of FIG. 33 is associated with the second word or phrase detected at act 3206 of the exemplary method of FIG. 32. Though, the first and second elemental concepts identified at acts 3302 and 3304 of the exemplary method of FIG. 33 may be any elemental concepts. In some embodiments, the first elemental concept may be defined by one or more first characteristic concepts. In some embodiments, the second elemental concept may be defined by one or more second characteristic concepts.

At act 3306 of the exemplary method, it is determined that each of the second characteristic concepts is also a first characteristic concept or subsumes a first characteristic concept. In some embodiments, this determination gives rise to an inference that the second elemental concept subsumes the first elemental concept.

FIG. 34 depicts another exemplary method of modifying an elemental data structure based on an inference. Acts 3202 and 3204 of the exemplary method are described above. At act 3406 of the exemplary method, a candidate probability associated with an elemental concept relationship is inferred. In some embodiments, the elemental concept relationship may represent a relationship between first and second elemental concepts. In some embodiments, the elemental concept relationship may comprise a type, such as a subsumptive type or a definitional type. In some embodiments, the candidate probability may comprise an estimate of a probability that a relationship of the specified type exists between the first and second elemental concepts.

At act 3406 of the exemplary method, inferring the candidate probability comprises applying elemental inference rules to the elemental data structure. FIG. 35 depicts an exemplary method of applying elemental inference rules to the elemental data structure. At act 3502 of the exemplary method, a first elemental concept is identified in the elemental data structure. In some embodiments, the first elemental concept identified at act 3502 of the exemplary method of FIG. 35 is the first elemental concept associated with the elemental concept relationship associated with the candidate probability at act 3406 of the exemplary method of FIG. 34. At act 3504 of the exemplary method, a second elemental concept is identified in the elemental data structure. In some embodiments, the second elemental concept identified at act 3502 of the exemplary method of FIG. 35 is the second elemental concept associated with the elemental concept relationship associated with the candidate probability at act 3406 of the exemplary method of FIG. 34. In some embodiments, the first and second elemental concepts may be defined by one or more first and second characteristic concepts, respectively.

At act 3506 of the exemplary method, the candidate probability may be estimated by calculating the probability that each of the second characteristic concepts is also a first characteristic concept or subsumes a first characteristic concept.

In yet another exemplary method of modifying a data structure based on an inference, candidate data associated with the elemental data structure may be inferred by applying one or more inferential analysis rules to at least one of reference data or the elemental data structure. The inferred candidate data may comprise an elemental component, a probability associated with an elemental component, or an elemental component and a probability associated with an elemental component. The one or more inferential analysis rules may comprise a linguistic inference rule, an elemental inference rule, or a linguistic inference rule and an elemental inference rule. In addition, in the exemplary method, the elemental data structure may be modified by incorporating the candidate data into the elemental data structure. Incorporating the candidate data into the elemental data structure may comprise adding the candidate data to the elemental data structure, removing an elemental component from the elemental data structure based on the candidate data, combining the candidate data with data associated with the elemental data structure, etc.

VI. Preference Expression

As described above, in an exemplary system such as system 1800 of FIG. 18, embodiments of synthesis engine 170 may synthesize output knowledge representations by applying knowledge processing rules 130 to elemental data structures 120. Also, as described above, embodiments of synthesis engine 170 may be provided with context information 180 associated with a data consumer 195. In some embodiments, context information 180 may include, for example, a textual query or request, one or more search terms, identification of one or more active concepts, a request for a particular form of output KR 190, etc. In some embodiments, receipt of context information 180 may be interpreted as a request for an output KR, without need for an explicit request to accompany the context.

In some embodiments, in response to an input request and/or context information 180, synthesis engine 170 may apply one or more appropriate knowledge processing rules 130 encoded in AKRM data set 110 to elemental data structure 120 to synthesize one or more additional concepts and/or concept relationships not explicitly encoded in elemental data structure 130. In some embodiments, synthesis engine 170 may apply appropriate knowledge processing rules 130 to appropriate portions of elemental data structure 120 in accordance with the received input request and/or context information 180. For example, if context information 180 specifies a particular type of complex KR to be output, in some embodiments only those knowledge processing rules 130 that apply to synthesizing that type of complex KR may be applied to elemental data structure 120. In some embodiments, if no particular type of complex KR is specified, synthesis engine 170 may synthesize a default type of complex KR, such as a taxonomy or a randomly selected type of complex KR. In some embodiments, if context information 180 specifies one or more particular active concepts of interest, for example, synthesis engine 170 may select only those portions of elemental data structure 120 related (i.e., connected through concept relationships) to those active concepts, and apply knowledge processing rules 130 to the selected portions to synthesize the output KR. In some embodiments, a predetermined limit on a size and/or complexity of the output complex KR may be set, e.g., by a developer of the exemplary system 1800, for example conditioned on a number of concepts included, hierarchical distance between the active concepts and selected related concepts in the elemental data structure, encoded data size of the resulting output complex KR, processing requirements, relevance, etc.

In some embodiments, an output KR may be encoded in accordance with any specified type of KR indicated in the received input. In some embodiments, the output KR may be provided to data consumer 195. As discussed above, data consumer 195 may be a software application or a human user who may view and/or utilize the output KR through a software user interface, for example.

In some embodiments, a data consumer 195 may provide context information 180 for directing synthesis operations. For example, by inputting context information 180 along with a request for an output KR 190, a data consumer may direct exemplary system 1800 to generate an output KR 190 relevant to context information 180. For example, context information 180 may contain a search term that may be mapped to a concept of interest to data consumer 195. In some embodiments, synthesis engine 170 may, for example, apply knowledge processing rules to those portions of elemental data structure 120 that are more relevant to the concept associated with the context information 180.

Figure 38:
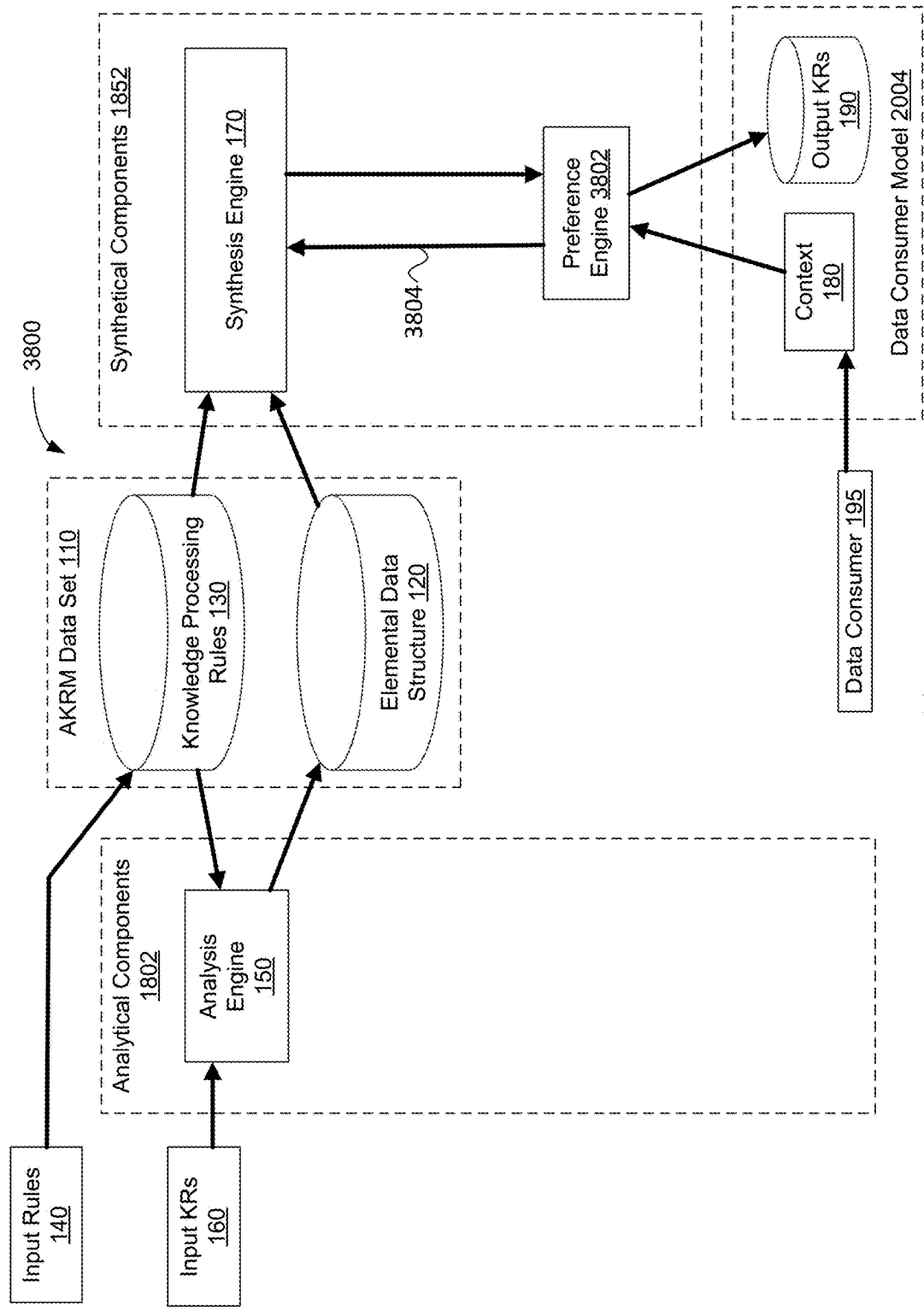
FIG. 38 is a block diagram illustrating yet another exemplary system for implementing an atomic knowledge representation model in accordance with some embodiments of the present invention.

FIG. 38 illustrates an exemplary system 3800 that may be employed in some embodiments for implementing an atomic knowledge representation model (AKRM) involved in analysis and synthesis of complex knowledge representations (KRs), in accordance with some embodiments of the present invention. In some embodiments, context information 180 may comprise preference information. In some embodiments, such preference information may comprise a preference model. In some embodiments, synthesis engine 170 may rely on the preference information and/or preference model when synthesizing KRs and/or presenting KRs to a data consumer.

Some embodiments of exemplary system 3800 may include a preference engine 3802. In some embodiments, synthetical components 1852 may comprise preference engine 3802. In some embodiments, preference engine 3802 may receive context information 180 containing preference information. In some embodiments, the preference information may comprise a preference model. In some embodiments, preference engine 3802 may create a preference model based on the preference information. In some embodiments, preference engine 3802 may provide preference information and/or a preference model to synthesis engine 170. In some embodiments, synthesis engine 170 may rely on the preference information and/or the preference model provided by preference engine 3802 to guide synthesis of a complex KR in accordance with preferences of a data consumer 195. In some embodiments, preference engine 3802 may rely on preference information and/or the preference model to guide presentation of concepts in a complex KR and/or presentation of output KRs in accordance with preferences of a data consumer 195.

In some embodiments, preference engine 3802 may assign a weight or probability to an active concept or to any elemental concept in an elemental data structure, the weight representing a relevance of the concept to a data consumer 195. The preference engine 3802 may calculate the weight assigned to a concept based on context information 180, and/or preference information, and/or the preference model.

Aspects and example embodiments of preference engine 3802 are described in U.S. Provisional Application No. 61/498,899, filed Jun. 20, 2011, and titled "Method and Apparatus for Preference Guided Data Exploration," which is incorporated by reference herein in its entirety. Some embodiments of preference engine 3802 may allow a data consumer 195 to specify different types of user preferences, e.g., among items and/or among attributes of the items.

In some embodiments, preference engine may provide preference information and/or a preference model to synthesis engine 170 to facilitate synthesis of a complex KR in accordance with preferences of a data consumer 195. In some embodiments, a preference model may comprise weighted concepts. In some embodiments, a weighted concept in a preference model may correspond to a concept in an elemental data structure 120.

In some embodiments, a preference model may influence the synthesis process in various ways. For example, in some embodiments, synthesis engine 170 may synthesize more concepts in relation to a concept in the preference model that is more heavily weighted (a "more preferred" concept), while synthesizing fewer concepts in relation to a less heavily weighted concept of the preference model (a "less preferred" concept). Synthesis engine 170 may control a degree of synthesis in relation to a concept in a variety of ways. In some embodiments the synthesis engine 170 may apply more knowledge processing rules in relation to more preferred concepts. In some embodiments, the synthesis engine 170 may use less stringent thresholds when applying a knowledge processing rule in relation to a more preferred concept. For example, synthesis engine 170 may use a lower relevance threshold, coherence threshold, semantic similarity threshold, or synonym threshold when applying a relevance rule, coherence rule, associative relationship rule, or synonym rule.

Furthermore, in some embodiments, synthesis engine 170 may temporally prioritize synthesis in relation to a more preferred concept over synthesis in relation to a less preferred concept. For example, synthesis engine 170 may synthesize concepts in relation to a more preferred concept before synthesizing concepts in relation to a less preferred concept. If synthesis engine 170 is configured to generate at most a certain maximum number of concepts, temporally prioritizing synthesis in this manner ensures that synthesis in relation to less preferred concepts does not occur at the expense of synthesis in relation to more preferred concepts. In some embodiments, synthesis engine 170 may begin synthesizing in relation to a less preferred concept only if the certain maximum number of concepts is not generated by first completing synthesis in relation to more preferred concepts.

Likewise, the synthesis engine 170 may devote more processing resources and/or processing time to synthesizing in relation to a more preferred concept, while devoting less processing resources and/or processing time to synthesizing in relation to a less preferred concept.

Additionally or alternatively, some embodiments of preference engine 3802 may rely on preference information and/or a preference model to guide presentation of an output KR's concepts in accordance with preferences of data consumer 195. In some embodiments, preference information may include a general preference model that may be used to produce a ranking of items or concepts in accordance with preferences of data consumer 195. Preference engine 3802 may use such ranking information to impose an ordering on the concepts in an output KR 190.

In other words, in some embodiments an output KR 190 may be presented to a data consumer 195 in a format that is not rank-ordered, such as a graph. In other embodiments, an output KR 190 may be presented to a data consumer 195 in a rank-ordered format, such as a list, with the rankings being assigned based on preference information.

The above-described techniques may be implemented in any of a variety of ways. In some embodiments, the techniques described above may be implemented in software executing on one or more processors. For example, a computer or other device having at least one processor and at least one tangible memory may store and execute software instructions to perform the above-described operations. In this respect, computer-executable instructions that, when executed by the at least one processor, perform the above described operations may be stored on at least one non-transitory, tangible, computer-readable medium.

VII. Exemplary Systems

Figure 22:
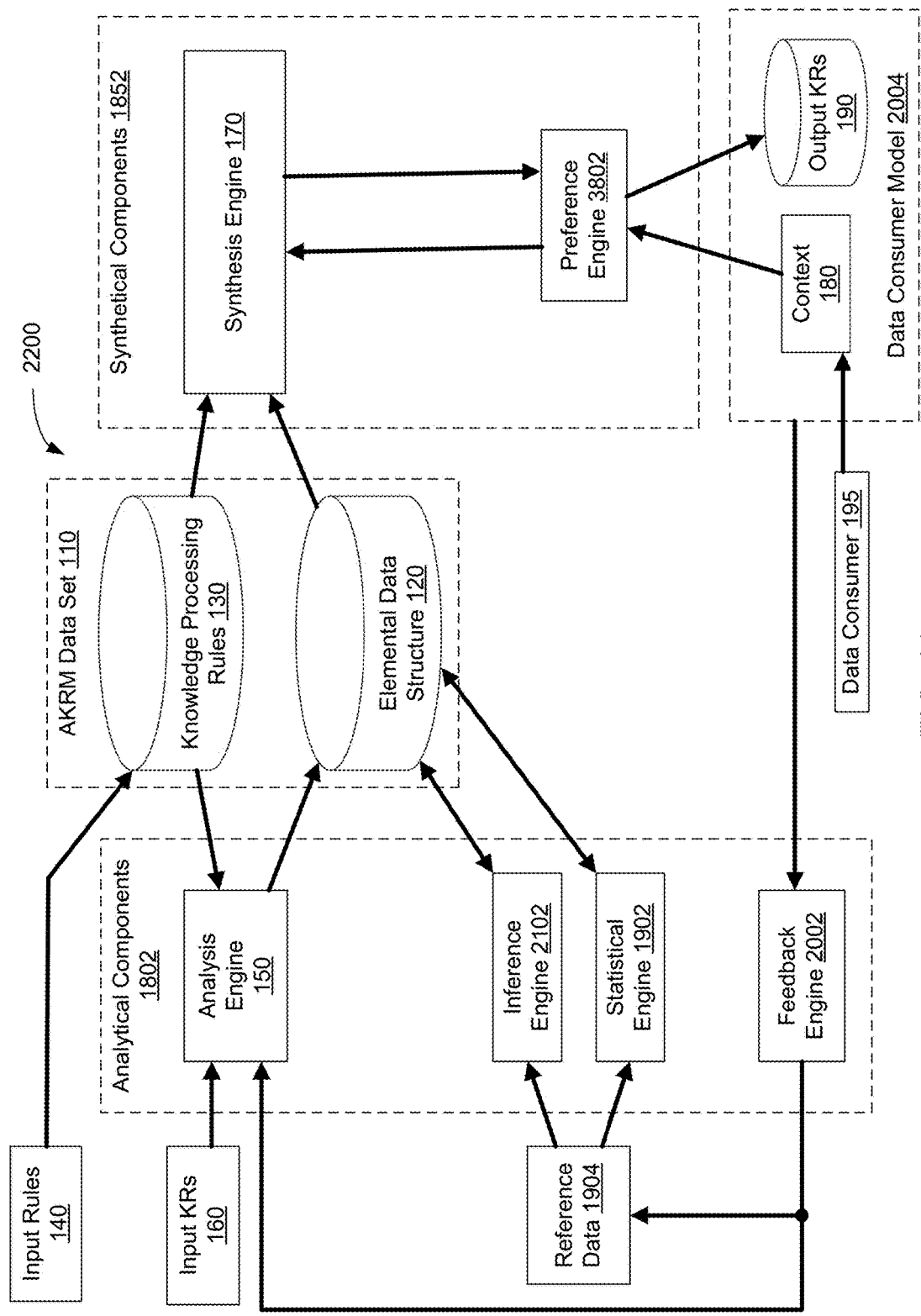
FIG. 22 is a block diagram illustrating yet another exemplary system for implementing an atomic knowledge representation model in accordance with some embodiments of the present invention.
Figure 23:
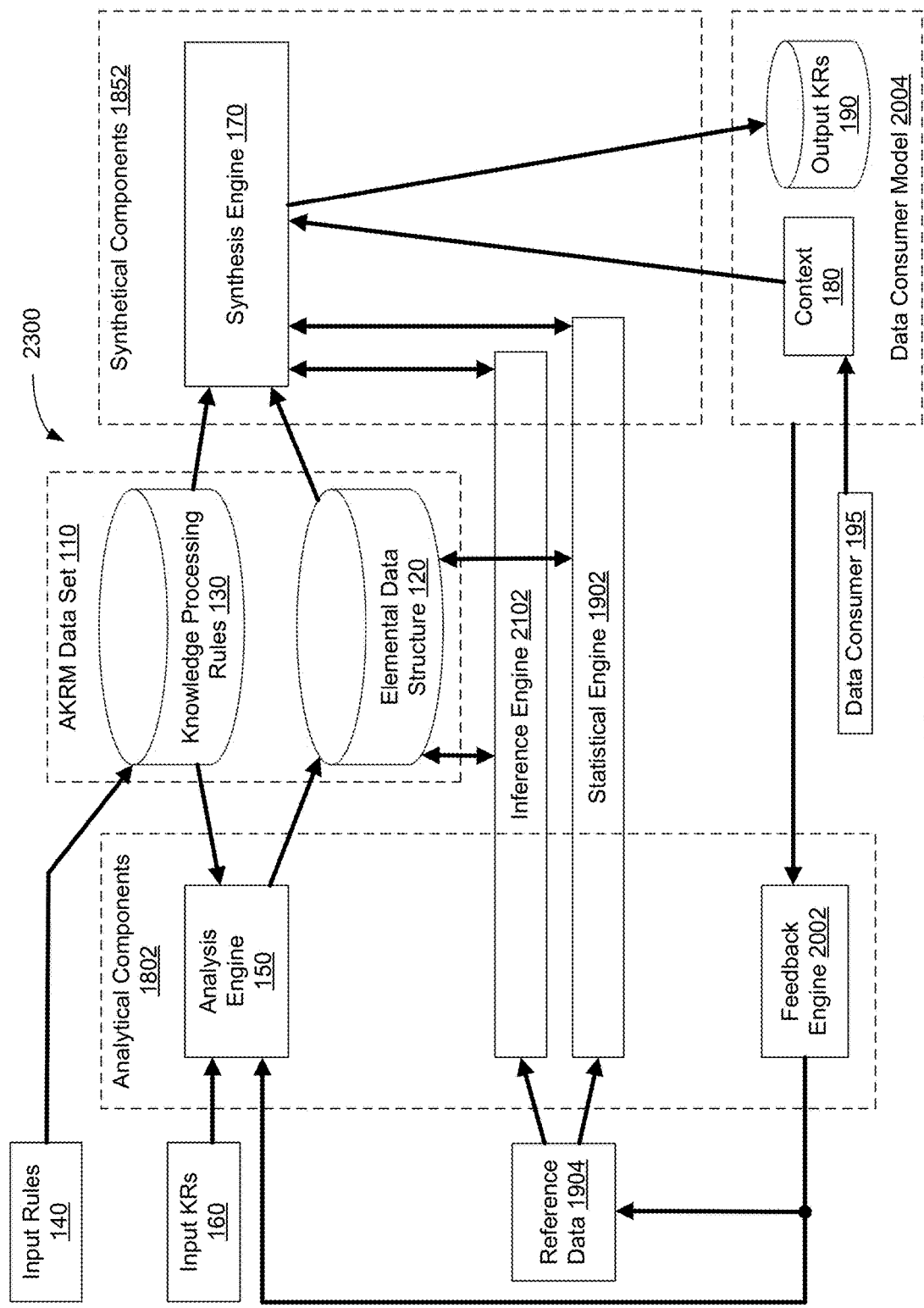
FIG. 23 is a block diagram illustrating yet another exemplary system for implementing an atomic knowledge representation model in accordance with some embodiments of the present invention.

FIGS. 22 and 23 illustrate exemplary systems 2200 and 2300, respectively, that may be employed in some embodiments for implementing an atomic knowledge representation model (AKRM) involved in analysis and synthesis of complex knowledge representations (KRs), in accordance with some embodiments of the present invention. Exemplary system 2200 comprises inference engine 2102, statistical engine 1902, feedback engine 2002, and preference engine 3802.

Various engines illustrated in FIG. 22 may operate together to perform analysis and/or synthesis of complex KRs. For example, documents such as web pages or other digital content viewed or used by a data consumer 195 may be included in data consumer model 2004. Feedback engine 2002 may add such documents or other digital content to reference data 1904. Inference engine 2102 may detect subsumption relationships among concepts in such documents. Statistical engine 1902 may use such documents to estimate a relevance of one concept to another. As another example, inference engine 2102 may infer that a relationship exists between two concepts in elemental data structure 120. Statistical engine 1902 may estimate a relevance associated with the relationship. Additionally or alternatively, inference engine 2102 may apply elemental inference rules to a statistical graphical model produced by statistical engine 2102. Additional cooperative or complementary functions of the various inventive engines disclosed herein will be apparent to one of skill in the art, and are within the scope of this disclosure.

Exemplary system 2300 of FIG. 23 further illustrates that inference engine 2102 and/or statistical engine 1902 may participate in analysis and/or synthesis operations.

As illustrated in FIGS. 22 and 23, reference data 1904 may be used to estimate relevance values associated with components of elemental data structure 120 and/or to detect concepts and relationships not detected by analysis engine 150. For example, application of knowledge processing rules 130 to input KRs 160 by analysis engine 150 may suggest that there is no relationship between two concepts or that the relevance of the first concept to the second concept is low. However, application of statistical inference methods and inferential analysis rules to reference data 1904 may suggest that there is a relationship between the two concepts or that the relevance of the first concept to the second concept is high. Results obtained from inference engine 2102 and/or statistical engine 1902 may complement results obtained from analysis engine 150, in the sense that analysis of multiple sources of data may lead to more accurate detection of relationships and concepts, and more accurate calculate of relevance values associated with those relationships and concepts. In some embodiments, an exemplary system may evaluate a portion of reference data 1904 (or an input KR 160) to determine whether analysis of the data (or KR) is likely to enhance a quality of elemental data structure 120.

VIII. Appendix: A Probabilistic Model for AKRM

1. Motivation

In some embodiments, AKRM (Atomic Knowledge Representation Model) may comprise an elemental data structure represented by a directed graph $G_0=<V_0,E_0>$, where $V_0$ is its vertex set, which represents a set of concepts. $E_0$ is the directed edge set, which represents relationships between two concepts (order matters) in $V_0$ if they are connected by an edge in $E_0$. There may be cycles in AKRM. In some embodiments, AKRM may not be a DAG (directed acyclic graph). There may be two possible types of relationships for an edge in AKRM: 'is-a' and 'is defined by'. Each vertex in AKRM may be an atomic concept.

FIG. 12 illustrates an embodiment of a simple AKRM.

In FIG. 12, only edge type 'is-a' is marked. The other edges have the type 'is defined by'. A question is: how the concept 'fire truck' is relevant to 'alarm'? This question may lead to a query against AKRM. To answer such a question, we may work out a general solution for a probabilistic model on a directed graph derived from AKRM. In some embodiments, a probabilistic model may be a statistical graphical model. Note that, the model may be motivated by AKRM but it may be independent of AKRM.

2. The Probabilistic Model—PAKRM

For convenience, we denote the probabilistic model for AKRM by PAKRM. Setting up the model may comprise three steps. The first is to construct a bi-directed graph from AKRM. The second is to define events associated to each node and each edge of the graph and estimate related base probabilities. The third is to use the base probabilities to compute the joint probability related to any two nodes. We introduce these steps after an overview of the model.

2.1. An Overview of the Model

Before introducing the terminologies and techniques to derive the model. We show the framework of PAKRM in FIG. 15 to have an overview. Note that detailed descriptions of the framework are given in the following subsections.

PAKRM may have the following features.

Coverage: To measure the relevance of any two concepts in AKRM even if there is no edge (i.e. no relationship) among them.

Consistency: By statistical inference, the model is able to answer general questions related to relevance of concepts (i.e. all the answers may come from the same model).

Efficiency: Do not need to check the original knowledge base (i.e. the Corpus) during each query time.

There are some existing approaches in the literature to measure the semantic relation of two concepts [6, 4, 15, 3]. Efforts on defining some similarity measure for concepts lead to approaches based on various assumptions and mechanisms. The choice of such an approach tends to be ad-hoc.

PAKRM is a graphic model. There are two typical graphic models, Bayesian network [1, 2] and Markov network [11]. Bayesian network is constructed on DAGs (directed acyclic graphs) and Markov network is constructed on undirected graphs. Since the graph of AKRM may be neither a DAG nor an undirected graph, the approaches of the two typical graphic models may not be feasible for AKRM.

PAKRM may be constructed on a bi-directed graph that is derived from AKRM. This graph may not be a CG (conceptual graph) either. Although it may be regarded as a reduced CG (it has the concept node set but not the relation node set), the concept similarity or other approaches on CG [13] is not so relevant. Semantic networks may also be constructed to measure concept similarities. Some approaches via semantic networks rely on a tree-like structure and some information theory [12]. They are normally not a probabilistic approach.

Probabilistic models may be used in the ground of document retrieval to rank documents by some conditional probability that associates to a document and a query [5, 17]. Such a Probabilistic model may rely on a Corpus rather than a global relation between concepts. PAKRM is proposed to measure the relevance among concepts by global relations. It is not closely related to the approaches of document retrieval.

2.2. Construct the Graph

Figure 16:
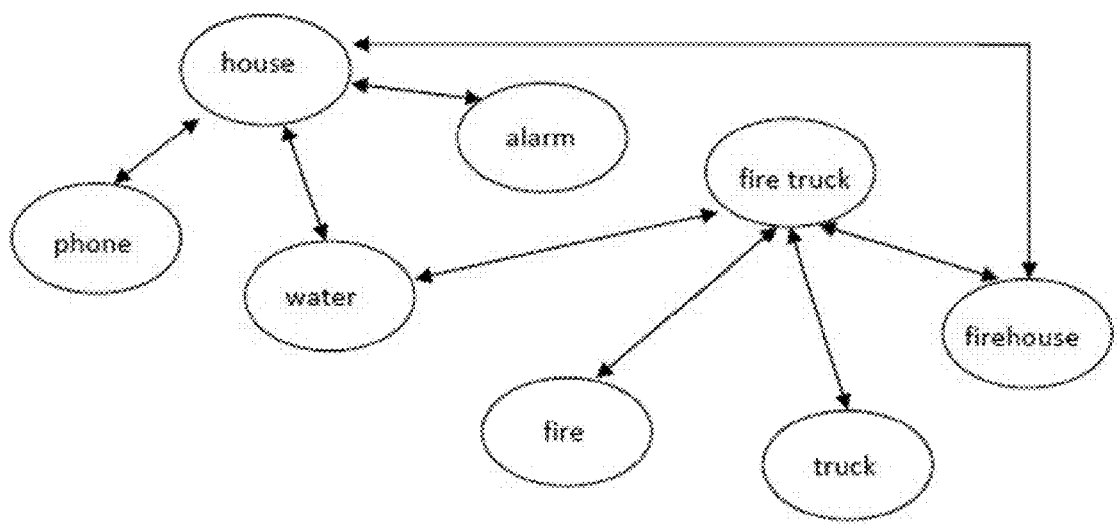
FIG. 16 is an illustration of a graphical model associated with the elemental data structure of FIG. 12.

In some embodiments, we set up a probabilistic model on a directed graph $G=<V,E>$ for queries against AKRM. The graph G may be derived from AKRM as follows. The vertex set V is the set of all the concepts from AKRM. If there is a relationship (no matter 'is-a' or 'is defined by') between two concepts say $C_1$ and $C_2$ in AKRM, we have two directed edges in the edge set E such that one starts from $C_1$ and points to $C_2$ and the other starts from $C_2$ and points to $C_1$. For each edge e in E, if e starts from $C_1$ and points to $C_2$, a relationship exists from AKRM between $C_1$ and $C_2$. The above description of the edge set E implies that for each directed edge say e of E, in G, if e starts from $C_1$ and points to $C_2$ there exists an edge in E starting from $C_2$ and points to $C_1$ and a relationship also exists in AKRM between $C_1$ and $C_2$. FIG. 16 show an example of the graph derived from the simple AKRM of FIG. 12. Note that, the two arrows at each end of an edge represent two directed edges between the two associated nodes.

In some embodiments, PAKRM is set up on the graph G, therefore, a query against AKRM may be transferred into a question against the model. Since the probabilistic model is constructed on a graph, it may be related to some events associated to the graph. For an event, we mean there are multiple outcomes from it and therefore it is uncertain what outcome we will see if the event happens. The uncertainty of the outcomes may be measured by probabilities.

2.3. Estimate Base Probabilities

Figure 13:
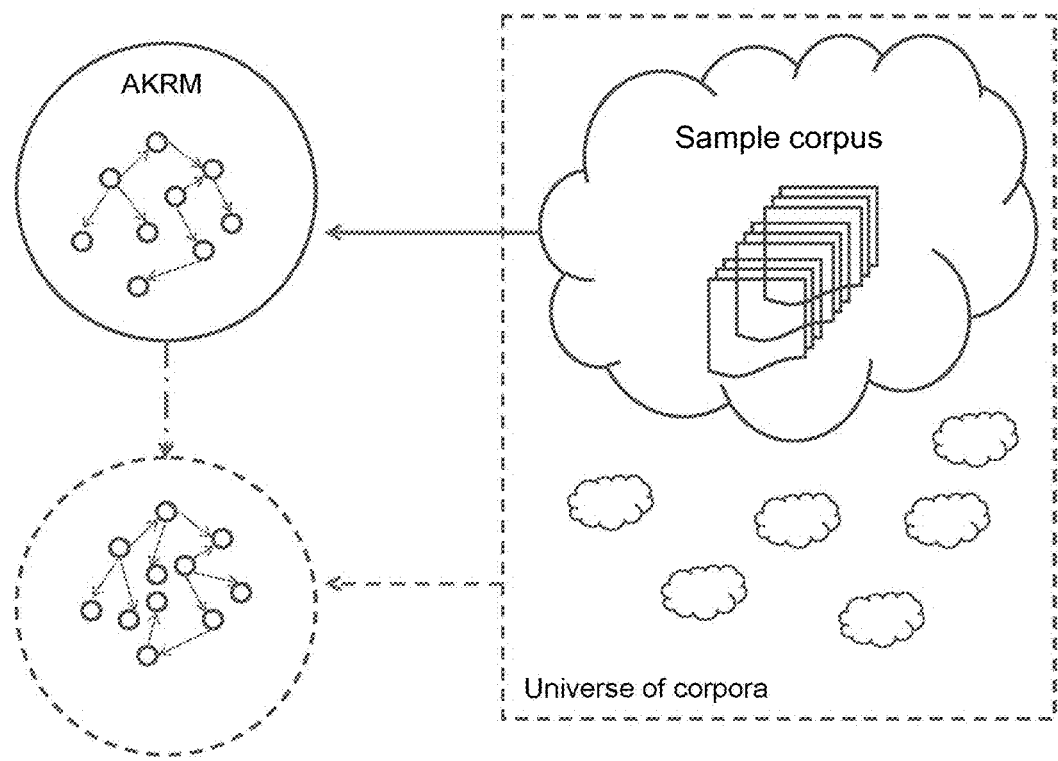
FIG. 13 is an illustration of an AKRM constructed from a sample corpus, the AKRM being an estimate of an AKRM associated with a universe of corpora.

Since AKRM may be constructed from some knowledge base such as a Corpus, we may have a very different AKRM if its knowledge base is replaced. This implies some uncertainty related to AKRM. If there exists a true but unknown KR model, AKRM may be an estimate of that model and it may be estimated by a sample which is the Corpus. As shown in FIG. 13, the AKRM constructed from a corpus may be an estimate of the true AKRM which represents the whole universe of corpora.

Since we may not have a closed form of the estimator, which estimates the true model from a Corpus, and the distribution of Corpora may be unclear, we may focus on the uncertainty related to AKRM constructed from a certain Corpus.

The graph G from AKRM is defined by vertices and edges. To capture the uncertainty from AKRM, we may assign an event for each node and an event for each edge. The way to define such an event is not unique. Since AKRM may be used for user queries, we may define events in terms of users. The existing of events related to the graph G is the reason for a probabilistic model. The estimates related to these events form the pieces of the model. For convenience, we introduce some definitions related to the Corpus.

A corpus, $\mathcal{R}=\{R_1, R_2, \ldots, R_{NR}\}$ may be a set of documents/RDFs. $C_i$ may be the collection of all concepts contained in $R_i$. In some embodiments, a concept may be a word or a sequence of words such that they appear consecutively in a document.

C may be the collection of concepts from every $C_i$ and SC may be the set of concepts from every $C_i$. Note that C may have repeated concepts but SC may not. $N_R$ may be the total number of documents in the corpus. The total number of concepts in C may be $N_C$. We further denote $C_{r_1,t_1}=\{C_i|t_1 \in C_i, t_2 \in C_i, i=1, 2, \ldots, N_C$ to be the set of all the concept collections such that each contains both concept $t_1$ and $t_2$. We denote $C_{t_1}=\{C_i|t_1 \in C_i, i=1, 2, \ldots, N_c\}$ to be the set of all the concept collections such that each contains a concept $t_1$. Let $|C_{t_1,t_2}|$ be the size (number of elements) of the set $C_{t_1,t_2}$.

2.3.1. Node

For a node which represents a concept A, we may define an event that checks whether a general user identifies interests in A. The event related to A may have two possible outcomes: a user identifies interests and a user does not identify interests. Without further information, we consider some existing approaches in the literature to understand the related probability (i.e. the probability that a user identifies interests in A). These approaches rely on another event that can be estimated by 'frequencies'. We call such an event a 'reference' event.

If we regard a Corpus as 'a bag of words' or 'a bag of concepts' [8], to draw a word/concept randomly from a Corpus is an event. The outcome of the event can be any word/concept in the Corpus. It is reasonable to say that the possibility of getting a particular word/concept A is higher than B if A appears more frequently in a particular Corpus than B. So the frequency of a word/concept in a particular Corpus can be a reasonable estimate of the probability that the outcome of the event is a particular word/concept. Actually such a frequency is the MLE (maximum likelihood estimate) of the probability [14].

Without particular information, we regard that a user identifies more interests in a concept A if the probability to draw A from a particular Corpus is higher. This implies that we may use the 'frequency' of A as a major factor to estimate the probability that a user identifies interests in A.

We use $P_r$(user identifies $t_i$) to denote the probability that a user identifies interests in a concept $t_i$. If we use the MILE of the 'reference' event related to a node, we have a simple estimate of $P_r$ (user identifies $t_i$) as follows.

$$Pr\left(\widehat{\text{user identifies } t_1}\right) = \frac{\text{number of times the concept } t_1 \text{ appears in } C}{N_C}$$

The above estimate uses a corpus-wide term frequency (tf) [7, 9], An alternative estimate also involves the inverse-document-frequency (idf) [5, 16, 10]. We first define a function to measure the relevance of a concept t to the Corpus as follows.

$$\text{relevance}(t) = \frac{\text{number of times the concept appears in } C}{N_C}\left(-\log\left(\frac{\Sigma_{\forall C_1} I(t \in C_1)}{N_R}\right)\right)$$

where, $$I(t \in C_i) = \begin{cases} 1 & \text{if } t \in C_i < 0 \\ 0 & \text{otherwise} \end{cases}$$

We therefore have, $$Pr(\text{user identifies } t_1) = \frac{\text{Relevance }(t_1)}{\Sigma_{\forall t \in SC}\text{Relevance}(t)}$$

2.3.2. Choose an Edge from a Node

A directed edge may be determined by a start node and an end node. Only knowing the start node say A may not uniquely determine an edge in G if there are multiple edges starting from A. In terms of user's interests, if A is the concept in which a user identifies interests, to see if the user also identifies interests in another concept, the user may first choose a concept or intend a concept say B then decide if he or she also identifies interests in B. The related event may be 'a user intends concept B if the user identifies interests in A'. A set of candidate concepts that a user intends if the user identifies interests in A may be all the child nodes of A. A child node of A is a node to which a directed edge points from A.

As described above, the candidate concepts for a user to intend given the user already identify interests in a concept, say $t_i$, may be all the child nodes of $t_i$. We denote the related probability by Pr(user intends $t_j$|user identify $t_i$) if $t_j$ is a child node of $t_i$. Without further means of specifying these child nodes, we regard that the possibility of each candidate to be intended is identical. If there are all together m child nodes $t_i$, we have, $$Pr(\text{user intends } t_j \overline{\backslash user} \text{ identifies } t_i) = 1/m$$

This estimate is based on the absence of other information on user's intentions. This part takes into account the density around $t_i$ in the graph G in terms of the number of child nodes of $t_i$. For example, if $t_i$, has only one child node say $t_j$, we will have Pr(user intends $t_j \overline{/user}$ identifies $t_i$)=1; if it has more than one child nodes, we will have Pr(user intends $\overline{t_j /}$ identified $t_i$)<1, because we have more choices from $t_i$ to its child nodes.

2.3.3. Edge

Similar to the way we define an event for a node of G, we may define an event for an edge in terms of user's interests.

If there is an edge e starting from node A and pointing to B, the corresponding event may be, check whether a user identifies interests in B through a relationship in AKRM if the user already identifies interests in A and also intends B. There may be two outcomes of the event: identifies interests or not. Some dependency may be involved in this event such that identifying interests in B depends on A.

According to the methodology we used to estimate the probability related to a node, we may use an event of drawing concepts as the 'reference' event. As for an edge, the 'reference' event may be to draw a 'basket' of concepts that has concept B from a large urn of 'baskets' that are drawn from a Corpus and has concept A. A 'basket' may be regarded as a document. This implies that we may use document frequency as a major factor to estimate the probability related to an edge.

We denote $t_i \rightarrow t_j$ as the event that a user identifies interests in the concept $t_j$ through the relationships in AKRM between $t_i$ and $t_j$. Note that there may be more than one relationship in AKRM between two concepts. The event $t_i \rightarrow t_j$ given identify $t_i$ implies that a user identifies interests in the concept $t_j$ through an directed edge in G from $t_i$ to $t_j$ after the user first identifies interests in the concept $t_i$. We may be interested in the probability Pr($t_i \rightarrow t_j$/user identifies $t_i$ and user intends $t_j$). According to the above discussion, the probability may be estimated by a document frequency as follows.

$$Pr(t_i \rightarrow t_j / \widehat{\text{user identifies } t_i} \text{ and user intends } t_j) = \frac{|C_{t_i, t_j}|}{|C_{t_i}|}$$

where $|C_{ti,tj}|$ is denoted as the number of documents in the Corpus that contains $t_i$ and j. $|C_{ti}|$ is denoted similarly.

Back to the motivation, the purpose of the model may be to answer queries against AKRM such as how the concept 'fire truck' is relevant to 'alarm'? To measure the probability of co-occurrence of the two concepts may be a good means to answer such a query. This leads to a joint probability PR(user identifies fire truck' and 'alarm').

We already have the pieces to estimate this joint probability.

2.4. Compute the Joint Probability

Let $t_i$ and $t_k$ be two nodes from G. In some embodiments, to estimate Pr (user identifies $t_i$ and $t_k$), we may make some assumptions.

2.4.1 Some Assumptions

For convenience, we use $t_i \rightsquigarrow t_k$ to denote the event that a user identifies interests in $t_k$ through all the paths from $t_i$ to $t_k$. We use Pr($t_i \cap t_k$) to denote Pr(user identifies $t_i$ and $t_k$) for simplicity. By a path, we mean it is a list of directed edges such that the end node of an edge except the last one is the start node of its immediate successor. It also implies a sequence of concepts in which a user identifies interests with an order. Therefore, to form a path, a user must first identify interests in the first concept of the sequence then not only intend but also identify interests in the second concept and so on.

To make the probability related to paths work and the corresponding calculation feasible. We have five basic assumptions as follows.

1. All paths in G between two nodes contribute to their relevance to one another and other paths are irrelevant. This implies $$Pr(t_i \cap t_k | t_a \leadsto t_b) = 0 \text{ if } \{a,b\} \neq \{i,k\} \text{ and}$$

$$Pr(t_i \cap t_k | t_i \leadsto t_k) = Pr(t_i \cap t_k | t_k \leadsto t_i) = 1.$$

2. $Pr(t_i \leadsto t_k | \text{user identifies } t_j \text{ and } t_j \neq t_i) = 0$.
3. Paths are mutually exclusive.
4. Edges in a path are mutually independent.
5. A Markov-like assumption for paths:

$$Pr(t_i \leadsto t_k | \text{user identifies } t_i \text{ and identifies } t_j \text{ and intends } t_j \text{ and } t_i \to t_j) = Pr(t_j \leadsto t_k | \text{user identifies } t_j)$$

2.4.2. The Joint Probability

By the total rule of probability and assumption 1, we have, $$Pr(t_i \cap t_k) = Pr(t_i \cap t_k | t_i \leadsto t_k) Pr(t_i \leadsto t_k) + Pr(t_i \cap t_k | t_k \leadsto t_i) Pr(t_k \leadsto t_i) + \sum_{\forall \{a,b\} \neq \{i,k\}} (Pr(t_i \cap t_k | t_a \leadsto t_b)) = Pr(t_i \leadsto t_k) Pr(t_k \leadsto t_i) \quad (1)$$

The second term, $Pr(t_k \leadsto t_i)$, from the right hand side of (1) can be solved accordingly if we work out the first term. For simplicity, we omit the term 'user' in the formula of probabilities. By assumption 2, $$Pr(t_i \leadsto t_k) = Pr(t_i \leadsto t_k | \text{identifies } t_i) Pr(\text{identifies } t_i) \quad (2)$$

In (2) $Pr(\text{identifies } t_i)$ may be estimated by the approach in Section 2.3.1. The conditional probability in (2), $Pr(t_i \leadsto t_k | \text{identifies } t_i)$, may explain how interested is a user in $t_k$ given the user identifies interests in $t_i$. To estimate this probability, by assumption 3, we have, $$Pr(t_i \leadsto t_k | \text{identifies } t_i) = \sum_{j1=1}^{m_i} \{Pr(t_i \leadsto t_k \text{ and intends } t_{i1,j1} | \text{identifies } t_i)\} \quad (3)$$

$$\sum_{j1=1}^{m_i} \{Pr(t_i \leadsto t_k \text{ and intends } t_i | \text{identifies } t_i) Pr(\text{intends } t_i | \text{identifies } t_i)\}$$

Where $t_{i1,j1}$ is a child node of $t_i$, $m_i = |\text{child }(t_i)|$. $Pr(\text{intends } t_{i2,j2} | \text{identifies } t_i)$ in (3) may be estimated by the method introduced in Section 2.3.2. Involving this probability in (3) may guarantee that the estimation of $Pr(t_i \leadsto t_k | \text{identifies } t_i)$ is not larger than 1 and make the Assumption 3 sound.

For the first part of the summation in (3), by assumption 4, we have, $$Pr(t_i \leadsto t_k | \text{intends } t_{i1,j1} \text{ and identifies } t_i) = \quad (4)$$

$$Pr(t_i \to t_{i2,j2} \text{ and } t_{i2,j2} \leadsto t_k | \text{intends } t_{i1,j1} \text{ and identifies } t_i) =$$

$$Pr(t_{i1,j1} \leadsto t_k | \text{identifies } t_i \text{ and intends } t_{i1,j2} \text{ and } t_i \to t_{i1,j1})$$

$$Pr(t_i \to t_{i2,j1} | \text{identifies } t_i \text{ and intends } t_{i1,j2})$$

$Pr(t_i \to t_{i1,j2} | \text{identifies } t_i \text{ and intends } t_{i2,j2})$ may be estimated by the method introduced in Section 2.3.3 By assumption 5, we have, $$Pr(t_{i1,j1} \leadsto t_k | \text{identifies } t_i \text{ and intends } t_{i1,j2}) = \quad (5)$$

$$Pr(t_{i2,j2} \leadsto t_k | \text{identifies } t_{i2,j1})$$

The probability on the right hand side of (5) has a similar form to the left hand side of (3) and may be estimated similarly to (3). This implies a recursive calculation to work out $$Pr(t_i \leadsto t_K | \text{identifies } t_i)$$

We put (3), (4) and (5) together.

$$Pr(t_i \leadsto t_k | \text{identifies } t_i) = \sum_{j1=1}^{m} \{Pr(t_{i1,j2} \leadsto t_k | \text{identifies } t_{i1,j2}) \quad (6)$$

$$Pr(t_{i2,j2} | \text{identifies } t_i \text{ and intends } t_{i1,j2})$$

$$Pr(\text{intends } t_{i1,j1} | \text{identifies } t_i)\}$$

Figure 17:
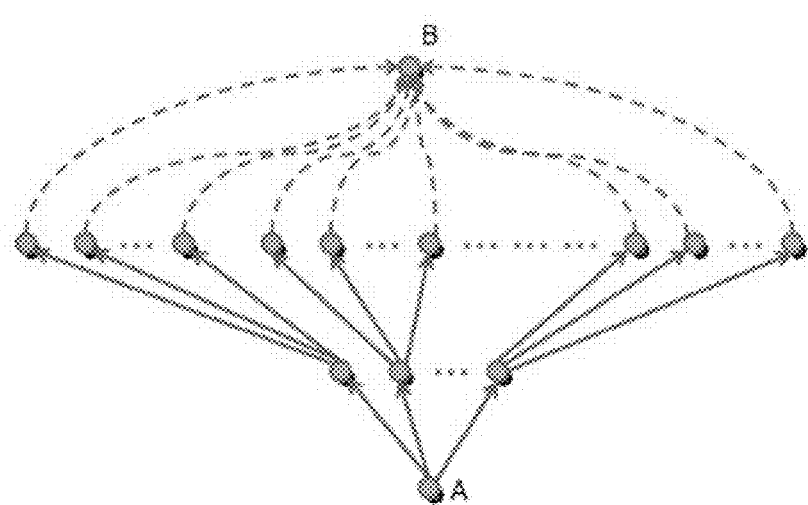
FIG. 17 is an illustration of paths between two nodes corresponding to two concepts A and B in a graphical model of an AKRM.
Figure 18:
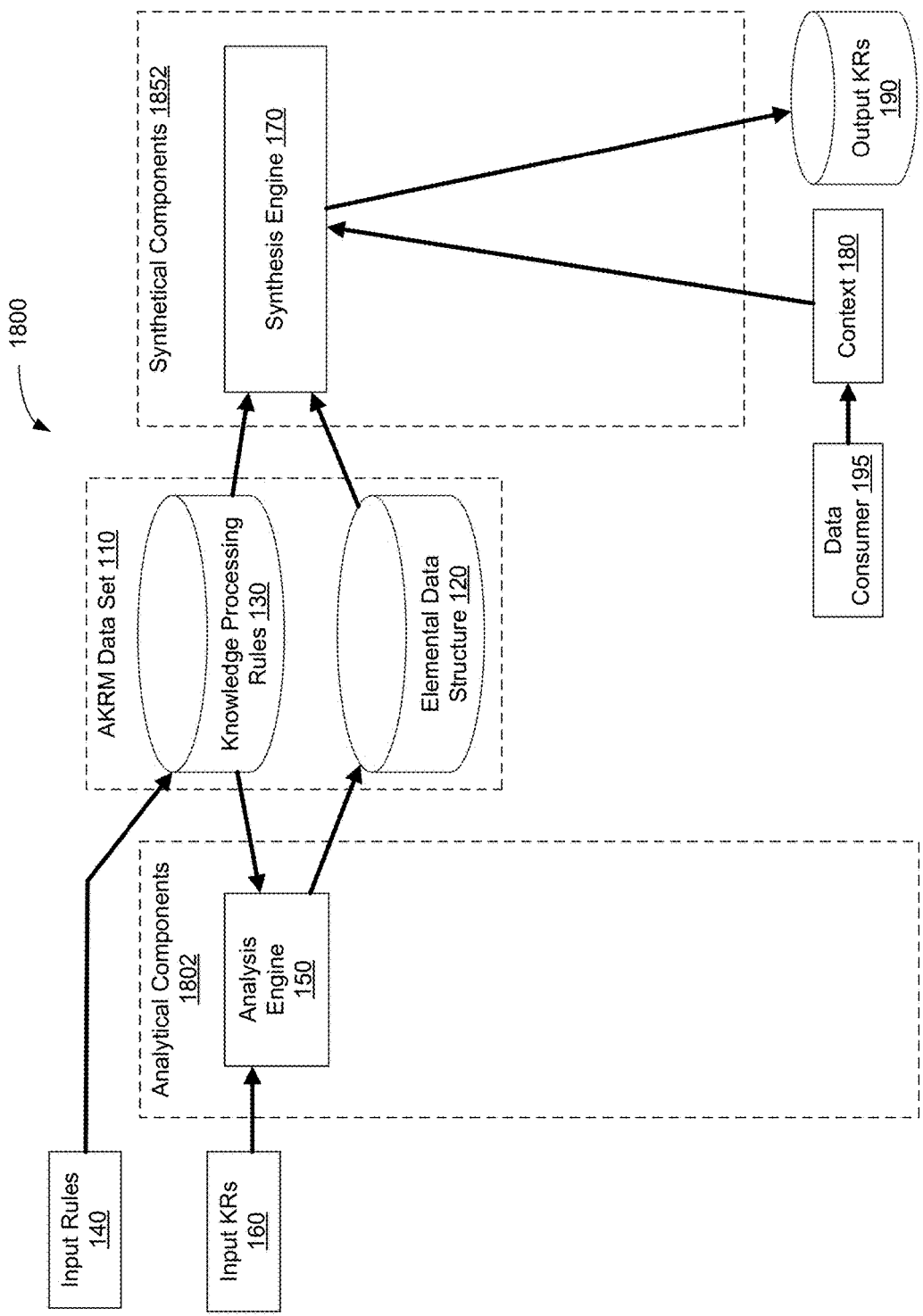
FIG. 18 is a block diagram illustrating another exemplary system for implementing an atomic knowledge representation model in accordance with some embodiments of the present invention.

We expend (6) one step further.

$$Pr(t_i \leadsto t_k | \text{identifies } t_i) = \quad (7)$$

$$\sum_{j_i=i}^{m_i} \sum_{Aj2=1}^{m_{ij1}} \{Pr(t_{i2,j2} \leadsto t_k | \text{identifies } t_{i2,j2}) Pr(t_i \to t_{i2,j1} | \text{identifies } t_i$$

$$\text{and intends } t_{i1,j2}) Pr(\text{intends } t_{i2,j2} | \text{identifies } t_i)$$

$$Pr(t_{i1,j1} \Rightarrow t_{i2,j2} | \text{identifies } t_{i1,j1} \text{ and intends } t_{i2,j2})$$

$$Pr(\text{intends } t_{i2,j2} | \text{identifies } t_{i2,j1})\}$$

where, $m_{i,j_1} = \text{child }(t_{1i_{2,j2}})|$. Note that, the existence of the second summation in (7) may depend on a constraint A, which is $m_{i,j_1} > 0$ and $t_{i2,j2} \neq t_K$ A further expansion up to p steps gives us a general form.

$$Pr(t_i \leadsto t_k | \text{identifies } t_i) = \quad (8)$$

$$\sum_{j1=1}^{m_i} \sum_{A_{j2,j2}=1}^{m_{i,j2}} \sum_{A_{j2,j2}=1}^{m_{i_{2,j2}}} \cdots \sum_{A_{j2,j2\ldots jp-2,jp}=2}^{m_{i_{2,j2\ldots jp-2}}} \{Pr(t_{i_p j_p} \leadsto t_k | \text{identifies}$$

$$t_{i_p j_p}) Pr(t_i \to t_{i_p j_p} | \text{identifies } t_i \text{ and intends } t_{i_2 j_2})$$

$$Pr(\text{intends } t_{i,j} | \text{identifies } t_i) Pr(t_{i,k} \to t_{i2,j2} |$$

$$\text{identifies } t_{i,j}) Pr(\text{intends } t_{i2,j2} | \text{identifies } t_{i2,j2}) \ldots$$

$$Pr(t_{i_{p-1} j_{p-1}} \to t_{i_p j_p} | \text{identifies } t_{i_{p-2} j_{p-2}} \text{ and intends}$$

$$t_{i_p j_p}) Pr(\text{intends } t_{i_p j_p} | \text{identifies } t_{i_{p-1} j_{p-1}})$$

where, $A_{j_1, j_2, \ldots, j_{p-2}}$ is the constraint for the corresponding summation such that the summation and any following summations that depend on this summation exist only if $m_{i, j_1, j_2, j_{p-1}} > 0$ and $t_{i_{p-1} j_{p-1}} \neq t_K$ FIG. 17 demonstrates the paths from concept A to B. In some embodiments, the paths first reach every child node of A then for each child node of A, say C, the paths also reach every child node of C and so on. Each path may end by either reaching B or going no further.

Our probabilistic model PAKRM is complete after the joint probability is defined. For the question how the concept 'fire truck' is relevant to 'alarm'? we may have multiple solutions according to the conditions related to the meaning of 'relevance'. If the degree of relevance is measured by the degree of co-occurrence, we may use Pr ('firetruck'∩'alarm'), if the degree of relevance is measured conditional on a user identifies interests in 'alarm', we may use
Pr('firetruck'∩'alarm'|user identifies 'alarm'), if the degree of relevance depends on a user identifies interests in 'fire truck' through all the paths of G from 'alarm' to 'fire truck', we may use Pr ('alarm' ⤳ 'firetruck'); we may use
Pr('alarm' ⤳ 'firetruce'|user identifies 'alarm') if the degree of relevance depends on the paths and the condition that a user identifies interests in 'alarm' is given.

2.5. Reduce the Calculation Cost

A recursive algorithm may be suitable to calculate the formula (8). This also implies a high cost of calculation. To reduce the cost, an additional constraint may be added to $A_{j1,j2...j_{p-1}}$, that is, $$Pr(t_i \rightarrow t_{i,j_c}|\text{identifies } t_i \text{ and intends } t_{i,j_c})Pr(\text{intends } t_{i,j_c}|\text{identifies } t_i)Pr(t_{i,j_n} \rightarrow t_{i,j_n}|\text{identifies } t_{i,j_n})$$
$$Pr(\text{intends } t_{i,j_n}|\text{identifies } t_{i,j_n}) \ldots$$
$$Pr(t_{i_p,j_{p-1}} \rightarrow t_{i,j_p}|\text{identifies } t_{i_p-2,j_{p-2}} \text{ and intends } t_{i_p,j_p})$$
$$Pr(\text{intends } t_{i_p,j_p}|\text{identifies } t_{i_p-2,j_{p-2}}) > th.$$

The value of th may be learned from the experiments on AKRM. The values of p and th may be controlled to adjust the computational cost of (8). Since cycles may exist in the bi-directed graph G, a possible stop criterion based on p and th may be used to break cycles automatically (Note that, p is the maximal steps in each path). An alternative way to deal with cycles is to remember the nodes in the current path while searching through possible paths and stop the searching when the current path has a cycle.

2.6. More Applications

We are interested in possible further applications for the model.

2.6.1. New Node by Merging

In some embodiments, a new node say $t_{ij}$ constructed by combining $t_i$ and tj may be added to AKRM if $Pr(t_i \cap t_j)$ is high according to some threshold τ. The value of T may be learned from the experiments on AKRM. If $t_{ij}$ is added, we may assign $Pr(t_{ij})$ by $Pr(t_i \cap t_j)$. Two directed edges may also be added to connect $t_{ij}$ to $t_i$ and $t_j$ respectively. It is clear that $Pr(t_{ij} \rightarrow t_i|\text{identifies } t_{ij} \text{ and intends } t_i) = Pr(t_{ij} \rightarrow t_j|\text{identifies } t_{ij}$ and intends $t_{ij})=1$ (Note that, by probability, $Pr(t_i|t_i \cap t_j)=1$). However, to calculate $Pr(t_i \rightarrow t_{ij}|\text{identifies } t_i \text{ and intends } t_{ij})$ needs some consideration. An option is to use the average of probabilities related to the edges with their start point as $t_i$ as the probability $Pr(t_i \rightarrow t_{ij}|\text{identifies } t_i \text{ and intends } t_{ij})$ The probability $Pr(t_j \rightarrow t_{ij}|\text{identifies } t_j \text{ and intends } t_{ij})$ can be estimated accordingly.

2.6.2. Neighborhood

By the probabilistic model, a neighborhood of a node say t of AKRM may be found such that for each node say t' in that neighborhood we have $Pr(t'|t)>\alpha$. We further denote such a neighbor by $N_a(t)$. It is clear that $N_a(t)=\{t' \in V|Pr(t'|t)>\alpha\}$. $N_a t$ may represent the set of all the concepts that have close relation to the concept in terms of a threshold for the conditional probabilities. The neighborhood may be useful when searching for relevant concepts for active concepts from user's query. An alternative way to calculate the neighborhood of t is to use $Pr(t \leadsto t')$ or $Pr(t \leadsto t'|t)$ instead of $Pr(t'|t)$.

2.6.3. Other Applications

The probabilistic model may give us a good reason to do ranking such as to rank the user's interests of a set of concepts given the user identifies interests in an active concept. The model may also provide a way to measure similarities among concepts. These similarities can be used to do concept clustering and visualization, etc.

3. Algorithms

In some embodiments, to set up the model, three sets of probabilities are estimated. Based on the model, the statistical neighborhood of a node is able to be calculated. This neighborhood may be helpful when we do synthesis. We also suggest methodologies to obtain the values of threshold that are used in the algorithms.

3.1 Node Probability

Let V be the set of all concepts of AKRM. Let C be a bag of words from the Corpus such that C contains only the concepts of V and the number of times a concept appears in C is that it appears in the Corpus. Algorithm 1 calculates Pr(user identifies t) for each concept tin V. At least three options are available.

---

Algorithm 1: Estimate the probability for each concept

---

Input: the Corpus, a graph G = <V, E> derived from AKRM
Output: probability for nodes
(Option 1)
(1) Let $N_C$ = sum of times over every concept appears in C
(2) For each concept t in V do $$PR(\text{user identifies } t_i) = \frac{\text{number of times the concept } t_i \text{ appears in } C}{N_C}$$

End do
(Option 2)
(1) Let $N_C$ = sum of times over every concept appears in C
(2) Set totRelev = 0
(3) For each concept t in V do $$\text{Relevance (t)} = \frac{\text{number of time t appears in } C}{N_C}\left(-\log\left(\frac{\text{number of documents with t}}{\text{total number of documents in Corpus}}\right)\right)$$

totRelev = totRelev + Relevance(t)
End do

| Algorithm 1: Estimate the probability for each concept |
| --- |

(4) For each concept t in V do $$PR(\text{user identifies } t) = \frac{\text{Relevance}(t)}{\text{totRelev}}$$

End do
(Option 3)
(1) Set totRelev = 0
(2) For each concept t in V do

Relevance (t) =

$$\frac{\text{number of documents with } t}{\text{total number of documents in Corpus}} \left( -\log\left( \frac{\text{number of documents with } t}{\text{total number of documents in Corpus}} \right) \right)$$

totRelev = totRelev + Relevance(t)
End do
(3) For each concept t in V do $$Pr(\text{user identifies } t) = \frac{\text{Relevance}(t)}{\text{totRelev}}$$

End do

The computational complexity for each of the three options of Algorithm 1 is O(N), except the calculation of $N_C$. The first option is the maximum likelihood estimate. The second is a corpus wide tf-idf. The third option simplifies the second by using only the document frequency and not necessary to know $N_C$.

3.2. Edge Probability

The probability related to each directed edge may be estimated by Algorithm 2.

| Algorithm 2: |
| --- |

Input: the Corpus, a graph G =<V, E> derived from AKRM
Output: probability for edges
(1) Transform G into a bi-directed graph by
    a. For every edge e in E, suppose e connects node A to node B, check if an edge exists to connect B to A
    b. If such an edge does not exist, add an edge e to U such that e connects B to A
    c. Denote the bi-directed graph by $G_b$
(2) For each edge e in $G_b$ do
    Suppose e connects node $t_i$ to $t_j$, calculate $$Pr(t_i \rightarrow t_j \mid \text{user identifies } t_i \text{ and user intends } t_j) = \frac{\text{number of docs with both } t_i \text{ to } t_j}{\text{number of docs with } t_i}$$

End do

The computational complexity relies on number of edges in E. The worst case is $O(N^2)$, but this may occur infrequently since the edges of AKRM may be very sparse.

3.3. Joint Probability of Two Nodes

The joint probability of two nodes say $t_j$ and $t_k$ may be calculated from $Pr(t_i \leadsto t_k | \text{user identifies } t_j)$ and $Pr(t_k \leadsto t_j | \text{us'er identifies } t_k)$. To calculate the two conditional probabilities, we may use a recursive function described by the following algorithm.

| Algorithm 3: leadsto($C_1$, $C_2$, $G_b$, pathsofar, pathprob, th) |
| --- |

Input parameter:
    a. $C_1$ is the start node, $C_2$ is the end node of paths
    b. The bi-directed graph $G_b$ (see step 1 of Algorithm 2)
    c. pathsofar records the nodes in the path so far
    d. pathprob is the probability related to the path so far
    e. th is the value to cut the current path if pathprob is smaller
Output: the probability of $C_1$ leads to $C_2$ given starting from this probability is written as Pr ($C_1 \leadsto C_2 | C_1$)
(1) Get all the child nodes of $C_1$ and denote them by Children($C_1$)
(2) Let Childrennew($C_1$) = Children($C_1$)—pathsofar
(3) Let m = |Children($C_1$)| I be the number of children for $C_1$
(4) Let mn = |childrennew($C_1$)| be the number of children of $C_1$ that are not in the path so far
(5) Let val = 0
(6) If mn = 0 is TRUE, return val and stop
(7) Let probchoose = 1/m
(8) For each node $C_{1j}$ in Childrennewi($C_j$) do
    a. Let probedge = Pr ($C_1 \rightarrow C_1$|user identifies $C_1$ and user intends $C_{1j}$) (see Algorithm 2)
    b. Let stepprob = probchoose * probedge
    c. Let curpathprob = pathprob * stepprob
    d. If curpathprob > th do
        i. If $C_{1j} = C_2$ is TRUE, val = val + stepprob
        ii. Else, curpathsofar = pathsofar + {$C_{1j}$} and val = val stepprob * leadsto($C_{1j}$, $C_2$, $G_b$, curpathsofar, curpathprob, th)
    End do
End do
(9) Return val and stop The above algorithm is based on a depth-first search. The joint probability may be calculated by a function described in the following algorithm.

| Algorithm 4: |
| --- | joint($C_1$, $C_2$, $G_b$, th)
Input parameter:
    a. $C_1$ and $C_2$ are the pair of nodes for joint probability
    b. The bi-directed graph $G_b$ (see step 1 of Algorithm 2)
    c. th is the value to cut the current path if the probability related is smaller -continued ---
Algorithm 4:
---

Output: the joint probability of $C_1$ and $C_2$, this probability is written as $Pr(C_1 \cap C_2)$
(1) Get pathsofar ~ $\{C_1\}$
(2) Let pathprob = 1
(3) Calculate $v_1$ = leads to($C_1$, $C_2$, $G_b$, pathso far, pathprob, th)
(4) Let pathsofar = $\{C_2\}$
(5) Calculate $v_2$ = leadsto($C_2$, $C_1$, $G_b$, pathsofar, pathprob, th)
(6) Pr(user identifies $C_1$) and Pr(user identifies $C_2$) (see Algorithm 1)
(7) $Pr(\widehat{C_1 \cap C_2})$ = $v_1$ * Pr(user identifies $C_1$) + $v_2$ * Pr(user identifies$C_2$)

---

3.4. Statistical Neighborhood

In some embodiments, the following algorithm specifies how to set up a neighborhood of an active concept/node in terms of dependency (conditional probability).

---
Algorithm 5:
---

Input: the active concept for which to find the neighborhood
Output: the set of concepts as the neighbor of the active concept
(1) Let $C_1$ be the active concept
(2) Let $G_b$ be the bi-directed graph (see step 1 of Algorithm 2)
(3) Let th be the threshold for the neighborhood
(4) Let S be the set of candidate concepts among them to search
(5) Set Neighbor($C_1$) be an empty set
(6) Get Pr(user identifies $C_1$) (see Algorithm 1)
(7) For each concept say $C_2$ in S do
   a. Get $Pr(\widehat{C_1 \cap C_2})$ (see Algorithm 4)
   b. Let $Pr(C_2|C_1) = Pr(\widehat{C_1 \cap C_2})$/Pr(user identifies$C_1$)
   c. If $Pr(C_2|C_1) >$ th, add $C_2$ to the set Neighbor($C_1$)
End do
(8) Take the set Neighbor(C1) as the neighborhood of Ci

---

An alternative algorithm may use $Pr(C_1 \leadsto C_2)$ instead of Pr $C_2|C_1$) to calculate the neighborhood of $C_1$, Pr ($C_1$Pr ($C_1 \leadsto C_2$) may be estimated by the function 'leadsto' from Algorithm 3.

3.5. The Values of Threshold

The threshold values are used in Algorithm 3, 4 and 5. There may be two types of them. The first may be the threshold to cut a path when calculating the probability of 'leads to'. The second may be used to determine the neighborhood of an active concept. There could be a third threshold that is used to determine whether a new node is added (maybe temporarily for a user when doing synthesis) by merging two concepts. We further suggest the methodologies to set up these values as follows.

3.5.1. The Threshold to Cut a Path

The average number of child nodes for a node in the bi-directed graph of AKRM may be m (the average may be calculated by first take a sample of nodes then average their number of child nodes). The average probability related to an edge may be po (the average may be calculated by first take a sample of edges then average the probabilities related to these edges). Note that the probability related to an edge is the probability calculated by Algorithm 2.

Let $\gamma$ be the average number of edges we want a path to have. The average length of paths when searching the graph may be limited by $\gamma$. The threshold may be $(po/m)^\gamma$ This threshold also implies the average or expected computational cost of the function 'leadsto' is $O(m^\gamma)$. Note that, this threshold value does not limit the length of every path to be no more than $\gamma$ however the average length of all the searched paths may be $\gamma$. If the first part of a path is related to a larger probability, it has a larger chance to be longer than $\gamma$.

Since the searching for paths for the function 'leadsto' may be locally (say, among candidate nodes, i.e. a subset from AKRM), the average length of a no-cycle path between a pair of nodes within that local region may not be large. Suppose this average is L, the expected computational cost in this case becomes $O(m^{min(\gamma,L)})$.

3.5.2. The Threshold of Neighborhood

The threshold can be set up by the following algorithm.

---
Algorithm 6:
---

(1) Take a sample of active concepts say SC.
(2) Let SP be an empty set
(3) For each active concept c in SC do
   a. Let S be set of the candidate concepts of c
   b. For each concept $c^1$ in S do
      i. calculate Pr(c'|c) (see Algorithm 5 step 7b)
      ii. Add Pr(c'|c to SP
   End do
End do
(4) Get the 1-$\alpha$ quantile of the elements in SP as the threshold, $0 < \alpha < 1$

---

The neighborhood found by the above threshold implies that every concept in the neighborhood is among the top $\alpha*100$ percent of all the candidates in term of their probabilities given their corresponding active concept.

The following is a method to estimate a quantile from a finite set with N elements.

(1) Order the set from lowest to highest.
(2) Get the index i=round(Nk|100), where $0 \leq k \leq 100$.
(3) The k/100 quantile is estimated to be the $i^{th}$ element of the ordered set.

3.5.3. The Threshold when Merging Two Concepts

We can use a similar strategy as we set up the threshold for neighborhood (see Algorithm 6). The idea is as follows. We first get a sample of concepts and then calculate the joint probability (see Algorithm 4) for each pair of concepts in the sample. We can use the quantile of the set of all the joint probabilities to set up the threshold.

4. Two Toy Examples

To understand how our model works, we show two toy examples. The first example uses the AKRM shown in FIG. 12 with a made-up corpus. The corpus for the second example is generated from an article where a paragraph is regarded as a document. The relationships to construct the corresponding AKRM are derived manually from that article.

4.1. Example 1

To set up the example, we first make up a toy corpus that contains 6 documents. Each document is represented by 'a bag of concepts'. Note that, in this case, each concept is a word. We then use the simple AKRM with 8 edges shown in FIG. 12.

The following is the toy corpus.

1. 'house', 'house', 'water', 'house', 'phone', 'alarm', 'lights'
2. 'firehouse', 'firetruck', 'fire', 'house', 'phone', 'alarm', 'firetruck', 'water'
3. 'truck', 'water', 'truck', 'firetruck'
4. 'firetruck', 'firehouse', 'house', 'water', 'truck'
5. 'electro', 'water', 'house', 'garage', 'alarm', 'lights', 'phone', 'truck'
6. 'vehicle', 'truck', 'phone'

To set up our model, we first transfer the toy AKRM into a bi-directed graph and then calculate the probabilities from the toy corpus related to every node and each direction of every edge. FIG. 14 shows the result. Note that the value inside each node is the probability related to that node. There are two values on each edge such that each value represents the probability related to the direction of the closer arrow.

If we are interested in the relevance of 'firetruck' to 'alarm' or say how a user identifies interests in 'alarm' given the users already identifies interests in 'firetruck', we first estimate Pr('firetruck'⤳'alarm'|identifies 'firetruck'). In this toy example, there are two paths from 'firetruck' to 'alarm'. The first is, 'firetruck'→'water'→'house'→'alarm'. According to our model, the probability related to this path is ¼*1*½*0.8*¼*0.75. The second path is, 'firetruck'→'firehouse'→'house'→'alarm'. The probability related is ¼*0.67*½*1*¼*0.75. By summing them up, the estimated probability is 0.034. Similarly, Pr('alarm'⤳'firetruck'|identifies 'alarm') is estimated to be 0.1375. The conditional probability Pr(user identifies interests in 'alarm'|identifies firetruck) is further estimated to be 0.14. This conditional probability explains how a user identifies interests in 'alarm' given the users already identifies interests in 'firetruck'. Since there are few nodes in the AKRM, we do not calculate the thresholds (see Section 3.5) in this case.

4.2. Example 2

We gathered 11 paragraphs from a Wikipedia article about a fire truck as 11 documents to form the corpus in this example. Note that, the term "fire engine" is originally discussed in that article. For convenience, we regard that a "fire engine" is no difference from a "fire truck" and replace "fire engine" by "fire truck" everywhere in the corpus. We further generate 40 relationships to construct an AKRM. FIG. 18 shows the bi-directed graph with probabilities calculated for each node and each direction of an edge.

In the article, "warning" indicates audio and video alarms. Similar to the first example, we are interested in the relevance of "firetruck" and "warning" in this case.

By the calculations from our model, we have Pr('firetruck'⤳'warning'|identifies 'firetruck')≅0.055 and Pr('warning'⤳'firetruck|identifies 'warning')≅0.11. It seems, from the corpus and the AKRM, the chance to identify "firetruck" after "warning" is identified is lower than the chance to identify "warning" after "firetruck" is identified. To get a further sense of these values, we calculate Pr('traffic'⤳'firetruck'|identifies 'traffic')≅0.038. It seems reasonable that the chance to identify "firetruck" in "traffic" is even lower.

Based on the above calculations, have the joint probability Pr(user identifies 'firetruck' and 'warning')≅0.01 and the conditional probability Pr(user identifies 'warning'|identifies firetruck)≅0.23. We use the thresholds (see Section 3.5) to check if these values are significant. By calculation, the 88% and 90% quantile of the joint probabilities from every pair of nodes in the AKRM are 0.009 and 0.012 respectively. Similarly, the 88% and 90% quantile of the conditional probabilities from every pair of nodes are 0.203 and 0.301 respectively. Therefore, both the joint and the conditional probabilities we calculated above for "firetruck" and "warning" are among the top 12% from all possible pairs. This implies some evidence for a relatively high relevance.

REFERENCES

[1] I. Ben-Gal. Bayesian networks. *Encyclopedia of Statistics in Quality & Reliability*, 2007.

[2] J. M. Bernardo, M. J. Bayarri, J. O. Berger, A. P. Dawid, D. Heckerman, A. F. M. Smith, M. West (eds, David M. Blei, Michael I. Jordan, and Andrew Y. Ng. Hierarchical bayesian models for applications in information retrieval. In *BAYESIAN STATISTICS* 7, pages 25-43, 2003.

[3] D. Bollegala, Y. Matsuo, and M. Ishizuka. Measuring semantic similarity between words using web search engines. In *Proceedings of 16th international conference on World Wide Web*, pages 757-766, 2007.

[4] E. Gabrilovich and S. Markovitch. Computing semantic relatedness using wikipedia-based explicit semantic analysis. In *Proceedings of 20th International Joint Conference on. Artificial Intelligence*, pages 1606-1611, 2007.

[5] D. Hiemstra. A probabilistic justification for using tf-idf term weighting in information retrieval. *International Journal on Digital Libraries*, 3(2):131-139, 2000.

[6] J. Jiang and D. Conrath. Semantic similarity based on corpus statistics and lexical taxonomy. In *Proceedings of International Conference Research on Computational Linguistics*, 1997.

[7] K. S. Jones. A statistical interpretation of term specificity and its application in retrieval. *Journal of Documentation*, 60(5):493-502, 2004.

[8] D. Lewis. Naive (bayes) at forty: The independence assumption in information retrieval. *Lecture Notes in Computer Science*, 1398:4-15, 1998.

[9] D. Metzler and W. Croft. A markov random field model for term dependencies. In *Proceedings of SIGIR 2005*, pages 472-479, 2005.

[10] S. Robertson. Understanding inverse document frequency: On theoretical arguments for idf. *Journal of Documentation*, 60(5):503-520, 2004.

[11] H. Rue and L. Held. Gaussian Markoy Random Fields: Theory and Applications, volume 104 of *Monographs on Statistics and Applied Probability*. Chapman Sz Hall, London, 2005.

[12] N. Seco, T. Veale, and J. Hayes. An intrinsic information content metric for semantic similarity in wordnet. In *Proceedings of 16th 16th European Conference on Artificial Intelligence*, pages 1089-1090, 2004.

[13] W. Song, X. Du, and M. Munro. A conceptual graph approach to semantic similarity computation method for e-service discovery. *International Journal on Knowledge Engineering and Data Mining*, 1(1):50-68, 2010.

[14] E. Terra and C. Clarke. Frequency estimates for statistical word similarity measures. In *Proceedings of 2003 Conference of the North American Chapter of the Association for Computational Linguistics on Human Language Technology*, pages 165-172, 2003.

[15] H. Wang, F. Azuaje, O. Bodenreider, and J. Dopazo. Gene expression correlation and gene ontology-based similarity: An assessment of quantitative relationships. In *Proceedings of IEEE Symposium on Computational Intelligence in Bioinformatics and Computational Biology*, pages 25-31, 2004.

[16] H. C. Wu, W. P. Luk, K. F. Wong, and K. L. Kwok. Interpreting tf-idf term weights as making relevance decisions. *ACM Transactions on Information Systems*, 26(3), 2008.

[17] C. Thai. Statistical language models for information retrieval—a critical review. *Foundations and Trends in Information Retrieval*, 2(3):137-213, 2008.

VIII. Additional Remarks

It should be appreciated from the foregoing discussion and examples that aspects of the present invention can be directed to some of the most pressing and challenging application areas in knowledge representation, including tools for brainstorming and cognitive augmentation, supporting dynamic and emergent knowledge, and providing semantic interoperability by converting between various complex knowledge representations into a common semantic vocabulary.

Various inventive aspects described herein may be used with any of one or more computers and/or devices each having one or more processors that may be programmed to take any of the actions described above for using an atomic knowledge representation model in analysis and synthesis of complex knowledge representations. For example, both server and client computing systems may be implemented as one or more computers, as described above. FIG. 11 shows, schematically, an illustrative computer 1100 on which various inventive aspects of the present disclosure may be implemented. The computer 1100 includes a processor or processing unit 1101 and a memory 1102 that may include volatile and/or non-volatile memory. The computer 1100 may also include storage 1105 (e.g., one or more disk drives) in addition to the system memory 1102.

The memory 1102 and/or storage 1105 may store one or more computer-executable instructions to program the processing unit 1101 to perform any of the functions described herein. The storage 1105 may optionally also store one or more data sets as needed. For example, a computer used to implement server system 100 may in some embodiments store AKRM data set 110 in storage 1105. Alternatively, such data sets may be implemented separately from a computer used to implement server system 100.

References herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The exemplary computer 1100 may have one or more input devices and/or output devices, such as devices 1106 and 1107 illustrated in FIG. 11. These devices may be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 11, the computer 1100 may also comprise one or more network interfaces (e.g., the network interface 1110) to enable communication via various networks (e.g., the network 1120). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements, and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., as "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method of modifying a computer-readable elemental data structure of a knowledge representation system, the method comprising:

applying, using at least one processor executing stored program instructions, one or more rules of analysis to deconstruct a knowledge representation into one or more elemental components;

adding, using at least one processor executing stored program instructions, data associated with the one or more elemental components to an elemental data structure, the elemental data structure storing data representing concepts and concept relationships;

inferring, using at least one processor executing stored program instructions, candidate data associated with the elemental data structure,
   wherein the inferring comprises detecting language in reference data,
   wherein the language corresponds to a predetermined linguistic pattern expressing a relationship between at least a first concept and a second concept in natural language;
modifying the elemental data structure to combine the candidate data and the data associated with the one or more elemental components,
   wherein the modifying comprises adding, to the elemental data structure, the first concept, the second concept, and/or the relationship between the first and second concepts expressed by the linguistic pattern detected in the reference data, wherein the reference data is obtained from a source other than the knowledge representation
   wherein the detected linguistic pattern expresses in natural language that the second concept subsumes the first concept;
   wherein detecting the language corresponding to the predetermined linguistic pattern comprises detecting in the reference data a first label associated with the first concept, followed by a subsumptive expression, followed by a second label associated with the second concept, wherein the linguistic pattern including the subsumptive expression expresses in natural language that the second concept subsumes the first concept;
   wherein the subsumptive expression comprises at least one of one or more predetermined words or one or more predetermined symbols;
   wherein detecting the predetermined linguistic pattern in the reference data comprises detecting in the reference data the first label associated with the first concept and the second label associated with the second concept, wherein a proximity of the first label to the second label is within a threshold proximity;
   wherein the one or more elemental components are encoded as one or more computer-readable data structures storing data associated with the one or more elemental components, and
   wherein the reference data is encoded as one or more computer-readable data structures storing data associated with reference communication.

2. The method of claim 1, wherein the subsumptive expression comprises at least one of "is a", "is an", "is a field of", or "is a type of".

3. The method of claim 1, wherein the threshold proximity is at least one of a number of words, a number of sentences, or a number of a paragraphs.

4. The method of claim 1, wherein the detected linguistic pattern expresses in natural language that the second concept defines the first concept.

5. The method of claim 4, wherein detecting the language corresponding to the predetermined linguistic pattern comprises detecting in the reference data a first label associated with the first concept, followed by a definitional expression, followed by a second label associated with the second concept, wherein the linguistic pattern including the definitional expression expresses in natural language that the first concept is defined by the second concept.

6. The method of claim 1, further comprising inferring second candidate data associated with the elemental data structure, the inferring the second candidate data comprising:
   identifying a first elemental concept in the elemental data structure, the first elemental concept being defined by one or more first characteristic concepts;
   identifying a second elemental concept in the elemental data structure, the second elemental concept being defined by one or more second characteristic concepts; and
   determining that each characteristic concept in the one or more second characteristic concepts is in the one or more first characteristic concepts or subsumes a characteristic concept in the one or more first characteristic concepts.

7. The method of claim 1, wherein:
the elemental data structure comprises the first concept and the second concept; and
modifying the elemental data structure to combine the candidate data and the data associated with the one or more elemental components comprises to the elemental data structure a subsumptive relationship between the first concept and the second concept.

8. The method of claim 1, wherein the candidate data indicates that the second concept does not subsume the first concept.

9. The method of claim 8, wherein:
the elemental data structure comprises an elemental concept relationship between the first concept and the second concept, the elemental concept relationship indicating that the second concept subsumes the first concept; and
modifying the elemental data structure to combine the candidate data and the data associated with the one or more elemental components comprises one of removing the elemental concept relationship from the elemental data structure or reducing a probability associated with the elemental concept relationship in the elemental data structure.

10. A method of modifying a computer-readable elemental data structure of a knowledge representation system, the method comprising:
   applying, using at least one processor executing stored program instructions, one or more rules of analysis to deconstruct a knowledge representation into one or more elemental components;
   adding, using at least one processor executing stored program instructions, data associated with the one or more elemental components to an elemental data structure, the elemental data structure storing data representing concepts and concept relationships;
   inferring, using at least one processor executing stored instructions, a candidate probability that an elemental concept relationship exists between a first concept and a second concept in the elemental data structure,
      wherein the inferring comprises applying one or more elemental inference rules to the elemental data structure to compute a probability less than 100% that the elemental concept relationship exists, wherein the one or more elemental inference rules are applied to the elemental data structure in response to obtaining data indicating that a first label associated with the first concept and a second label associated with the second concept appear in reference data, wherein a proximity of the first label to the second label is within a threshold proximity; and modifying the elemental data structure to combine the candidate probability and the data associated with the one or more elemental components, wherein the modifying comprises adding to the elemental data structure data representing the computed probability in association with the elemental concept relationship;

wherein the elemental concept relationship indicates that the second concept subsumes the first concept;

wherein applying the one or more elemental inference rules to the elemental data structure comprises:

identifying the first concept in the elemental data structure, the first concept being defined by one or more first characteristic concepts;

identifying the second concept in the elemental data structure, the second concept being defined by one or more second characteristic concepts; and calculating, as the candidate probability, a probability that each characteristic concept in the one or more second characteristic concepts is in the one or more first characteristic concepts or subsumes a characteristic concept in the one or more first characteristic concepts;

wherein the one or more elemental components are encoded as one or more computer-readable data structures storing data associated with the one or more elemental components.

11. The method of claim 10, wherein the elemental concept relationship indicates that the second concept defines the first concept.

12. The method of claim 10, wherein the one or more elemental inference rules are applied to the elemental data structure in response to receiving context information from a user, the context information being associated with at least one of the first concept or the second concept.

13. The method of claim 10, wherein the one or more elemental inference rules are applied to the elemental data structure in response to obtaining data indicating that a label associated with at least one of the first concept or the second concept appears in reference data at a rate that exceeds a threshold rate.

14. The method of claim 10, wherein:

the elemental data structure comprises the elemental concept relationship and a previous probability associated with the elemental concept relationship; and modifying the elemental data structure to combine the candidate probability and the data associated with the one or more elemental components comprises replacing the previous probability associated with the elemental concept relationship with one of the computed probability, an average of the computed probability and the previous probability associated with the elemental concept relationship, or a function of the computed probability and the previous probability associated with the elemental concept relationship.

15. A knowledge representation apparatus for modifying a computer-readable elemental data structure, the apparatus comprising:

one or more processors; and a memory unit configured to store instructions which, when executed by the one or more processors, cause the one or more processors to perform a method comprising:

applying one or more rules of analysis to deconstruct a knowledge representation into one or more elemental components, adding data associated with the one or more elemental components to an elemental data structure, the elemental data structure storing data representing concepts and concept relationships, inferring candidate data associated with the elemental data structure, wherein the inferring comprises detecting language in reference data, wherein the language corresponds to a predetermined linguistic pattern expressing a relationship between at least a first concept and a second concept in natural language;

modifying the elemental data structure to combine the candidate data and the data associated with the one or more elemental components, wherein the modifying comprises adding, to the elemental data structure, the first concept, the second concept, and/or the relationship between the first and second concepts expressed by the linguistic pattern detected in the reference data, wherein the reference data is obtained from a source other than the knowledge representation;

wherein the detected linguistic pattern expresses in natural language that the second concept subsumes the first concept;

wherein detecting the language corresponding to the predetermined linguistic pattern comprises detecting in the reference data a first label associated with the first concept, followed by a subsumptive expression, followed by a second label associated with the second concept, wherein the linguistic pattern including the subsumptive expression expresses in natural language that the second concept subsumes the first concept, wherein detecting the predetermined linguistic pattern in the reference data comprises detecting in the reference data the first label associated with the first concept and the second label associated with the second concept, wherein a proximity of the first label to the second label is within a threshold proximity;

wherein the subsumptive expression comprises at least one of one or more predetermined words or one or more predetermined symbols.

* * * * *